(12) United States Patent
Long et al.

(10) Patent No.: US 12,549,664 B2
(45) Date of Patent: Feb. 10, 2026

(54) POSITIONING METHOD AND ELECTRONIC DEVICE

(71) Applicant: Huawei Technologies Co., Ltd., Shenzhen (CN)

(72) Inventors: Shuiping Long, Beijing (CN); Wenchao Lei, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 298 days.

(21) Appl. No.: 18/250,127

(22) PCT Filed: Sep. 9, 2021

(86) PCT No.: PCT/CN2021/117431
§ 371 (c)(1),
(2) Date: Apr. 21, 2023

(87) PCT Pub. No.: WO2022/083344
PCT Pub. Date: Apr. 28, 2022

(65) Prior Publication Data
US 2023/0379408 A1    Nov. 23, 2023

(30) Foreign Application Priority Data
Oct. 22, 2020  (CN) .......................... 202011136485.9

(51) Int. Cl.
*H04M 1/72454* (2021.01)
*H04M 1/72457* (2021.01)
*H04W 4/029* (2018.01)

(52) U.S. Cl.
CPC ... *H04M 1/72454* (2021.01); *H04M 1/72457* (2021.01); *H04W 4/029* (2018.02); *H04M 2250/06* (2013.01)

(58) Field of Classification Search
CPC ......... H04M 1/72454; H04M 1/72457; H04M 2250/06; H04W 4/029; H04W 12/02;
(Continued)

(56) References Cited

U.S. PATENT DOCUMENTS

| 9,813,854 B2 | 11/2017 | Jin et al. | |
| 2010/0125409 A1* | 5/2010 | Prehofer | G01C 21/206 701/408 |
| 2019/0265222 A1* | 8/2019 | Troxler | G01N 9/00 |

FOREIGN PATENT DOCUMENTS

| CN | 103763680 A | 4/2014 |
| CN | 105530608 A | 4/2016 |

(Continued)

OTHER PUBLICATIONS

Xiao Yalong et al., An Indoor Localization Algorithm Based on Multidimensional Scaling and Region Refinement, Chinese Journal of Computers, Aug. 2017, with an English abstract, 15 pages.

*Primary Examiner* — Diane D Mizrahi
*Assistant Examiner* — Jing Gao
(74) *Attorney, Agent, or Firm* — Conley Rose, P.C.

(57) ABSTRACT

An electronic device receives a first input operation performed by a user; determines a to-be-positioned target device and a predetermined moving track in response to the first input operation; and obtains WI-FI feature information of the target device or a WI-FI hotspot apparatus with a known geographical location and motion information of a first electronic device in a process in which the first electronic device moves along the predetermined moving track to determine and display location information of the target device such that the target device can be positioned using one electronic device, there is no need to be a plurality of known reference points, and an offline fingerprint database is not relied on.

20 Claims, 44 Drawing Sheets

(58) Field of Classification Search
CPC ..... H04W 12/122; H04W 12/63; H04W 4/02;
H04W 4/80; H04W 4/021; H04W 4/024;
H04W 4/027; H04W 64/00; H04W 4/38;
H04W 12/68; H04W 12/65; H04W 4/025;
H04W 4/33; H04W 4/026; H04W 88/02;
H04W 52/0245; H04W 48/04; H04W
52/0254; H04W 52/0267; H04W 36/324;
H04W 52/0251; G01S 5/0252; G01S
5/0284; G01S 5/0249; G06F 3/0482;
G06F 3/04883; G06F 3/04842; G06F
3/0488; G06F 3/04817; G06F 16/29;
G06F 3/017; G06F 3/0346; G06F 21/36;
G06F 17/40; G06F 18/22; G06F 21/629;
G06F 2221/2111; G06F 21/554; G06F
2201/81; G06F 2201/805
See application file for complete search history.

(56) References Cited

FOREIGN PATENT DOCUMENTS

| | | |
|---|---|---|
| CN | 108363538 A | 8/2018 |
| CN | 108989984 A | 12/2018 |
| CN | 110018508 A | 7/2019 |
| CN | 110505572 A | 11/2019 |
| CN | 110730419 A | 1/2020 |
| CN | 111615052 A | 9/2020 |
| CN | 111629322 A | 9/2020 |
| WO | 2016054773 A1 | 4/2016 |
| WO | 2018121794 A1 | 7/2018 |
| WO | 2020077540 A1 | 4/2020 |

\* cited by examiner

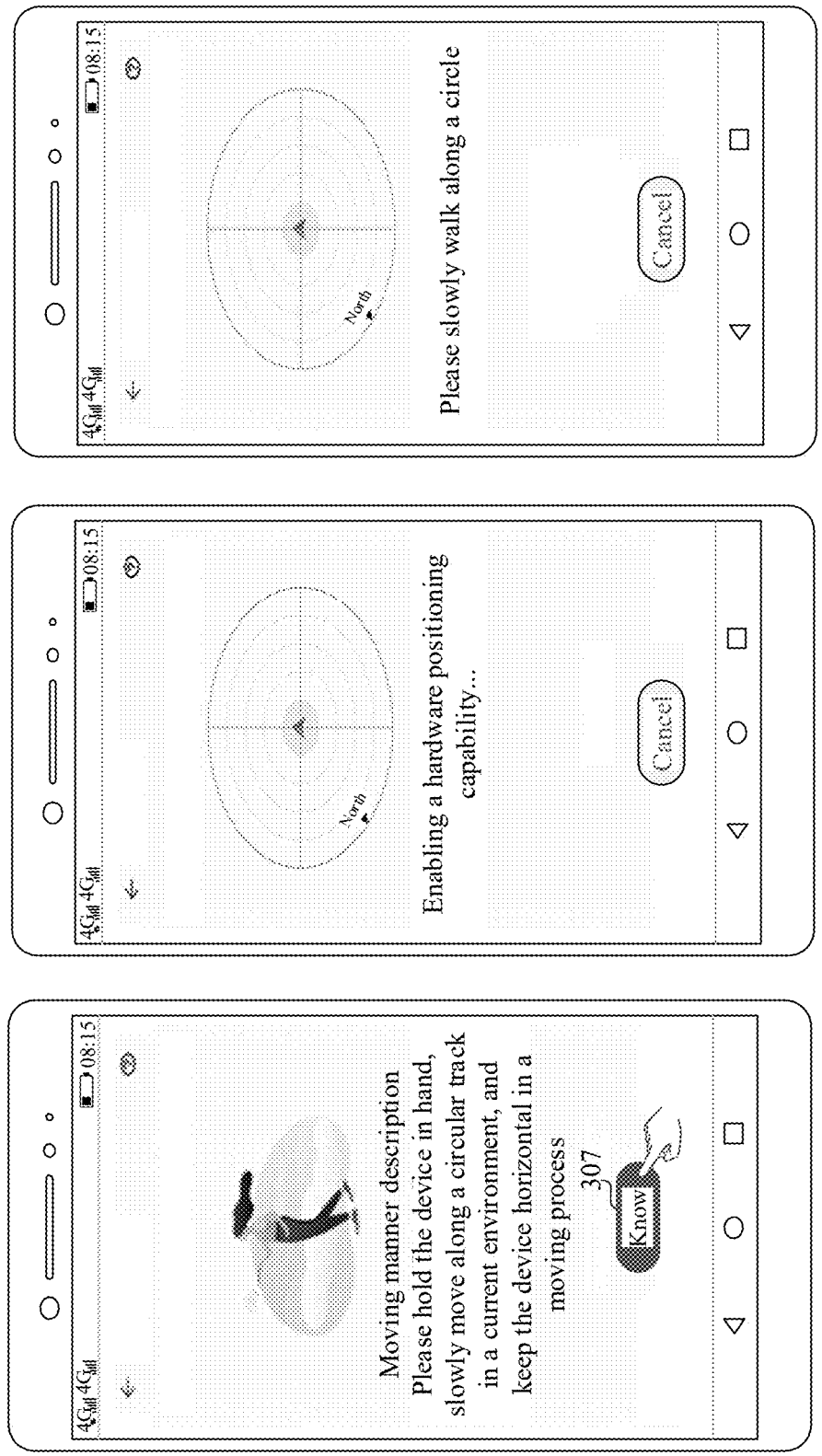

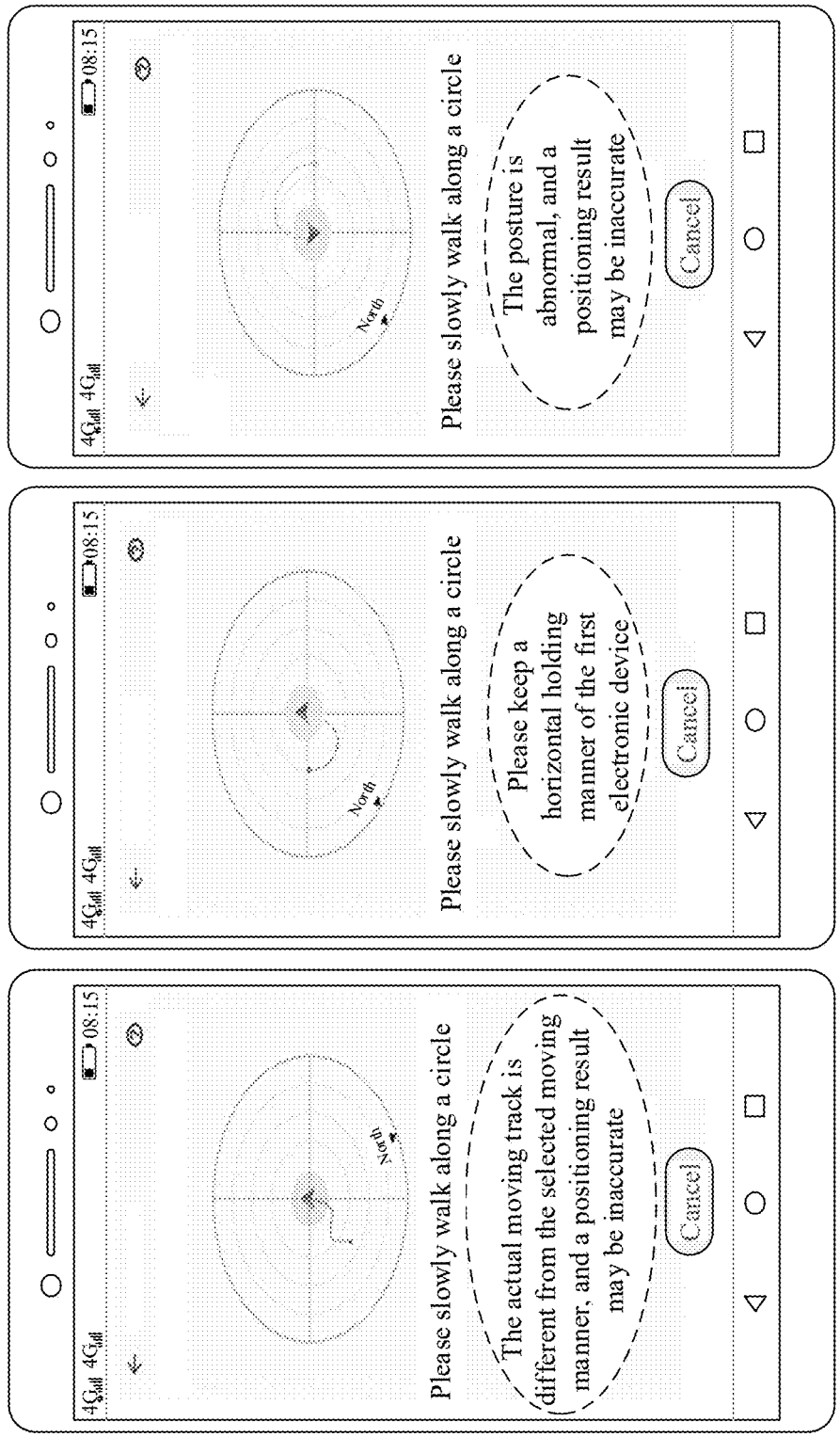

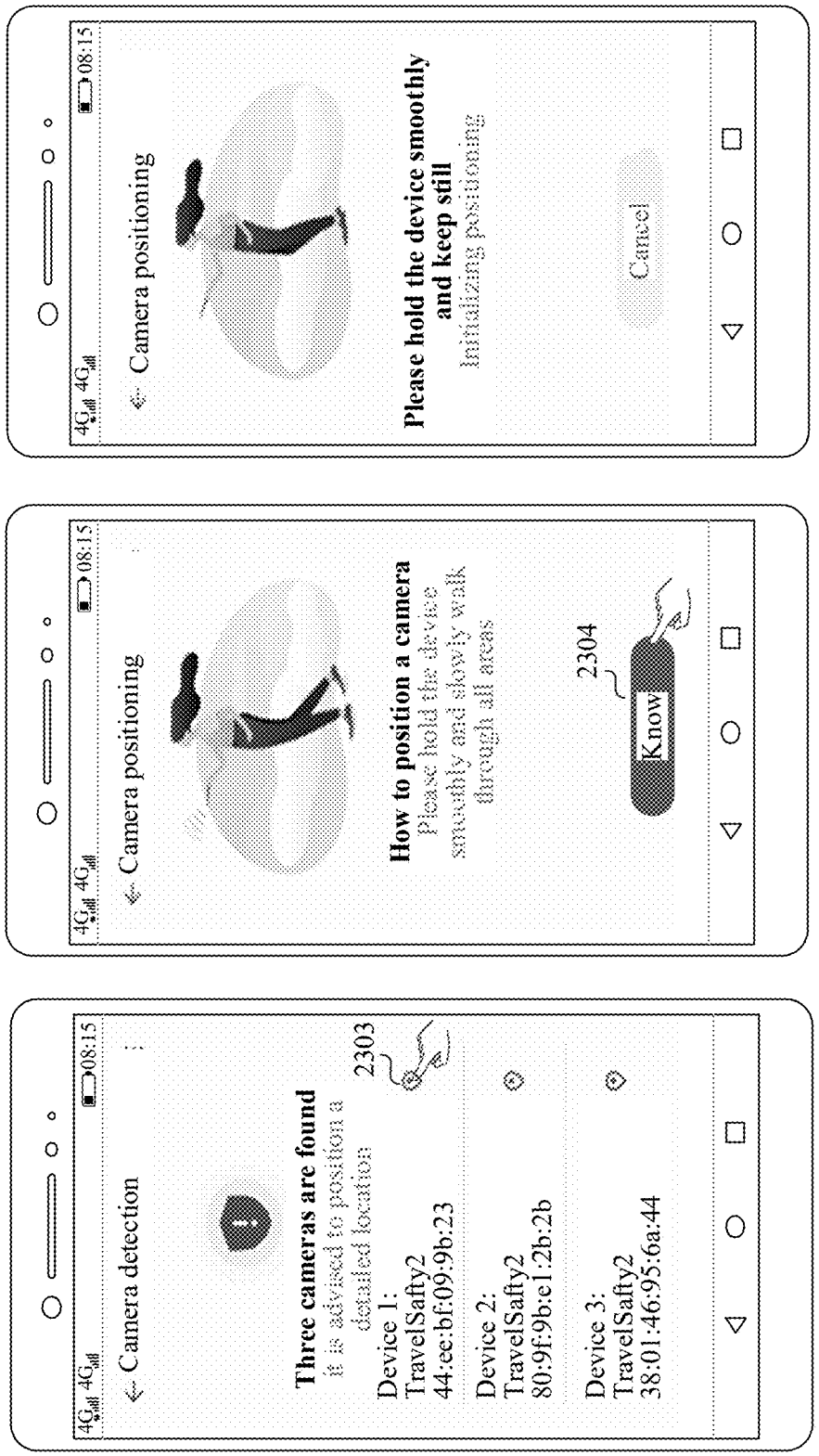

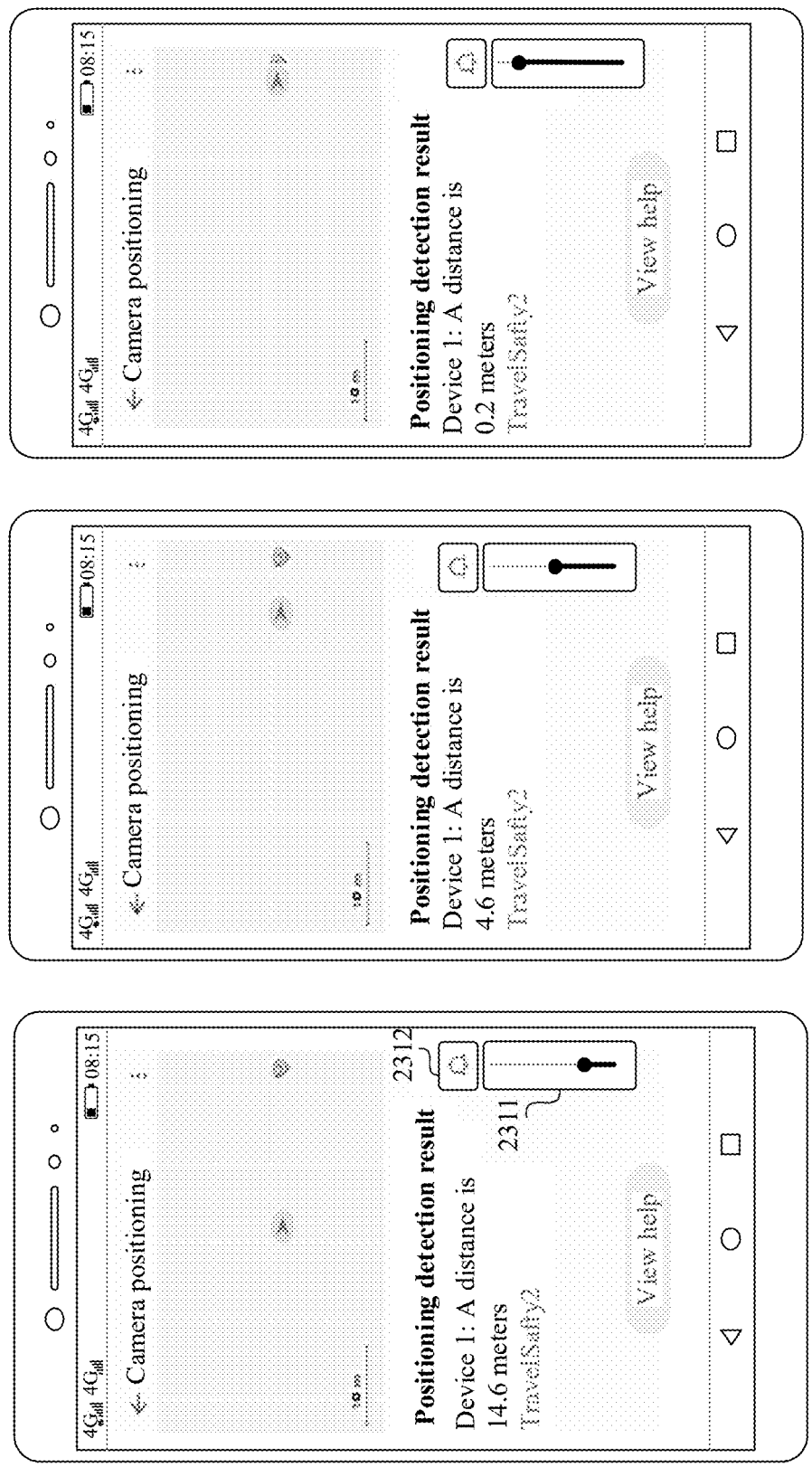

POSITIONING METHOD AND ELECTRONIC DEVICE

CROSS-REFERENCE TO RELATED APPLICATIONS

This is a U.S. National Stage of International Patent Application No. PCT/CN2021/117431 filed on Sep. 9, 2021, which claims priority to Chinese Patent Application No. 202011136485.9 filed on Oct. 22, 2020, both of which are hereby incorporated by reference in their entireties.

TECHNICAL FIELD

This application relates to the field of positioning technologies, and in particular, to a positioning method and an electronic device.

BACKGROUND

Currently, a location based service (location based service, LBS) in which a current location of an electronic device is obtained by using various positioning technologies and an information resource and a basic service are provided for the electronic device is increasingly more prominent. The positioning technology may be roughly classified into an outdoor positioning technology (for example, global positioning system (global positioning system. GPS) positioning) and an indoor positioning technology based on a use environment. The indoor positioning technology is usually also referred to as a short-range positioning technology, and may be used for indoor positioning and positioning in a specific area. An existing indoor positioning technology mainly includes methods such as radio frequency identification (radio frequency identification, RFID), Bluetooth, ZigBee (ZigBee), wireless fidelity (wireless fidelity, Wi-Fi), an ultrasonic wave, a light emitting diode (Light Emitting Diode, LED), a geomagnetic field, an ultra-wideband (ultra-wideband. UWB), a laser, and computer vision. Wi-Fi is widely deployed in indoor and outdoor environments, and is featured by a low cost, an easy promotion, or the like. Therefore, a Wi-Fi-based positioning technology is widely applied.

Based on a positioning principle, an existing Wi-Fi-based positioning technology mainly includes the following several solutions:
  (a) Proximity detection method: Wi-Fi signals of a plurality of known reference points within a limited range are received, and whether a target device appears near a reference point is determined based on a feature such as signal strength. The known reference point is a Wi-Fi hotspot apparatus with clear geographical location information.
  (b) Center-of-mass positioning method: Based on geographical locations of a plurality of known reference points in a range in which a signal can be received by a target device, center-of-mass coordinates of the plurality of known reference points are calculated and used as a geographical location of the target device.
  (c) Multilateral positioning method: A distance between a target device and a plurality of known reference points is calculated, to determine a geographical location of the target device.
  (d) Triangular positioning method: A unique triangle is determined by calculating angle information between a target device and two known reference points and with reference to distance information between the reference points, to determine geographical coordinates of the target device.
  (e) Pole point method: A distance and an angle between a target device and a known reference point are calculated, to determine geographic coordinates of the target device.
  (f) Fingerprint-based positioning method: An offline fingerprint database is established in positioning space, and the database includes a Wi-Fi feature of all known reference points at different location points. In a process of using the database, an actual Wi-Fi feature and a Wi-Fi feature in the offline database are compared, to implement positioning of a target device.

The foregoing solutions each have a disadvantage, and mainly have the following disadvantages:

(1) Some technical solutions are applicable to a limited positioning type.

For example, in the center-of-mass positioning method, the multilateral positioning method, the triangular positioning method, and the fingerprint-based positioning method, a plurality of Wi-Fi hotspot apparatuses need to be used as known reference points. When only one electronic device is available to search for a target device, these technical solutions are not applicable, or another auxiliary means (for example, the electronic device is used to perform measurement at a plurality of geographical locations) needs to be used for an implementation.

(2) In the fingerprint-based positioning solution, time and labor are consumed, a great constraint is imposed, and adaptation is difficult.

In the fingerprint-based positioning method, an indoor scenario usually needs to be divided into grids in an offline stage, and then data is collected at each division point to form a fingerprint database. A granularity of division into the grids directly affects time and labor for collecting data. In addition, data collected in an indoor scenario has difficulty in adapting to another different indoor scenario.

(3) Positioning precision is poor, and an environment exerts great impact.

For example, in the proximity detection method, a small quantity of Wi-Fi features are used, and it is difficult to precisely position a location at which a target device is located. In the center-of-mass positioning method and the fingerprint-based positioning method, positioning precision depends on distribution density of known reference points in a current range in which a signal can be received. However, multilateral positioning and triangular positioning are easily interfered with by a signal in the environment.

SUMMARY

This application provides a positioning method and an electronic device. A target device can be positioned by using one electronic device, there is no need to be two or more known reference points (Wi-Fi hotspot apparatuses), and an offline fingerprint database is not relied on, to avoid time, labor, and environment constraints, reduce impact exerted by interference in an environment, and improve positioning precision.

According to a first aspect, a positioning method is provided. The method is applied to a first electronic device and includes: receiving a first input operation performed by a user: determining a to-be-positioned target device and a predetermined moving track in response to the first input operation; obtaining wireless fidelity Wi-Fi feature information of a second electronic device and motion information of the first electronic device in a process in which the first electronic device moves along the predetermined moving track; and displaying location information of the target device based on the Wi-Fi feature information and the motion information.

According to the solution provided in this application, the to-be-positioned target device and the predetermined moving track of the first electronic device are determined, the Wi-Fi feature information of the second electronic device and the motion information of the first electronic device are obtained in the process in which the first electronic device moves along the predetermined moving track, and the location information of the target device can be finally displayed. In this solution, a plurality of Wi-Fi hotspot apparatuses with known geographical location information do not need to be used, and a plurality of virtual Wi-Fi reference points are formed by moving the first electronic device. The target device can be positioned by simply moving only one electronic device. This solution is applicable to many scenarios, is less constrained by an environment, and is not easily interfered with by a signal in the environment, thereby effectively improving precision of positioning the target device.

With reference to the first aspect, in some possible implementations, if the target device is the first electronic device, the second electronic device is a Wi-Fi hotspot apparatus with a known geographical location.

According to the solution provided in this application, a current device can be positioned, to help the user move to a location with a strong signal based on displayed location information of the current device and the known geographical location of the Wi-Fi hotspot apparatus.

With reference to the first aspect, in some possible implementations, if the target device is not the first electronic device, the second electronic device is the target device.

According to the solution provided in this application, another device different from the current device may be positioned, to help the user determine a specific location of the target device.

With reference to the first aspect, in some possible implementations, the method further includes: The first electronic device displays first prompt information if a deviation between the motion information and the predetermined moving track is greater than a first threshold. The first prompt information is used to prompt the user with information indicating that motion is abnormal or information indicating that credibility of a positioning result is not high.

According to the solution provided in this application, the first electronic device may provide prompt information to the user when a deviation between motion information of the user and the predetermined moving track is greater than the first threshold, so that the user can move along the predetermined moving track, to further improve positioning precision.

With reference to the first aspect, in some possible implementations, the motion information further includes an attitude angle at which the user holds the first electronic device, and the method further includes: The first electronic device displays second prompt information if a deviation between the attitude angle and a preset attitude angle is greater than a second threshold. The second prompt information is used to prompt the user with information indicating to keep a holding manner of the first electronic device or information indicating that a positioning result may be inaccurate.

According to the solution provided in this application, when the deviation between the attitude angle at which the user holds the first electronic device and the preset attitude angle is greater than the second threshold, the first electronic device may also provide prompt information to the user, so that the user moves at the preset attitude angle, to further improve positioning precision.

With reference to the first aspect, in some possible implementations, after the displaying location information of the target device based on the Wi-Fi feature information and the motion information, the method further includes:
    obtaining the Wi-Fi feature information of the second electronic device and the motion information of the first electronic device when the first electronic device continues to move; and displaying location information of the first electronic device and updated location information of the target device based on the Wi-Fi feature information and the motion information.

According to the solution provided in this application, after the location information of the target device is determined, the user can be further helped to search for the target device, to improve user experience.

With reference to the first aspect, in some possible implementations, the displaying location information of the first electronic device and updated location information of the target device based on the Wi-Fi feature information and the motion information includes:
    displaying the location information of the first electronic device and the updated location information of the target device in real time by using a compass or a map based on the Wi-Fi feature information and the motion information.

With reference to the first aspect, in some possible implementations, the first electronic device further displays third prompt information. The third prompt information is used to prompt a distance between the first electronic device and the target device.

With reference to the first aspect, in some possible implementations, the predetermined moving track includes a moving track formed when the user holding the first electronic device in hand moves in at least one of the following moving manners: an in-place rotation manner, an in-place arm swinging manner, and a walking manner.

With reference to the first aspect, in some possible implementations, if the predetermined moving track is a moving track formed when the user holding the first electronic device in hand moves in a moving manner of in-place rotation or in-place arm swinging, the displaying location information of the target device based on the Wi-Fi feature information and the motion information includes:
    estimating location coordinates of the target device based on the Wi-Fi feature information and the motion information by using a crest method or a trough method; and displaying the location information of the target device based on the estimated location coordinates.

With reference to the first aspect, in some possible implementations, if the predetermined moving track is a moving track formed when the user holding the first electronic device in hand moves in a moving manner of walking, the displaying location information of the target device based on the Wi-Fi feature information and the motion information includes:
    estimating location coordinates of the target device based on the Wi-Fi feature information and the motion information by using a heatmap method; and displaying the location information of the target device based on the estimated location coordinates.

With reference to the first aspect, in some possible implementations, if the first electronic device and the target device have established a communication connection or are in a network covered by a same Wi-Fi route, the obtaining Wi-Fi feature information of a second electronic device in a process in which the first electronic device moves along the predetermined moving track includes:

The first electronic device receives, by using the established communication connection or the Wi-Fi route, Wi-Fi data sent by the target device; and the first electronic device extracts Wi-Fi feature information of the target device based on the Wi-Fi data.

With reference to the first aspect, in some possible implementations, if the first electronic device and the target device do not establish a communication connection and are not in a network covered by a same Wi-Fi route, the obtaining Wi-Fi feature information of a second electronic device in a process in which the first electronic device moves along the predetermined moving track includes the following steps:

The first electronic device sets a Wi-Fi network interface card of the first electronic device to a sniffing manner; the first electronic device receives Wi-Fi data of the target device by using the Wi-Fi network interface card; and the first electronic device extracts Wi-Fi feature information of the target device based on the Wi-Fi data.

According to the solution provided in this application, when a first electronic device and a target device do not establish a communication connection and are not in a network covered by a same Wi-Fi route, the first electronic device receives the Wi-Fi data of the target device by using the Wi-Fi network interface card, and extracts the Wi-Fi feature information from the Wi-Fi data, so that positioning of the target device is implemented, and a malicious terminal, a hidden camera, or the like that accesses a private router can be found and positioned in a timely manner, to reduce occurrence of a user privacy invasion event.

With reference to the first aspect, in some possible implementations, the target device is a video surveillance device.

According to the solution provided in this application, if the target device is a video surveillance device, the first electronic device may position the video surveillance device based on obtained information, to reduce occurrence of the user privacy invasion event, and ensure user privacy security.

With reference to the first aspect, in some possible implementations, the motion information of the first electronic device includes one or more of the following information: acceleration, an angular velocity, magnetic intensity, attitude information, location information, and pedometer data.

With reference to the first aspect, in some possible implementations, the Wi-Fi feature information includes one or more of the following information: a received signal strength indicator RSSI, channel state information CSI, a transmission rate, and a signal-to-noise ratio.

With reference to the first aspect, in some possible implementations, the predetermined moving track is automatically determined by the first electronic device.

According to a second aspect, an apparatus is provided. The apparatus is included in an electronic device, and the apparatus has a function of implementing a behavior of the electronic device in the foregoing aspects and the possible implementations of the foregoing aspects. The function may be implemented by hardware, or may be implemented by executing corresponding software by hardware. The hardware or the software includes one or more modules or units corresponding to the foregoing function.

According to a third aspect, an electronic device is provided, including one or more processors, a memory, one or more applications, and one or more computer programs. The one or more computer programs are stored in the memory. The one or more computer programs include instructions. When the instructions are executed by the electronic device, the electronic device is enabled to perform the positioning method in any possible implementation of the first aspect.

According to a fourth aspect, a chip system is provided, including at least one processor. When a program instruction is executed in the at least one processor, a function of the electronic device in the positioning method in any possible implementation of the first aspect is implemented.

According to a fifth aspect, a computer storage medium is provided, including computer instructions. When the computer instructions are run on an electronic device, the electronic device is enabled to perform the positioning method in any possible implementation of the first aspect.

According to a sixth aspect, a computer program product is provided. When the computer program product is run on an electronic device, the electronic device is enabled to perform the positioning method in any possible design of the first aspect.

DESCRIPTION OF EMBODIMENTS

Figure 1:
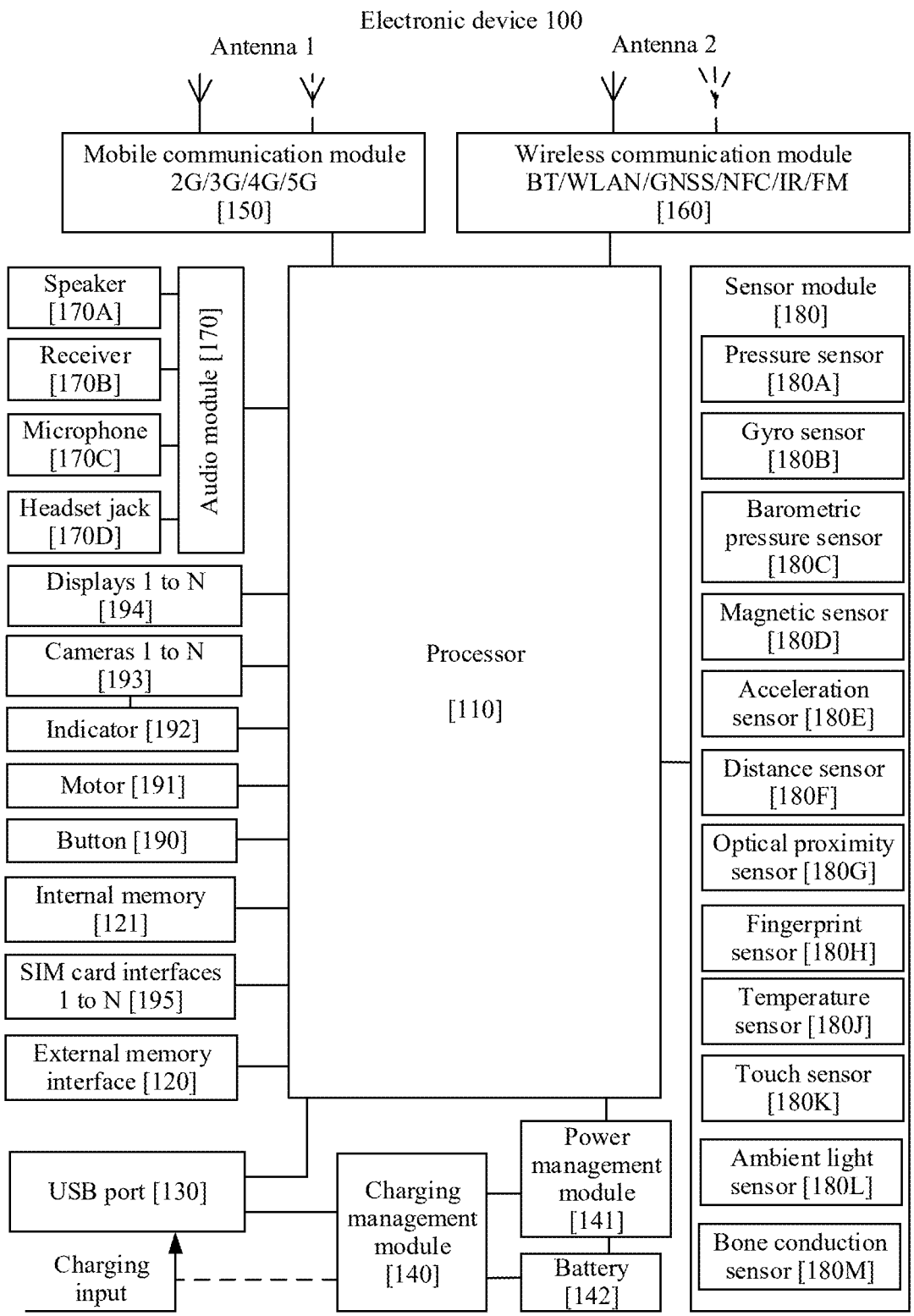
FIG. 1 is a schematic diagram of a hardware structure of an electronic device according to an embodiment of this application.

Terms used in the following embodiments are merely intended to describe specific embodiments, but are not intended to limit this application. The singular expression forms "one", "one type of", "the", "the foregoing", "this", and "such a" used in this specification and the appended claims of this application are also intended to include expressions such as "one or more", unless otherwise specified in the context clearly. It should be further understood that in the following embodiments of this application, "at least one" and "one or more" mean one, two, or more than two. The term "and/or" is used to describe an association relationship between associated objects and represents that three relationships may exist. For example, A and/or B may represent the following cases. Only A exists, both A and B exist, and only B exists, where A and B each may be singular or plural. The character "/" usually indicates an "or" relationship between the associated objects.

Reference to "an embodiment", "some embodiments", or the like described in this specification indicates that one or more embodiments of this application include a specific feature, structure, or characteristic described with reference to embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "including", "have", and their variants all mean "include but are not limited to", unless otherwise specifically emphasized in another manner.

The terms "first" and "second" mentioned below are merely intended for a purpose of description, and shall not be understood as an indication or implication of relative importance or implicit indication of the quantity of indicated technical features. Therefore, a feature limited by "first" or "second" may explicitly or implicitly include one or more features.

An LBS in which a current location of an electronic device is obtained by using various positioning technologies and an information resource and a basic service are provided for the electronic device is increasingly more prominent. In the positioning technology, a plurality of manners such as a mobile network, the Internet, a spatial geographical location, and big data may be integrated, and services including a commercial service, an information search service, a transportation service, a security service, and a rescue search service are provided. GPS-based navigation is a typical application of the LBS. The LBS includes a user, a communication network, positioning, a service, and a content provider. The positioning part is a basic part of the LBS, and is used to determine a location of the electronic device.

The positioning technology may be roughly classified into an outdoor positioning technology (for example, GPS positioning) and an indoor positioning technology based on a use environment. The indoor positioning technology is usually also referred to as a short-range positioning technology, and may be used for indoor positioning and positioning in a specific area. An existing indoor positioning technology mainly includes methods such as RFID, Bluetooth, ZigBee (ZigBee), Wi-Fi, an ultrasonic wave, an LED, a geomagnetic field, a UWB, a laser, and computer vision. Currently, Wi-Fi is widely deployed, and a Wi-Fi-based positioning technology is featured by a low cost, an easy promotion, or the like. Therefore, the Wi-Fi-based positioning technology is widely studied.

A basis of the Wi-Fi-based positioning technology is that each Wi-Fi device has a globally unique media access control (media access control address. MAC) address. Based on this, a positioning apparatus scans for and collects, through program control, a Wi-Fi signal broadcast by the Wi-Fi device to surrounding space, regardless of whether the Wi-Fi signal is encrypted. A to-be-positioned Wi-Fi device may be determined based on a MAC address in the Wi-Fi signal, and a distance between the positioning apparatus and the Wi-Fi device may be calculated based on various features such as signal strength in the signal. Finally, the positioning apparatus locally analyzes data or sends the data to a location server, to obtain a geographical location of the to-be-positioned Wi-Fi device. A main application scenario of positioning the Wi-Fi device may include positioning a smart terminal (searching for a mobile phone, a tablet computer, or a hand band, for example, searching for a child carrying a smart band in a shopping mall), searching for a car in a garage, positioning a malicious terminal that accesses a private router, positioning a malicious Wi-Fi device (for example, a video surveillance device such as a hidden camera), and the like.

This application provides a positioning method. The method is applied to a first electronic device. A to-be-positioned target device and a predetermined moving track of the first electronic device are determined, Wi-Fi feature information of a second electronic device and motion information of the first electronic device are obtained in a process in which the first electronic device moves along the predetermined moving track, and location information of the target device can be finally displayed. The to-be-positioned target device may be the first electronic device, or may be another electronic device different from the first electronic device. When the target device is the first electronic device, the second electronic device is a Wi-Fi hotspot apparatus with a known geographical location; and when the target device is another electronic device different from the first electronic device, the second electronic device is the target device.

In an existing center-of-mass positioning method, multilateral positioning method, triangular positioning method, and fingerprint-based positioning method, a plurality of (two or more) Wi-Fi hotspot apparatuses need to be used as known reference points, and the target device cannot be positioned by using only one electronic device. In addition, in the center-of-mass positioning method and the fingerprint-based positioning method, positioning precision depends on distribution density of known reference points in a current range in which a signal can be received. In the multilateral positioning method and the triangular positioning method, positioning precision is easily interfered with by a signal in an environment. In the fingerprint-based positioning method, an indoor scenario usually further needs to be divided into grids in an offline stage, and then data is collected at each division point to form a fingerprint database. Time and labor are consumed. Compared with the conventional technology, in the positioning method in this application, the target device can be positioned by using one electronic device, there is no need to be two or more known reference points (Wi-Fi hotspot apparatuses), and an offline fingerprint database is not relied on, to avoid time, labor, and environment constraints, reduce impact exerted by interference in an environment, and improve positioning precision.

The positioning method provided in embodiments of this application may be applied to an electronic device such as a mobile phone, a tablet computer, a wearable device, a vehicle-mounted device, an augmented reality (augmented reality, AR)/virtual reality (virtual reality, VR) device, a notebook computer, an ultra-mobile personal computer (ultra-mobile personal computer, UMPC), a netbook, or a personal digital assistant (personal digital assistant, PDA). A specific type of the electronic device is not limited in embodiments of this application. The first electronic device, the second electronic device, and the target device each may be any one of the foregoing types of electronic devices, and include components of the following electronic device.

For example, FIG. 1 is a schematic diagram of a structure of an electronic device 100.

The electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a compass 190, a motor 191, an indicator 192, a camera 193, a display 194, a subscriber identification module (subscriber identification module, SIM) card interface 195, and the like.

It may be understood that the structure shown in this embodiment of this application does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent components, or may be integrated into one or more processors. The processor may be configured to execute a moving track estimation algorithm and a positioning algorithm, to implement positioning of a target device.

The controller may generate an operation control signal based on instruction operation code and a time sequence signal, to complete control of instruction reading and instruction execution.

A memory may be further disposed in the processor 110, and is configured to store instructions and data. For example, a first electronic device may store a moving track estimation algorithm and a positioning algorithm. For example, the memory in the processor 110 may be a cache. The memory may store instructions or data that is just used or is cyclically used by the processor 110. If the processor 110 needs to use the instructions or the data again, the processor may directly invoke the instructions or the data from the memory. This avoids repeated access and reduces waiting time of the processor 110, thereby improving data processing or instruction execution efficiency of the electronic device 100.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, the SIM interface, the USB port, and/or the like. The USB port 130 is a port that conforms to a USB standard specification, and may be specifically a mini USB port, a micro USB port, a USB Type-C port, or the like. The USB port 130 may be configured to be connected to the charger to charge the electronic device 100, or may be configured to transmit data between the electronic device 100 and a peripheral device. The USB port 130 may alternatively be configured to be connected to a headset, to play audio by using the headset.

It may be understood that an interface connection relationship between the modules shown in this embodiment of this application is merely an example for description, and constitutes no limitation on the structure of the electronic device 100. In some other embodiments of this application, different interface connection manners in the foregoing embodiments or a combination of a plurality of interface connection manners may alternatively be used for the electronic device 100.

The charging management module 140 is configured to receive a charging input from the charger. The charger may be a wireless charger or a wired charger.

The power management module 141 is configured to be connected to the battery 142, the charging management module 140, and the processor 110. The power management module 141 receives an input from the battery 142 and/or the charging management module 140, and supplies power to the processor 110, the internal memory 121, an external memory, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same component.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization.

The mobile communication module 150 may provide a wireless communication solution that is applied to the electronic device 100 and that includes 2G/3G/4G/5G. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules in the mobile communication module 150 may be disposed in a same device as at least some modules in the processor 110.

The wireless communication module 160 may provide a wireless communication solution that is applied to the electronic device 100 and that includes a wireless local area network (wireless local area network, WLAN) (for example, a Wi-Fi network), Bluetooth (Bluetooth. BT), a global navigation satellite system (global navigation satellite system. GNSS), frequency modulation (frequency modulation, FM), a near field communication (near field communication, NFC) technology, an infrared (infrared, IR) technology, and the like. The wireless communication module 160 may be one or more components integrating at least one communication processing module. The wireless communication module 160 receives an electromagnetic wave through the antenna 2, modulates and filters an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2. The first electronic device may obtain a Wi-Fi feature by using a Wi-Fi network interface card carried in the first electronic device, and the Wi-Fi network interface card may be the wireless communication module 160. When the first electronic device and a second electronic device establish a communication connection or is in a network covered by a same Wi-Fi route, the first electronic device sends an instruction "Please periodically send data xxx to me" to the second electronic device in a normal service mode by using the wireless communication module 160, and receives the data xxx sent by the second electronic device by using the wireless communication module 160. Alternatively, when the first electronic device does not establish a communication connection to a second electronic device, and is not in a network covered by a same Wi-Fi route with the second electronic device, the first electronic device sets the wireless communication module 160 to a monitoring mode (that is, a sniffing mode), captures Wi-Fi data at an air interface, and filters out Wi-Fi data of the second electronic device. In addition, if a user chooses to position a current device, the user needs to have been connected to a nearby known Wi-Fi hotspot apparatus, and the first electronic device requests geographical location information of a connected Wi-Fi hotspot from a server by using the wireless communication module 160.

The electronic device 100 may implement a display function through the GPU, the display 194, the application processor, and the like. The GPU is a microprocessor for image processing, and is connected to the display 194 and the application processor. The GPU is configured to; perform mathematical and geometric computation, and render an image. The processor 110 may include one or more GPUs. and execute a program instruction to generate or change display information.

The display 194 is configured to display an image, a video, and the like. The display 194 includes a display panel. The display panel may be a liquid crystal display (liquid crystal display. LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a mini-LED, a micro-LED, a micro-OLED, a quantum dot light emitting diode (quantum dot light emitting diode, QLED), or the like. In some embodiments, the electronic device 100 may include one or more displays 194. For example, in a positioning process, the first electronic device displays a moving track of the first electronic device in real time by using the display 194, and in a search stage, guides the user in real time in a form of a radar map or a map to search for the target device.

In some embodiments of this application, when the display panel is made of a material such as an OLED, an AMOLED, or a FLED, the display 194 in FIG. 1 may be bent. Herein, that the display 194 may be bent means that any part of the display may be bent at any angle and may be kept at the angle.

The display 194 of the electronic device 100 may be a flexible screen. Currently, the flexible screen attracts much attention because of unique features and huge potential of the flexible screen. Compared with a conventional display, the flexible display has features of strong flexibility and bendability, and can provide the user with a new bendability-based interaction mode, to meet more requirements of the user for the electronic device.

The electronic device 100 can implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or more cameras 193.

The digital signal processor is configured to process a digital signal, and may process another digital signal in addition to the digital image signal. For example, when the electronic device 100 selects a frequency, the digital signal processor is configured to perform Fourier transformation on frequency energy.

The video codec is configured to compress or decompress a digital video. The electronic device 100 may support one or more video codecs. Therefore, the electronic device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transmission between human brain neurons, and may further continuously perform self-learning. The NPU may be used to implement applications such as intelligent cognition of the electronic device 100, for example, image recognition, facial recognition, voice recognition, and text understanding.

The external memory interface 120 may be configured to be connected to an external storage card, for example, a micro SD card, to extend a storage capability of the electronic device 100. The external memory card communicates with the processor 110 through the external memory interface 120, to implement a data storage function. For example, files such as music and a video are stored in the external storage card.

The internal memory 121 may be configured to store one or more computer programs, and the one or more computer programs include instructions. The processor 110 may run the instructions stored in the internal memory 121, so that the electronic device 101 performs a volume control method provided in some embodiments of this application, various applications, data processing, and the like. The internal memory 121 may include a program storage area and a data storage area. The program storage area may store an operating system. The program storage area may further store one or more applications (such as Gallery and Contacts), and the like. The data storage area may store data (for example, a photo and a contact) created in a use process of the electronic device 101, and the like. In addition, the internal memory 121 may include a high-speed random access memory, or may include a nonvolatile memory, for example, one or more magnetic disk storage devices, a flash memory device, or a universal flash storage (universal flash storage, UFS). In some embodiments, the processor 110 may run the instructions stored in the internal memory 121 and/or the instructions stored in the memory that is disposed in the processor 110, so that the electronic device 101 performs a volume control method provided in embodiments of this application, another application, and data processing. The electronic device 100 may implement an audio function, for example, music playing or recording, by using the audio module 170, the speaker 170A, the receiver 170B, the microphone 170C, the headset jack 170D, the application processor, and the like.

The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The gyro sensor 180B may be configured to determine a moving posture of the electronic device 100. In some embodiments, the electronic device 100 may obtain motion data of the electronic device 100 by using the gyro sensor 180B. For example, angular velocities of the electronic device 100 around three axes (that is, X, Y, and Z axes) may be obtained. The gyro sensor 180B may be configured to implement image stabilization during photographing. For example, when the shutter is pressed, the gyro sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyro sensor 180B may be further used in a navigation scenario and a motion sensing game scenario.

The magnetic sensor 180D includes a motion sensor such as a three-axis magnetometer. In some embodiments, the electronic device 100 may obtain the motion data of the electronic device 100 by using the magnetic sensor 180D, for example, may further obtain a direction of the electronic device 100.

The acceleration sensor 180E may detect magnitude of acceleration of the electronic device 100 in all directions (usually three axes), and may be further configured to identify a posture of the electronic device. For example, the acceleration sensor 180E may be used to obtain acceleration and attitude information of the first electronic device along each axis.

In some embodiments, the electronic device 100 may further include a pedometer. A quantity of steps of a user holding the electronic device in hand may be obtained by using the pedometer.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J.

The touch sensor 180K is also referred to as a "touch panel". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor. The touch sensor may transfer the detected touch operation to the application processor to determine a type of the touch event. A visual output related to the touch operation may be provided on the display 194. In some other embodiments, the touch sensor 180K may also be disposed on a surface of the electronic device 100 at a location different from that of the display 194.

Figure 2:
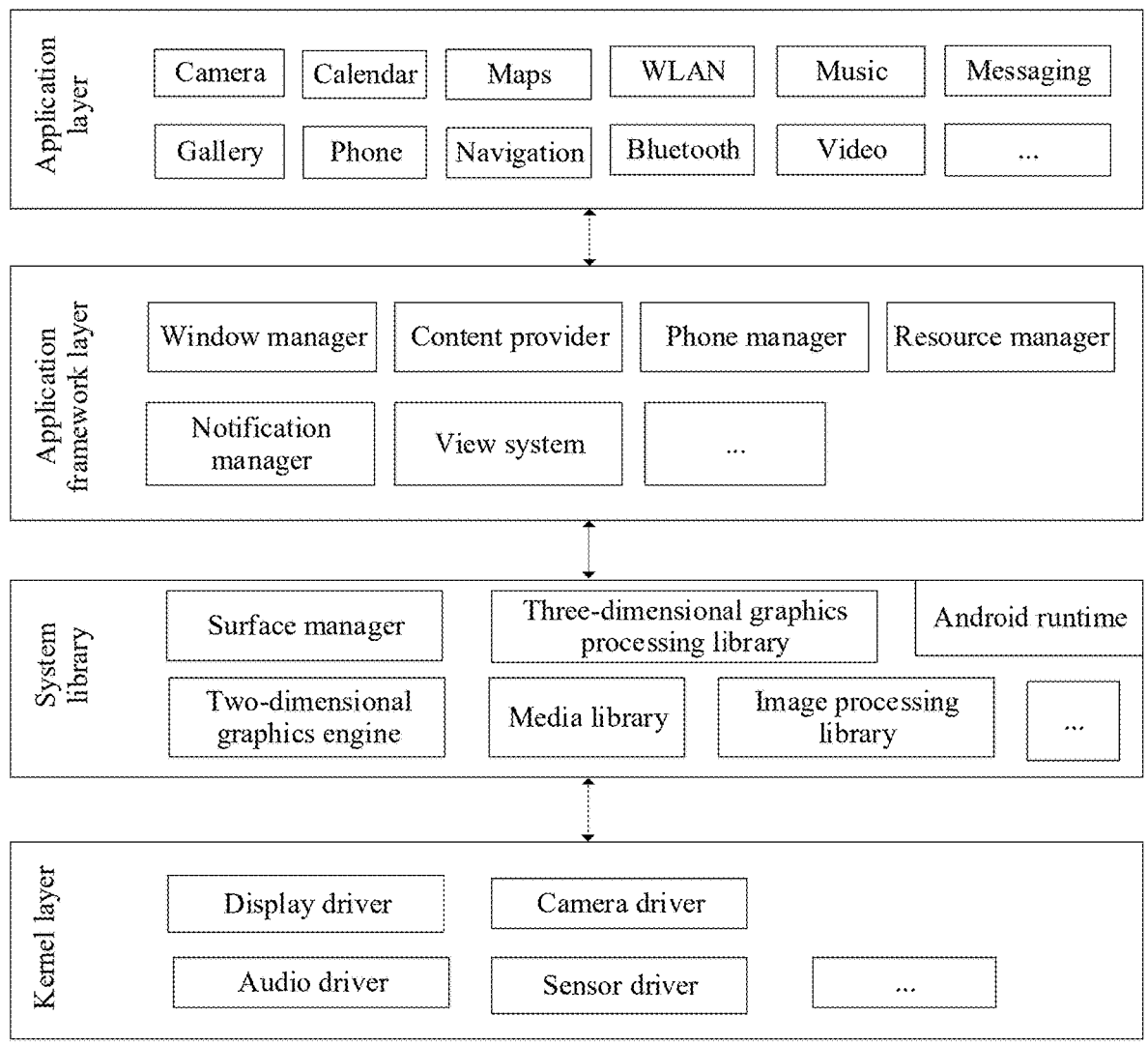
FIG. 2 is a schematic diagram of a software structure of an electronic device according to an embodiment of this application.

FIG. 2 is a block diagram of a software structure of an electronic device 100 according to this embodiment of this application. In a layered architecture, software is divided into several layers, and each layer has a clear role and task. The layers communicate with each other through a software interface. In some embodiments, an Android system is divided into four layers: an application layer, an application framework layer, an Android runtime (Android runtime) and system library, and a kernel layer from top to bottom. The application layer may include a series of application packages.

As shown in FIG. 2, the application packages may include applications such as Camera. Gallery, Calendar, Phone, Maps, Navigation, WLAN, Bluetooth. Music, Video, and Messaging.

The application package may further include an application of the first application mentioned below.

The application framework layer provides an application programming interface (application programming interface, API) and a programming framework for an application at the application layer, and the application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of a display, and determine whether there is a status bar, a lock screen, a screen capture, or the like.

The content provider is configured to store and obtain data, so that the data can be accessed by an application. The data may include a video, an image, audio, calls that are made and received, a browsing history, a bookmark, an address book, and the like.

The view system includes visual controls such as a control for displaying a text and a control for displaying an image. The view system may be configured to construct an application. A display interface may include one or more views. For example, a display interface including an SMS message notification icon may include a text display view and an image display view.

The phone manager is configured to provide a communication function for the electronic device 100, for example, management of a call status (including answering, declining, or the like).

The resource manager provides various resources for the application, for example, a localized string, an icon, a picture, a layout file, and a video file.

The notification manager enables the application to display notification information in the status bar, and may be configured to convey a notification-type message. The displayed notification information may automatically disappear after a short pause without a need to perform user interaction, or user interaction may be performed to perform a next step. In this application, the notification manager may notify the user of a message related to positioning of the target device.

The notification manager may alternatively be a notification that appears in a top status bar of the system in a form of a graph or a scroll bar text, for example, a notification of an application that is run in the background, or may be a notification that appears on the screen in a form of a dialog window. For example, text information is prompted in the status bar, a prompt tone is produced, the electronic device vibrates, or an indicator blinks.

The system library may include a plurality of functional modules, for example, a surface manager (surface manager), a media library (media libraries), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording of a plurality of common audio and video formats, a static image file, and the like. The media library may support a plurality of audio and video coding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

With reference to a scenario in which the first application is opened, the following describes an example of a working procedure of software and hardware of an electronic device 100.

When the touch sensor 180K receives a touch operation, a corresponding hardware interrupt is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. For example, the touch operation is a touch tap operation, and a control corresponding to the tap operation is a control of an icon of the first application. The first application invokes an interface of the application framework layer to open the first application, invokes the kernel layer to start a driver such as Wi-Fi, and receives data from another electronic device by using the wireless communication module 160, for example, Wi-Fi feature data from the target device or a Wi-Fi hotspot apparatus with a known geographical location.

For ease of understanding, in the following embodiments of this application, a first electronic device having the structures shown in FIG. 1 and FIG. 2 is used as an example, and a positioning method provided m an embodiment of this application is specifically described with reference to accompanying drawings.

It should be noted that in this embodiment of this application, a to-be-positioned target device may be the first electronic device, or may be another electronic device different from the first electronic device. This is not specifically limited in this application. If the to-be-positioned target device is the first electronic device, in a positioning process, the to-be-positioned target device may be positioned with reference to another electronic device with a known geographical location.

It should be further noted that, in this embodiment of this application, the to-be-positioned target device may be a device that is once-connected to the first electronic device or a device connected to same Wi-Fi, for example, a kids watch, a sports band, a tablet computer, or a vehicle; or the to-be-positioned target device may be a device detected by the first electronic device through scanning, for example, a malicious terminal or a hidden camera that accesses a private router.

Case 1: The to-be-positioned target device and the first electronic device are a same device.

Manner 1: A moving manner of positioning is a walking manner.

Figure 3A:
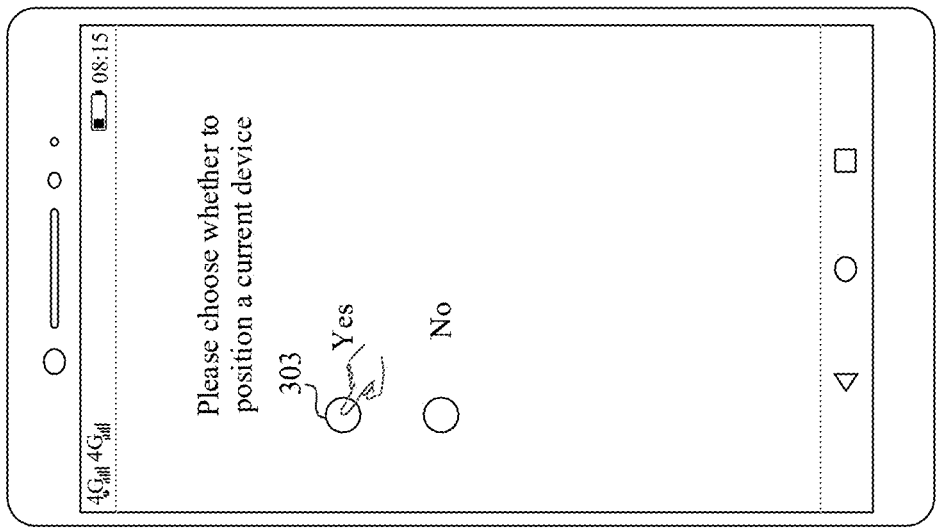
FIG. 3($a$) to FIG. 3($n$) are schematic diagrams of a group of GUIs according to an embodiment of this application.
Figure 3B:
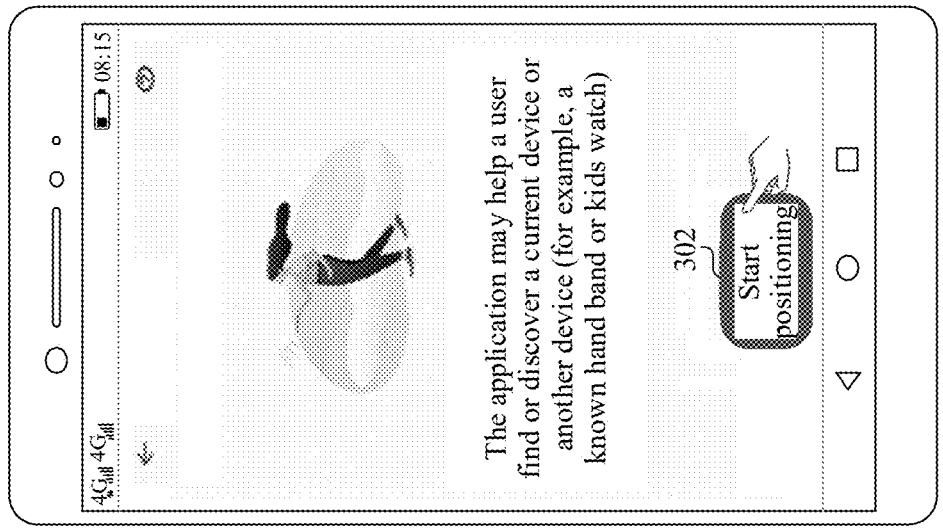
Figure 3C:
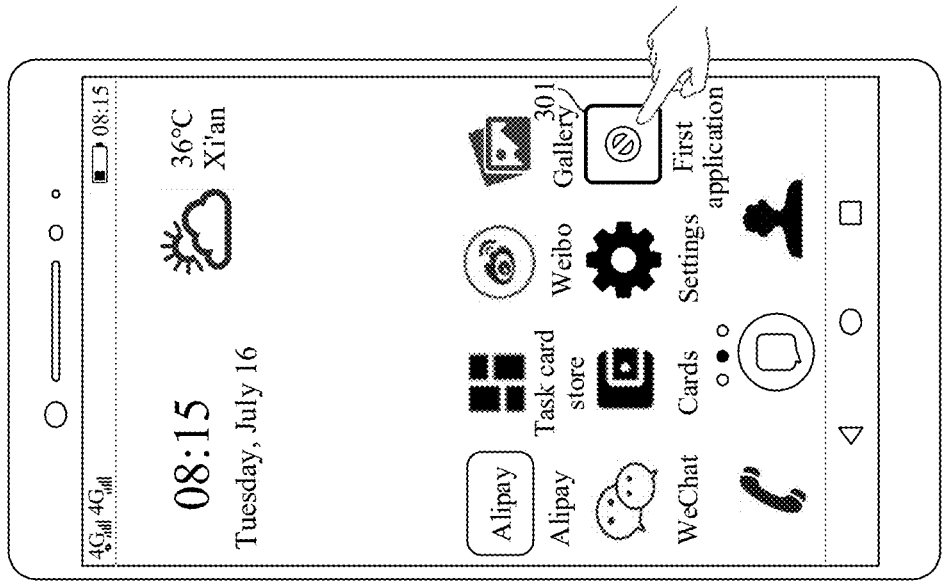
Figures 3D, 3E, 3F:
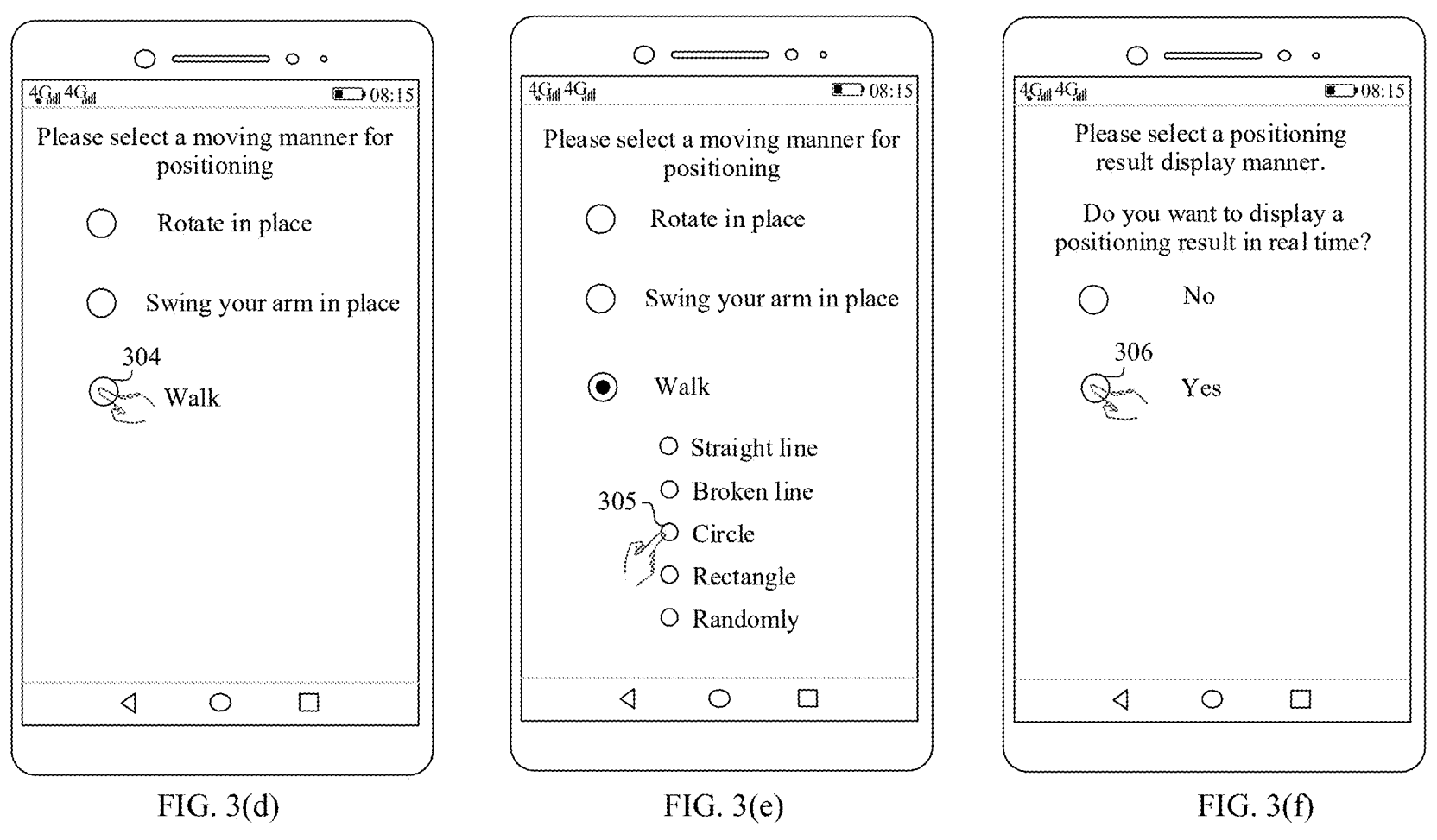
Figure 3N:
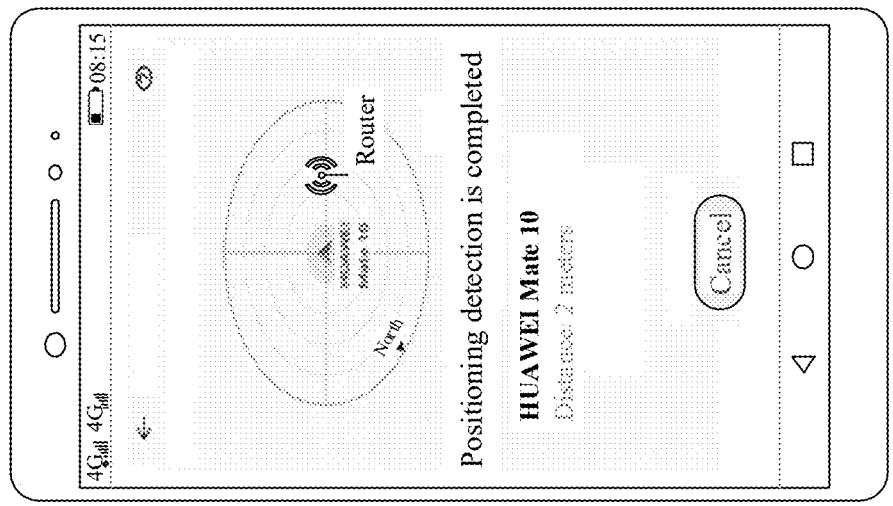

FIG. 3(a) to FIG. 3(n) show a group of graphical user interfaces (graphical user interface, GUI) of a first electronic device. Herein, FIG. 3(a) to FIG. 3(m) show a process in which the first electronic device may determine a location of the first electronic device in a first application.

Refer to a GUI shown in FIG. 3(a). The GUI is a home screen of the first electronic device. After detecting an operation that a user taps an icon 301 of the first application on the home screen, the first electronic device may open a positioning application, and display a GUI shown in FIG. 3(b). The GUI may be referred to as a positioning description interface.

Refer to the GUI shown in FIG. 3(b). The interface of the first electronic device may prompt the user with a function of the first application, for example, may display "The application may help a user find or discover a current device or another device (for example, a known hand band or kids watch)". After reading a positioning description, the user selects "Start positioning". After the first electronic device detects an operation that the user taps an icon 302 of "Start positioning", the first electronic device displays a GUI shown in FIG. 3(c).

Refer to the GUI shown in FIG. 3(c). The interface of the first electronic device may display "Please choose whether to position a current device". If the user taps an icon 303 corresponding to "Yes", after detecting an operation that the user taps the icon 303 corresponding to "Yes", the first electronic device may display a GUI shown in FIG. 3(d). If the user chooses to position the current device when the user has accessed a nearby known Wi-Fi hotspot apparatus, the first electronic device requests geographical location information of a connected Wi-Fi hotspot from a server by using the Wi-Fi network interface card.

Refer to the GUI shown in FIG. 3(d). The interface of the first electronic device may display "Please select a moving manner for positioning" and options "Rotate in place", "Swing your arm in place", and "Walk" of a plurality of moving manners. If the user taps an icon 304 corresponding to "Walk", after detecting an operation that the user taps the icon 304 corresponding to "Walk", the first electronic device may display a GUI shown in FIG. 3(e).

Refer to the GUI shown in FIG. 3(e). The interface of the first electronic device may further display a plurality of options in a walking manner, including but not limited to "Straight line", "Broken line", "Circle", "Rectangle", and "Randomly". The user may further select a corresponding option. For example, after detecting an operation that the user taps an icon 305 corresponding to "Circle", the first electronic device may display a GUI shown in FIG. 3(f).

Refer to the GUI shown in FIG. 3(f). The interface of the first electronic device may display "Please select a positioning result display manner". For example, the interface displays "Do you want to display a positioning result in real time?". If the user taps an icon of "Yes", after detecting an operation that the user taps the icon 306 of "Yes", the first electronic device may display a GUI shown in FIG. 3(g).

Refer to the GUI shown in FIG. 3(g). The interface of the first electronic device may display "Moving manner description". The moving manner description may be "Please hold the device in hand, slowly move along a circular track in a current environment, and keep the device horizontal in a moving process". After ensuring that the user reads and understands the moving manner description, the user may tap an icon 307 of "Know". After detecting an operation that the user taps the icon 307 of "Know", the first electronic device may display a GUI shown in FIG. 3(h).

Refer to the GUI shown in FIG. 3(h). The interface of the first electronic device may display "Enabling a hardware positioning capability". After completing enabling of the hardware positioning capability, the first electronic device may display a GUI shown in FIG. 3(i).

Refer to the GUI shown in FIG. 3(i). A location indicated by an arrow in the figure is a current location of the user, the interface of the first electronic device may prompt the user with "Please slowly walk along a circle", and the user may hold the first electronic device in hand and slowly walk. If the user does not walk in the moving manner selected in FIG. 3(e), a GUI shown in FIG. 3(j) may be displayed. If the user walks in the moving manner selected in FIG. 3(e), a GUI shown in FIG. 3(k) may be displayed.

Refer to the GUI shown in FIG. 3(j). It can be learned that a walking track of the user is a random walking track (the random walking track is an actual moving track formed in a process in which the user moves), and the moving manner selected by the user in FIG. 3(e) is "Circle" ("Circle" is a predetermined moving track). Therefore, the interface of the first electronic device may display "The actual moving track is different from the selected moving manner, and a positioning result may be inaccurate" (corresponding to first prompt information in this application). In this case, the user may walk along the selected walking track, and a GUI shown in FIG. 3(k) may be displayed.

In some embodiments, when a deviation between the actual moving track and the predetermined moving track is greater than a first threshold, the first electronic device may display the first prompt information. The deviation between the actual moving track and the predetermined moving track may be a distance between a current location of the user and a nearest point on the predetermined moving track. The first threshold may be a default distance value of the first electronic device, or may be a distance value entered by the user. This is not limited in this application.

Refer to the GUI shown in FIG. 3(k). The user may hold the first electronic device in hand and slowly walk from a location (a location of a dot displayed in FIG. 3(j)) to a location indicated by an arrow in the selected moving manner (that is, "Circle"). If the user does not keep a horizontal holding manner of the first electronic device, the interface of the first electronic device may prompt the user with "Please keep a horizontal holding manner of the first electronic device". If the user does not adjust the holding manner of the first electronic device for a long period of time and continues to slowly walk, a GUI shown in FIG. 3(l) may be displayed.

Refer to the GUI shown in FIG. 3(l). The interface of the first electronic device prompts the user with "The posture is abnormal, and a positioning result may be inaccurate" (corresponding to second prompt information in this application). In this case, after adjusting the holding manner of the first electronic device, the user may continue to slowly walk, and a GUI shown in FIG. 3(m) may be displayed.

Figure 3M:
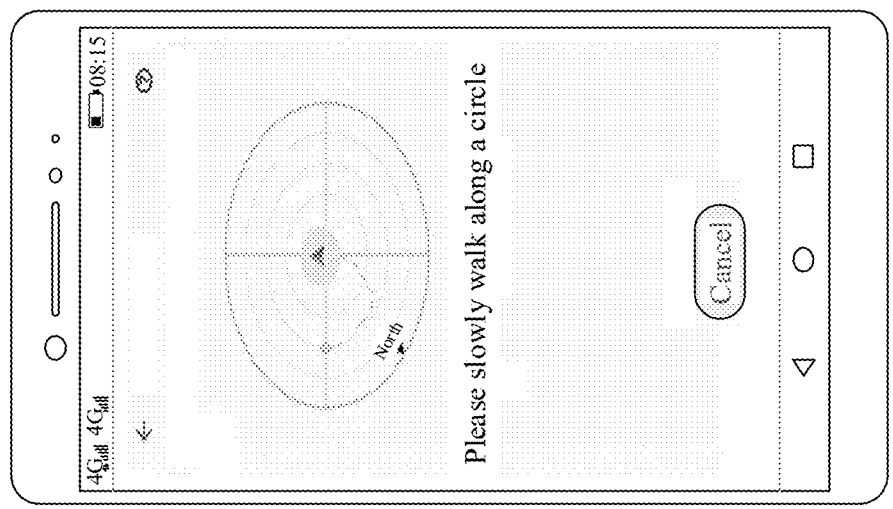

Refer to the GUI shown in FIG. 3(m). The user may hold the first electronic device in hand and slowly walk from a location (a location of a dot displayed in FIG. 3(m)) to a location indicated by an arrow in the selected moving manner (that is, "Circle"), and a GUI shown in FIG. 3(n) is displayed.

Refer to the GUI shown in FIG. 3(n). It can be learned that the first electronic device (HUAWEI Mate 10 shown in FIG. 3(n)) is located at a location that is 2 m away from a router with a known geographical location. In this case, it may be considered that the first electronic device is positioned.

It should be noted that the router shown in FIG. 3(n) is merely an example for description. In some embodiments, the router may be replaced with any other device with a known geographical location. This is not limited.

It should be noted that, in this example, the location indicated by the arrow is a real-time location of the user. In other words, as the user walks, the arrow and a map move. For example, the location of the arrow shown in FIG. 3(i) is an initial location of the user. When the user walks from the location of the dot shown in FIG. 3(j) (that is, the location of the arrow in FIG. 3(i)) to the location of the arrow shown in FIG. 3(j), the location indicated by the arrow is the current location of the user, and the user is still in a center of the map.

In some other embodiments, as the user walks, the arrow moves, but the map does not move in real time.

In this embodiment, similarly, the user may first open the first application, choose to position the current device, and select the moving manner of positioning and the positioning result display manner. For a specific process, refer to the GUIs shown in FIG. 3(a) to FIG. 3(i).

When the interface of the first electronic device displays "Please slowly walk along a circle", the user may hold the first electronic device in hand and slowly walk. If the user does not walk along a walking track selected in FIG. 3(e), a GUI shown in FIG. 4(a) may be displayed.

Figure 4C:
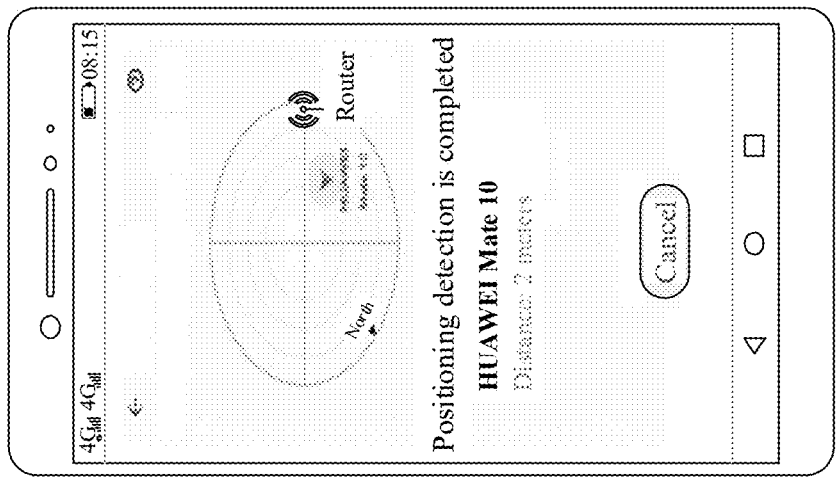
FIG. 4($a$) to FIG. 4($c$) are schematic diagrams of another group of GUIs according to an embodiment of this application.
Figure 4B:
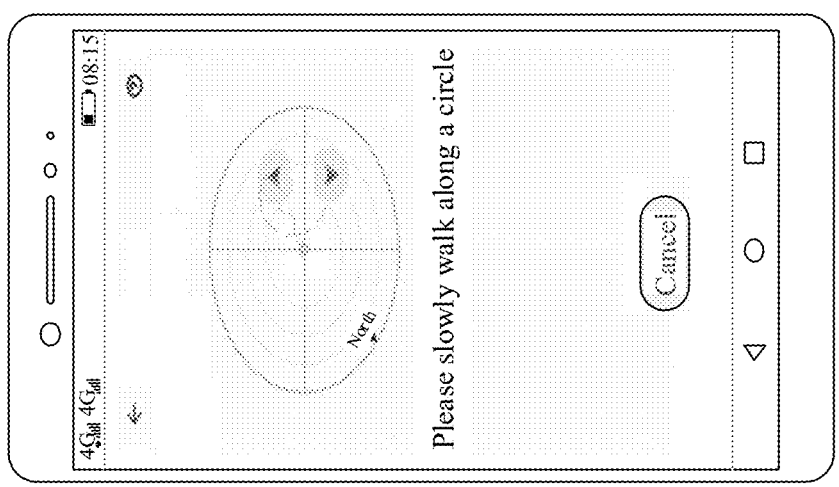
Figure 4A:
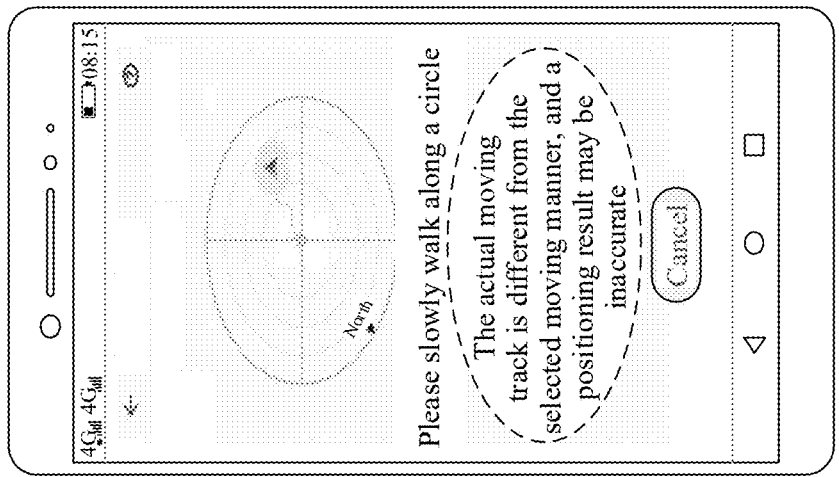

Refer to the GUI shown in FIG. 4(a). It can be learned that the walking track of the user is a random walking track, and the walking track selected by the user in FIG. 3(e) is "Circle". Therefore, the interface of the first electronic device may display "The actual moving track is different from the selected moving manner, and a positioning result may be inaccurate" (corresponding to the first prompt information in this application). In this case, the user may walk along the selected walking track, and a GUI shown in FIG. 4(b) may be displayed.

Refer to the GUI shown in FIG. 4(b). The user may hold the first electronic device in hand and continue to slowly walk along the selected walking track (that is, the circular track). After the user walks for a period of time, if a location of the first electronic device is positioned, a GUI shown in FIG. 4(c) is displayed.

Refer to the GUI shown in FIG. 4(c). It can be learned that the first electronic device (HUAWEI Mate 10 shown in FIG. 4(c)) is located at a location that is 2 m away from the router with a known geographical location. In this case, it may be considered that the first electronic device is positioned.

It should be noted that, in this example, a location of a start point from which the user moves in the map remains unchanged, and the location indicated by the arrow is the real-time location of the user. As the user walks, the arrow moves, but the map does not move as the user moves. For example, when the user walks from a location of an upward arrow shown in FIG. 4(b) to a location of a downward arrow shown in FIG. 4(b), the location indicated by the downward arrow is the current location of the user, and the user is not located in the center of the map.

Manner 2: A moving manner of positioning is an in-place rotation manner.

Figure 5C:
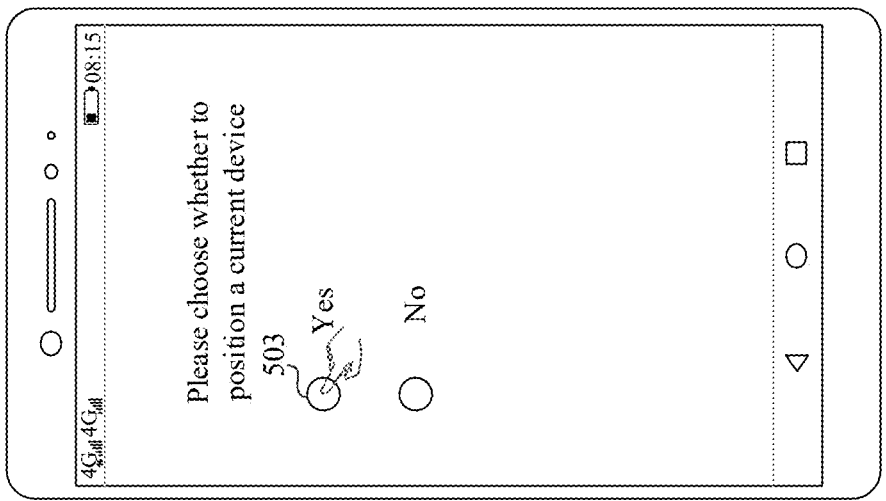
FIG. 5($a$) to FIG. 5($m$) are schematic diagrams of still another group of GUIs according to an embodiment of this application.

FIG. 5(a) to FIG. 5(m) show another group of GUIs of a first electronic device. Refer to a GUI shown in FIG. 5(a). The GUI is a home screen of the first electronic device. After detecting an operation that a user taps an icon 501 of a first application on the home screen, the first electronic device may open a positioning application, and display a GUI shown in FIG. 5(b). The GUI may be referred to as a positioning description interface.

Figure 5B:
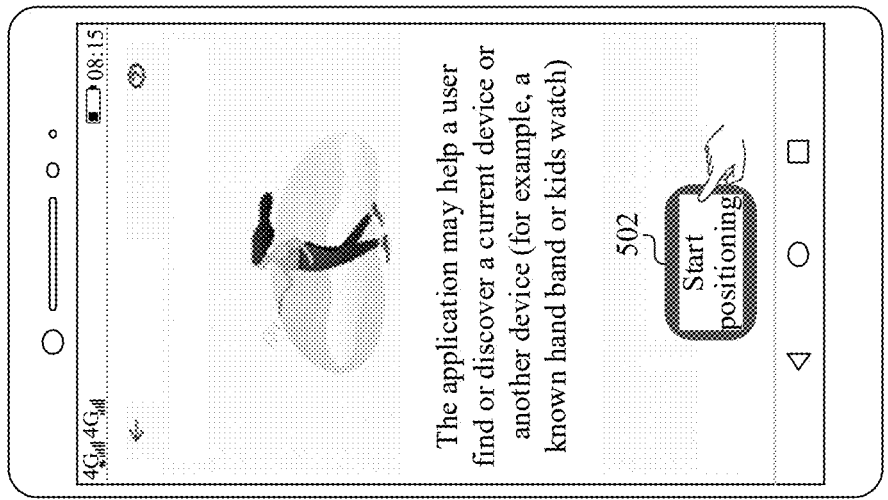
Figure 5A:
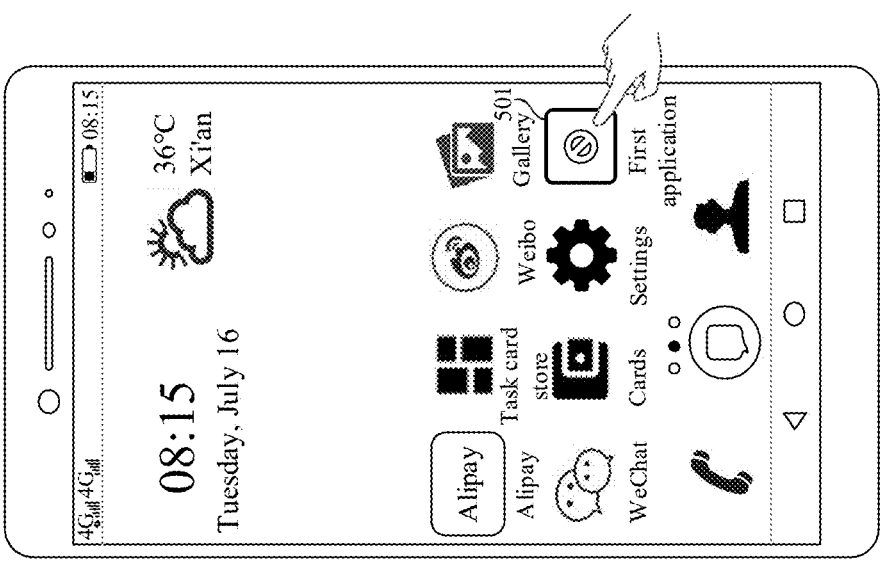

Refer to the GUI shown in FIG. 5(b). The interface may prompt the user with a function of the first application, for example, may display "The application may help a user find or discover a current device or another device (for example, a known hand band or kids watch)". After the first electronic device detects an operation that the user taps an icon 502 of "Start positioning", the first electronic device may start to position a to-be-positioned target device, and display a GUI shown in FIG. 5(c).

Refer to the GUI shown in FIG. 5(c). The interface of the first electronic device may display "Please choose whether to position a current device". If the user taps an icon 503 corresponding to "Yes", after detecting an operation that the user taps the icon 503 corresponding to "Yes", the first electronic device may display a GUI shown in FIG. 5(d).

Figures 5D, 5E, 5F:
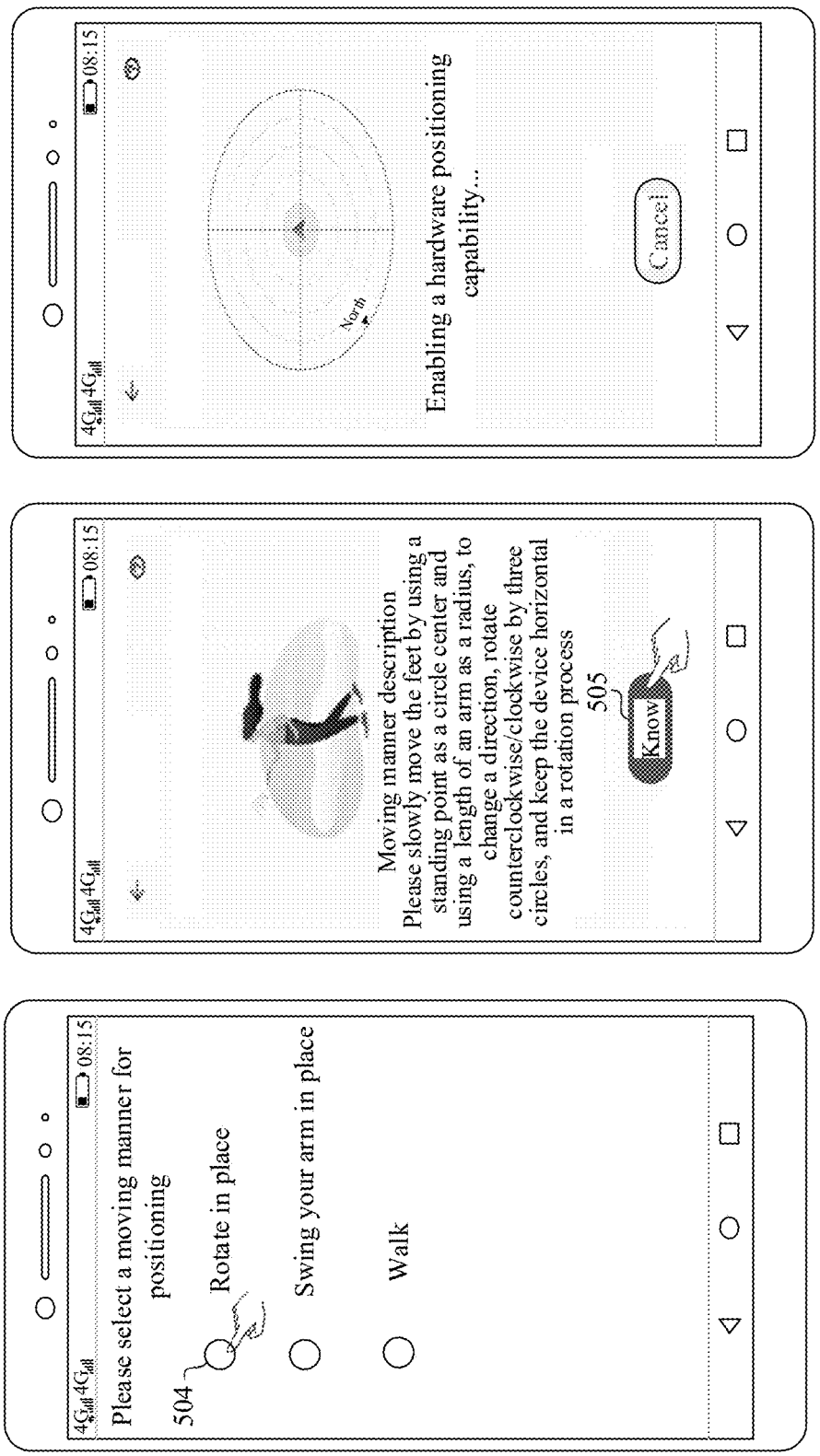

Refer to the GUI shown in FIG. 5(d). The interface of the first electronic device may display "Please select a moving manner for positioning". If the user taps an icon 504 corresponding to "Rotate in place", after detecting an operation that the user taps the icon 504 corresponding to "Rotate in place", the first electronic device may display a GUI shown in FIG. 5(e).

Refer to the GUI shown in FIG. 5(e). The interface of the first electronic device may display "Moving manner description". The moving manner description may be "Please slowly move the feet by using a standing point as a circle center and using a length of an arm as a radius, to change a direction, rotate counterclockwise/clockwise by three circles, and keep the device horizontal in a rotation process". After ensuring that the user reads and understands the moving manner description, the user may tap an icon of "Know". After detecting an operation that the user taps the icon 505 of "Know", the first electronic device may display a GUI shown in FIG. 5(f).

It should be noted that in this embodiment of this application, a quantity of circles of rotation may be obtained based on prior data, and a quantity of circles displayed in the interface may be n, where n is a positive integer greater than or equal to 1. This is not limited.

Refer to the GUI shown in FIG. 5(f). The interface of the first electronic device may display "Enabling a hardware positioning capability". After completing enabling of the hardware positioning capability, the first electronic device may display a GUI shown in FIG. 5(g).

Figure 5I:
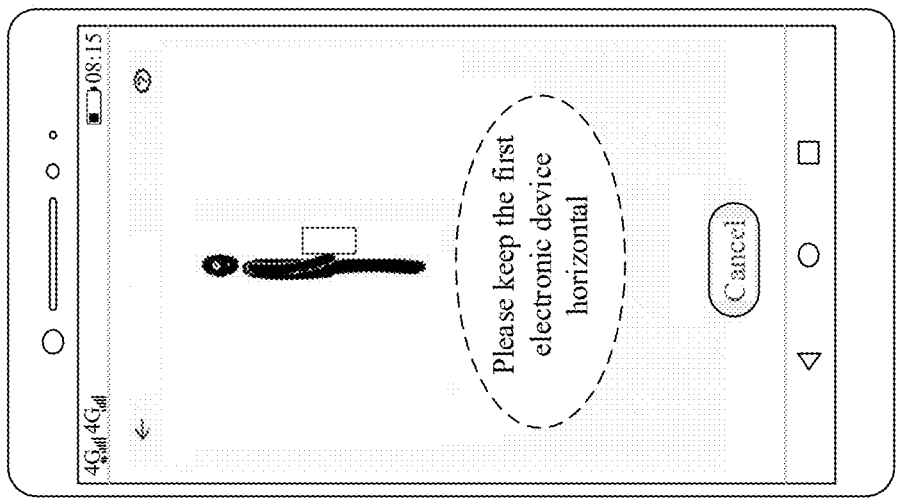
Figure 5H:
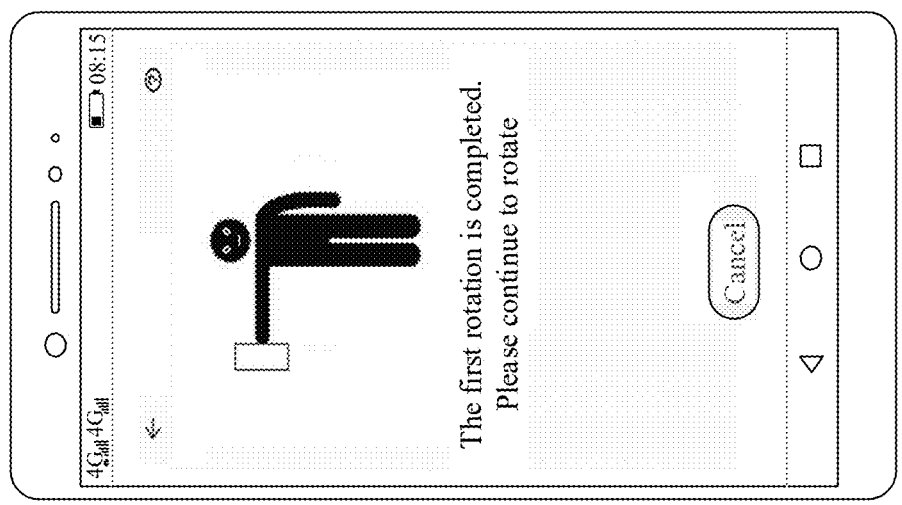
Figure 5G:
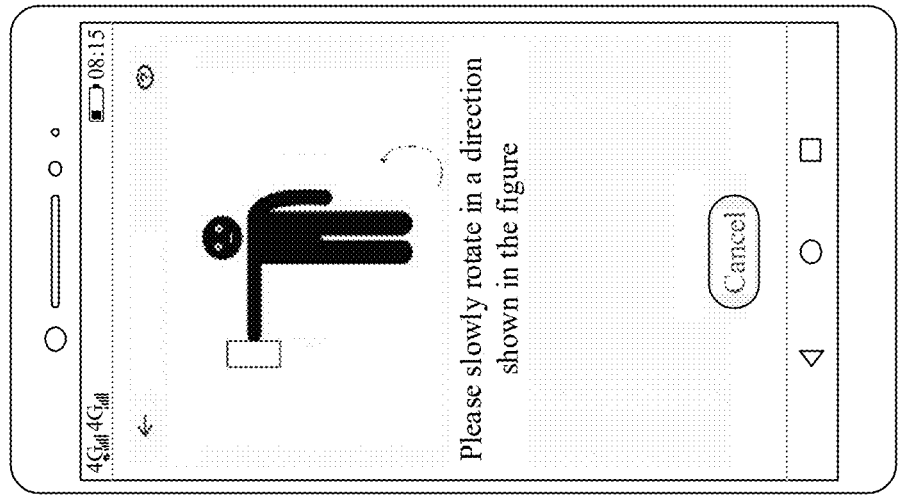

Refer to the GUI shown in FIG. 5(g). The interface of the first electronic device may prompt the user with "Please slowly rotate in a direction shown in the figure". The user rotates based on the prompt in the interface, and a GUI shown in FIG. 5(h) may be displayed.

Refer to the GUI shown in FIG. 5(h). After the first electronic device detects that the user has rotated by one circle based on the prompt, the interface of the first electronic device may display "The first rotation is completed. Please continue to rotate", and the user may further rotate based on the prompt.

Refer to a GUI shown in FIG. 5(i). When the first electronic device detects that the arm of the user does not act based on the prompt in the interface, the first electronic device may prompt the user with "Please keep the first electronic device horizontal". If the user does not adjust a state of the first electronic device for a long period of time, a GUI shown in FIG. 5(j) may be displayed.

Figure 5L:
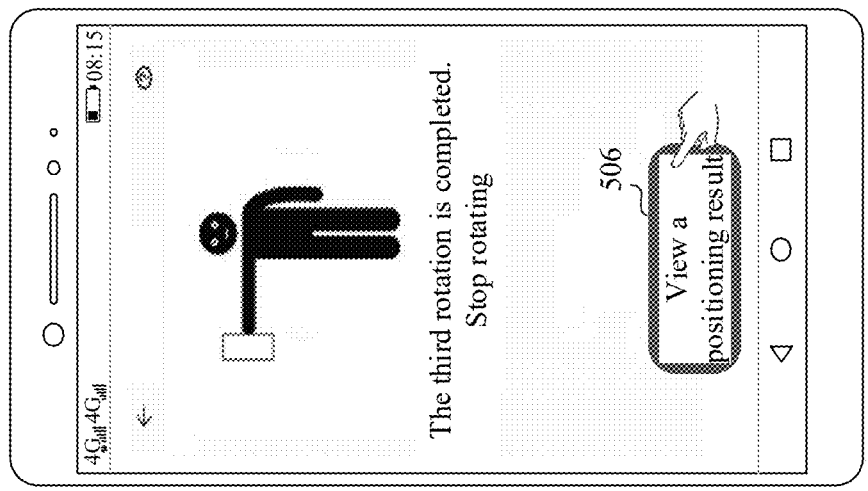
Figure 5K:
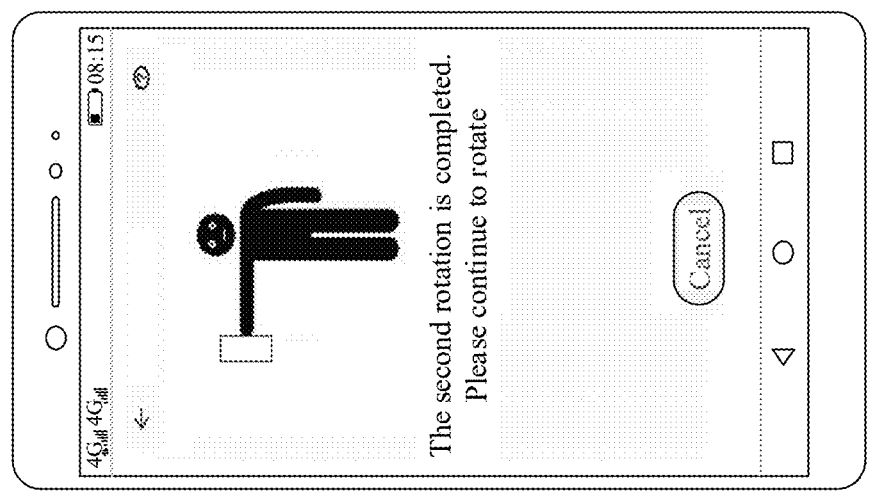
Figure 5J:
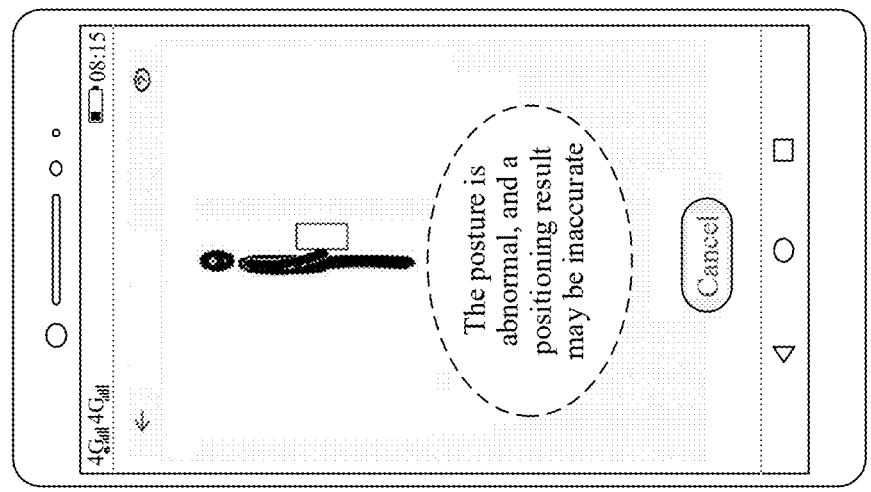

Refer to the GUI shown in FIG. 5(j). The interface of the first electronic device prompts the user with "The posture is abnormal, and a positioning result may be inaccurate" (corresponding to second prompt information in this application). In this case, the user may rotate again based on the prompt, and a GUI shown in FIG. 5(k) may be displayed.

Refer to the GUI shown in FIG. 5(k). The user may hold the first electronic device in hand and rotate again. After the first electronic device detects that the user has rotated by one circle based on the prompt, the first electronic device may display "The second rotation is completed. Please continue to rotate", and a GUI shown in FIG. 5(l) is displayed.

Refer to the GUI shown in FIG. 5(l). The user may hold the first electronic device in hand and rotate again. After the first electronic device detects that the user has rotated by one circle based on the prompt, the first electronic device may display "The third rotation is completed. Stop rotating". After detecting an operation that the user taps an icon 506 of "View a positioning result", the first electronic device may display a GUI shown in FIG. 5(m).

Figure 5M:
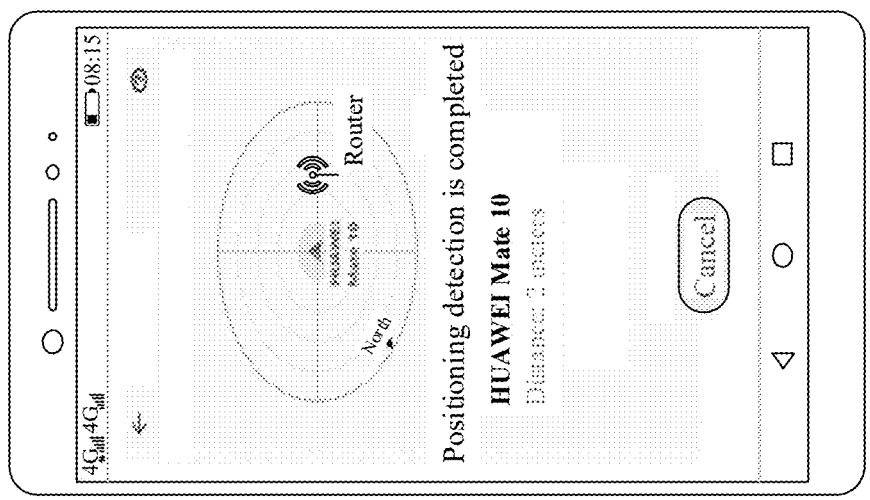

Refer to the GUI shown in FIG. 5(m). It can be learned that the first electronic device (HUAWEI Mate 10 shown in FIG. 5(l)) is located at a location that is 2 m away from a router with a known geographical location. In this case, it may be considered that the first electronic device is positioned.

Manner 3: A moving manner of positioning is an in-place arm swinging manner.

Figure 6C:
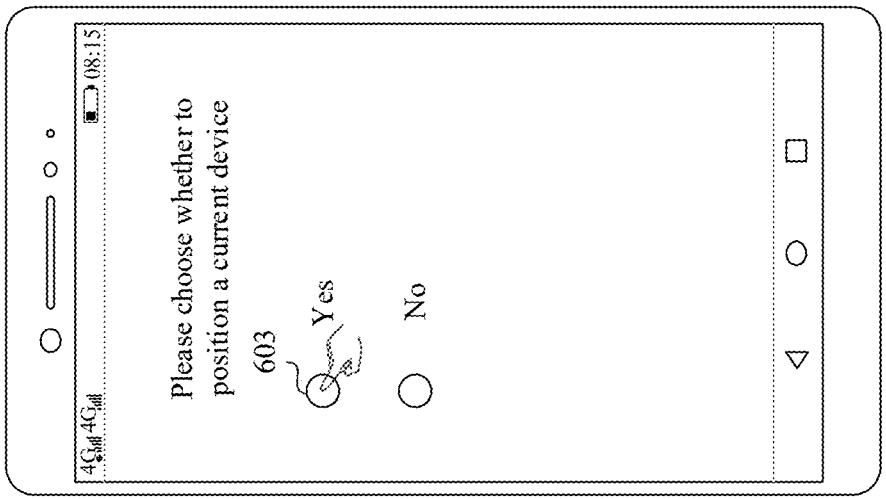
FIG. 6($a$) to FIG. 6($m$) are schematic diagrams of yet another group of GUIs according to an embodiment of this application.

FIG. 6(a) to FIG. 6(m) show still another group of GUIs of a first electronic device. Refer to a GUI shown in FIG. 6(a). The GUI is a home screen of the first electronic device. After detecting an operation that a user taps an icon 601 of a first application on the home screen, the first electronic device may open a positioning application, and display a GUI shown in FIG. 6(b). The GUI may be referred to as a positioning description interface.

Figure 6B:
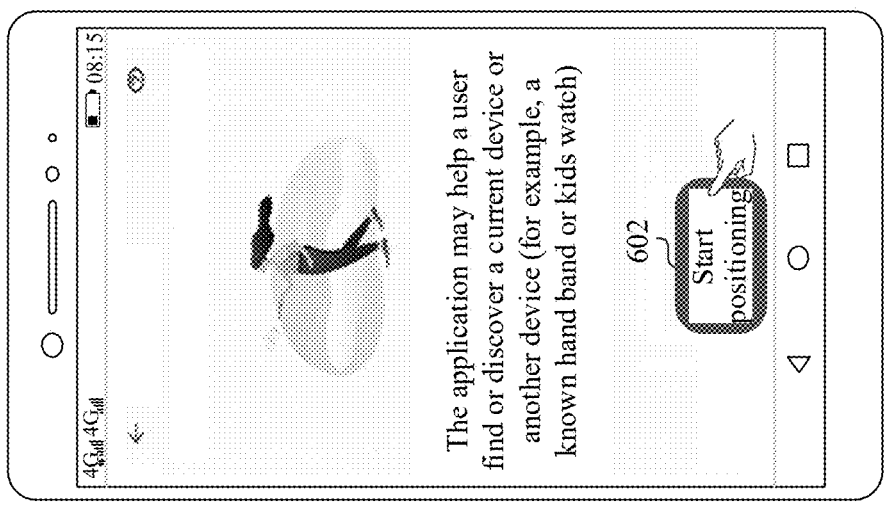
Figure 6A:
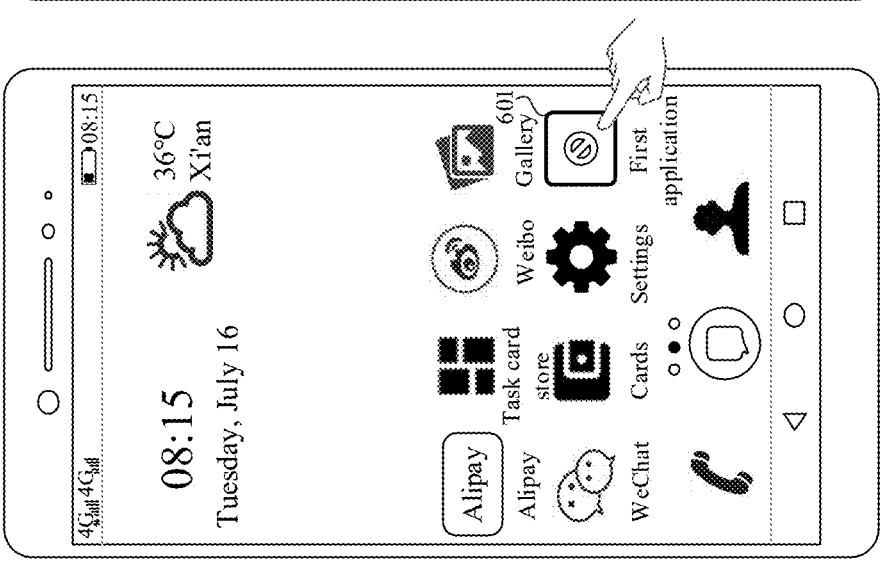

Refer to the GUI shown in FIG. 6(b). The interface may prompt the user with a function of the first application, for example, may display "The application may help a user find or discover a current device or another device (for example, a known hand band or kids watch)". After the first electronic device detects an operation that the user taps an icon 602 of "Start positioning", the first electronic device may start to position a to-be-positioned target device, and display a GUI shown in FIG. 6(c).

Refer to the GUI shown in FIG. 6(c). The interface of the first electronic device may display "Please choose whether to position a current device". If the user taps an icon 603 corresponding to "Yes", after detecting an operation that the user taps the icon 603 corresponding to "Yes", the first electronic device may display a GUI shown in FIG. 6(d).

Figure 6F:
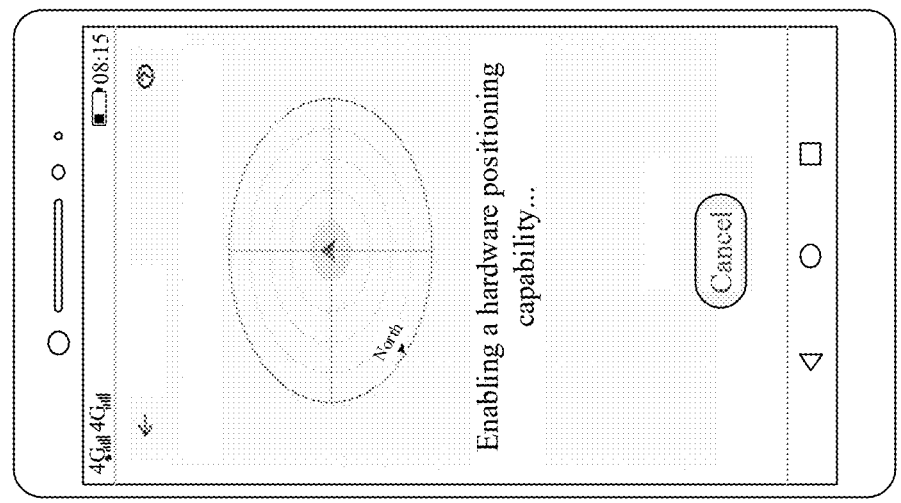
Figure 6E:
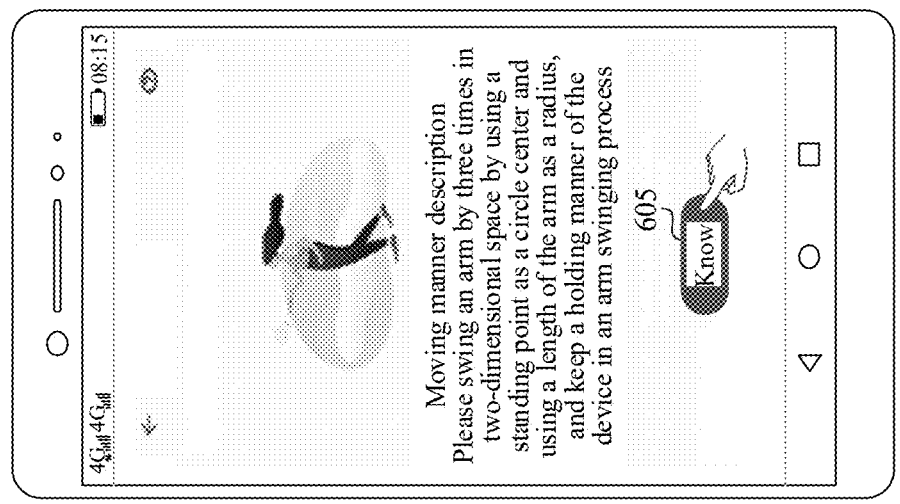
Figure 6D:
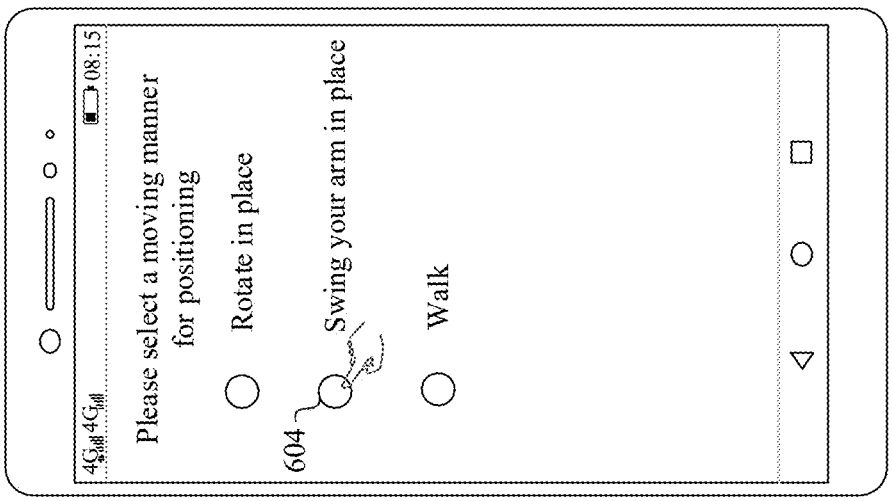

Refer to the GUI shown in FIG. 6(d). The interface of the first electronic device may display "Please select a moving manner for positioning". If the user taps an icon 604 corresponding to "Swing your arm in place", after detecting an operation that the user taps the icon 604 corresponding to "Swing your arm in place", the first electronic device may display a GUI shown in FIG. 6(e).

Refer to the GUI shown in FIG. 6(e). The interface of the first electronic device may display "Moving manner description". The moving manner description may be "Please swing an arm by three times in two-dimensional space by using a standing point as a circle center and using a length of the arm as a radius, and keep a holding manner of the device in an arm swinging process". After ensuring that the user reads and understands the moving manner description, the user may tap an icon of "Know". After detecting an operation that the user taps the icon 605 of "Know", the first electronic device may display a GUI shown in FIG. 6(f).

Similarly, in this embodiment of this application, a quantity of times of swinging the arm may be obtained based on prior data, and a quantity of times displayed in the interface may be n, where m is a positive integer greater than or equal to 1. This is not limited.

Refer to the GUI shown in FIG. 6(f). The interface of the first electronic device may display "Enabling a hardware positioning capability". After completing enabling of the hardware positioning capability, the first electronic device may display a GUI shown in FIG. 6(g).

Figure 6I:
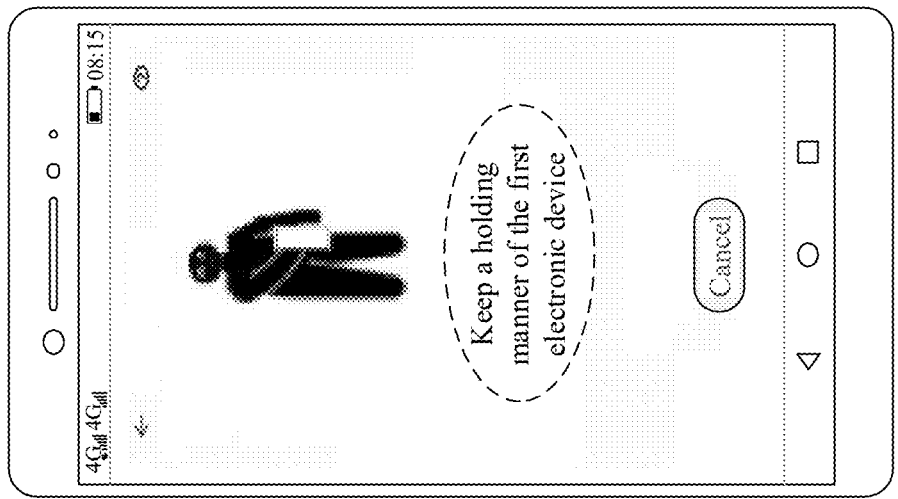
Figure 6H:
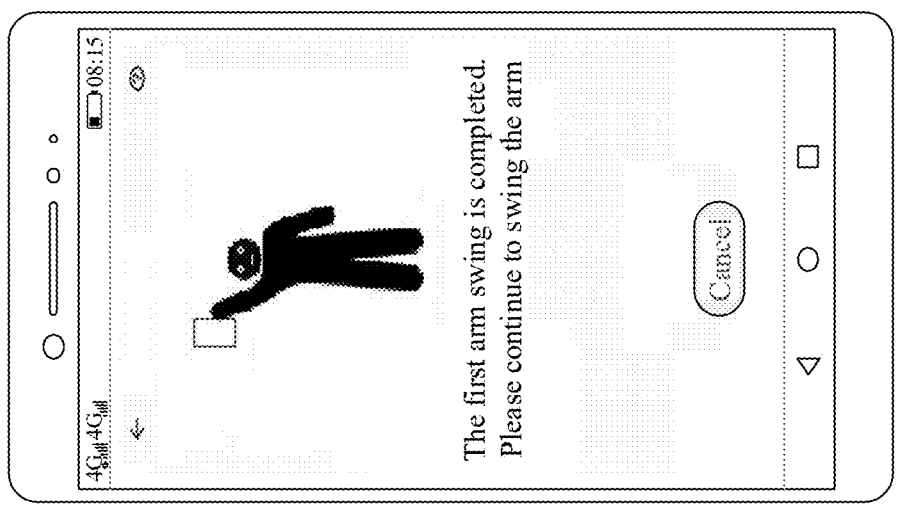
Figure 6G:
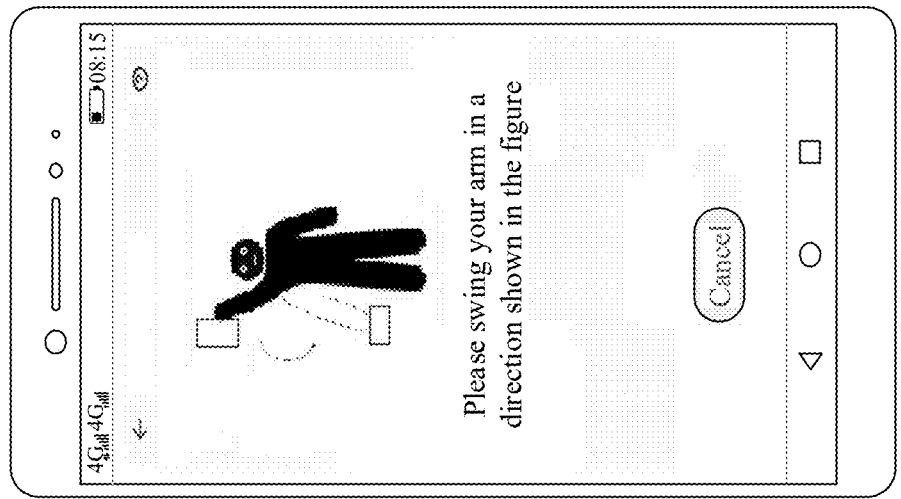

Refer to the GUI shown in FIG. 6(g). The interface of the first electronic device may prompt the user with "Please swing your arm in a direction shown in the figure". The user may swing the arm based on the prompt in the interface, and a GUI shown in FIG. 6(h) may be displayed.

Refer to the GUI shown in FIG. 6(h). After the first electronic device detects that the user has swung the arm for one time based on the prompt, the first electronic device may display "The first arm swinging is completed. Please continue to swing the arm", and the user may further swing the arm based on the prompt.

Refer to a GUI shown in FIG. 6(i). When the first electronic device detects that the arm of the user does not act based on the prompt in the interface, the first electronic device may prompt the user with "Keep a holding manner of the first electronic device". If the user does not adjust the holding manner of the first electronic device for a long period of time, a GUI shown in FIG. 6(j) may be displayed.

Figure 6L:
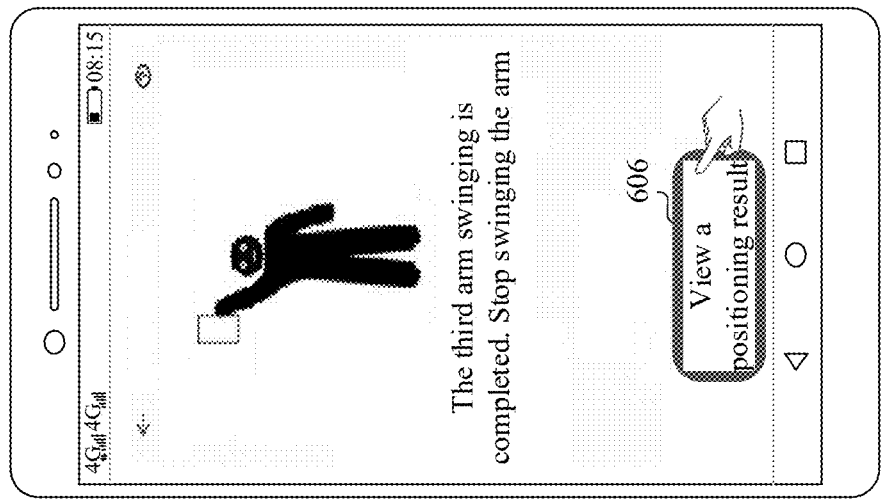
Figure 6K:
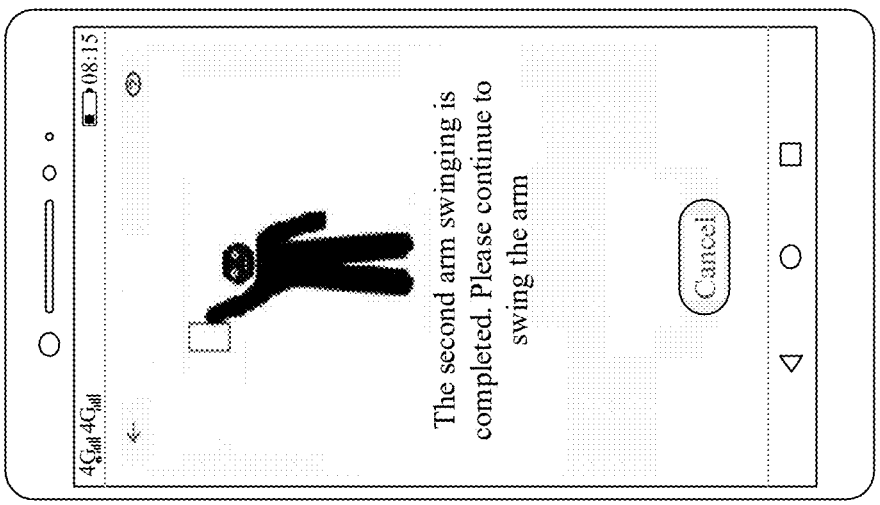
Figure 6J:
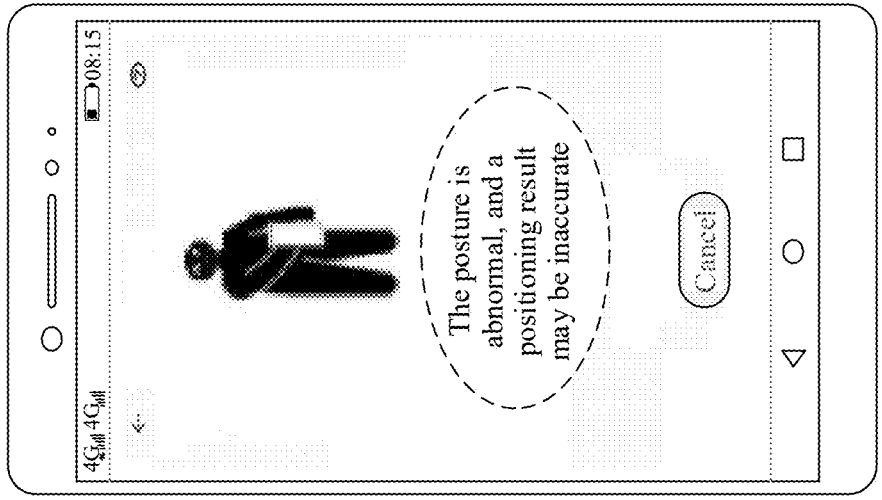

Refer to the GUI shown in FIG. 6(j). The interface of the first electronic device prompts the user with "The posture is abnormal, and a positioning result may be inaccurate" (corresponding to second prompt information in this application). In this case, the user may swing the arm again based on the prompt, and a GUI shown in FIG. 6(k) may be displayed.

Refer to the GUI shown in FIG. 6(k). The user may hold the first electronic device in hand and swing the arm again. After the first electronic device detects that the user has swung the arm for one time based on the prompt, the first electronic device may display "The second arm swinging is completed. Please continue to swing the arm", and the user may further swing the arm based on the prompt.

Refer to the GUI shown in FIG. 6(l). The user may hold the first electronic device in hand and swing the arm again. After the first electronic device detects that the user has swung the arm for one time based on the prompt, the first electronic device may display "The third arm swinging is completed. Stop swinging the arm". After detecting an operation that the user taps an icon 606 of "View a positioning result", the first electronic device may display a GUI shown in FIG. 6(m).

Figure 6M:
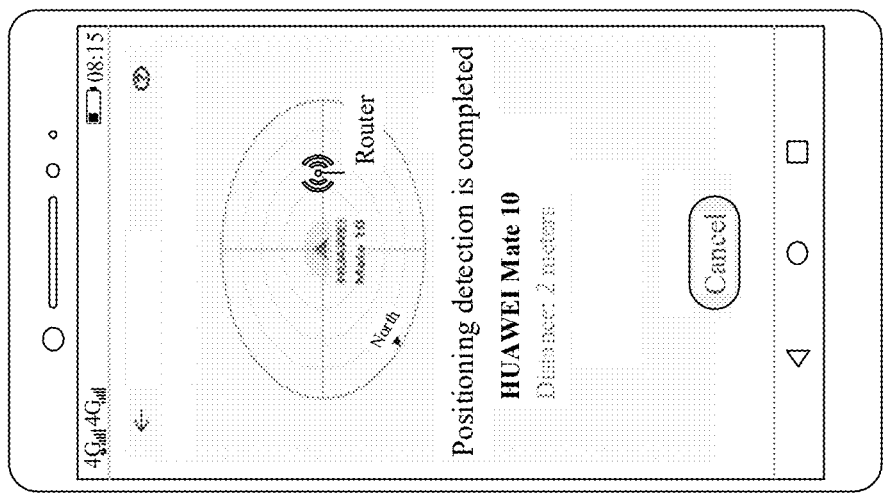

Refer to the GUI shown in FIG. 6(m). It can be learned that the first electronic device (HUAWEI Mate 10 shown in FIG. 6(m)) is located at a location that is 2 m away from a router with a known geographical location. In this case, it may be considered that the first electronic device is positioned.

Case 2: The to-be-positioned target device and the first electronic device am different devices.

Manner 1: A moving manner of positioning is a walking manner.

Figure 7C:
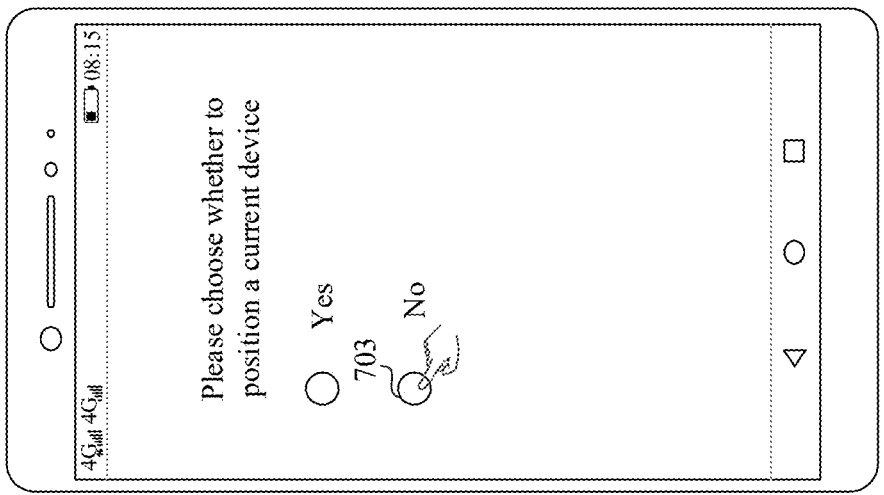
FIG. 7($a$) to FIG. 7($z$) are schematic diagrams of still yet another group of GUIs according to an embodiment of this application.
Figure 7B:
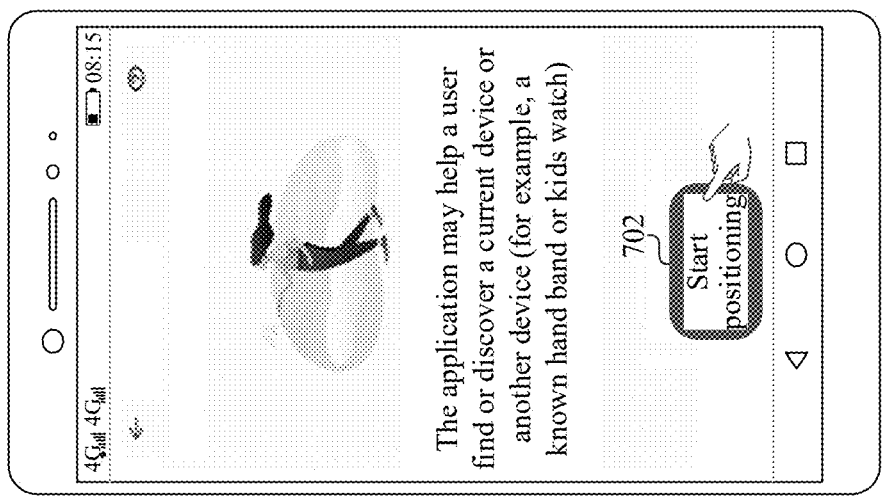
Figure 7A:
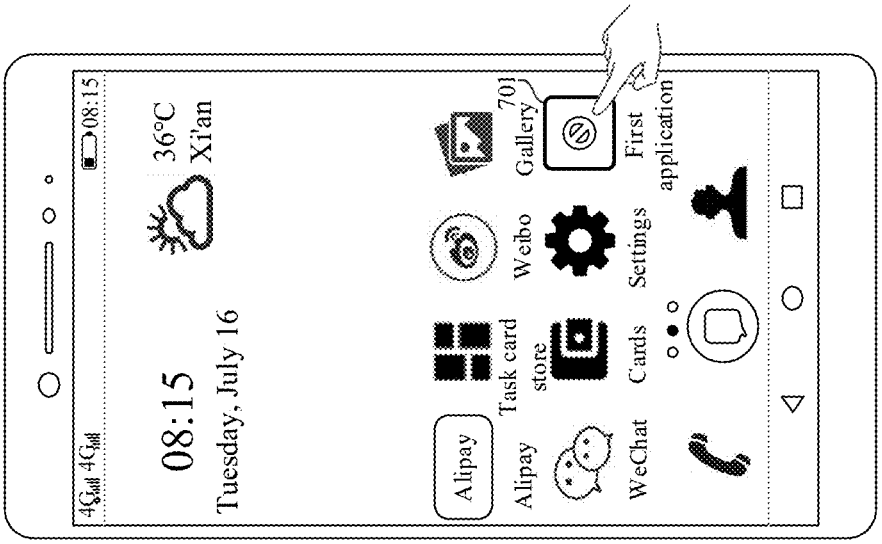
Figures 7D, 7E, 7F:
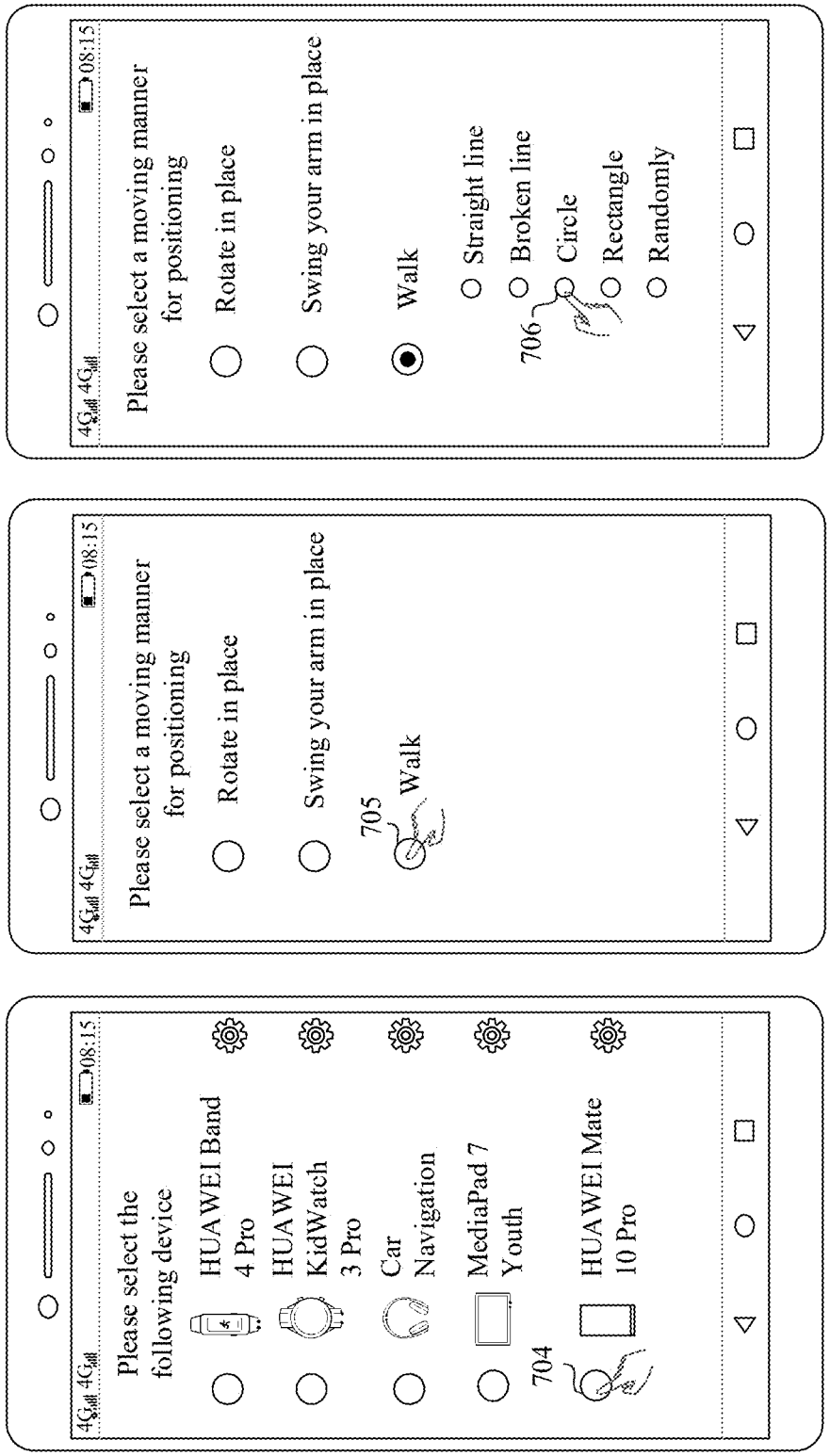
Figure 7I:
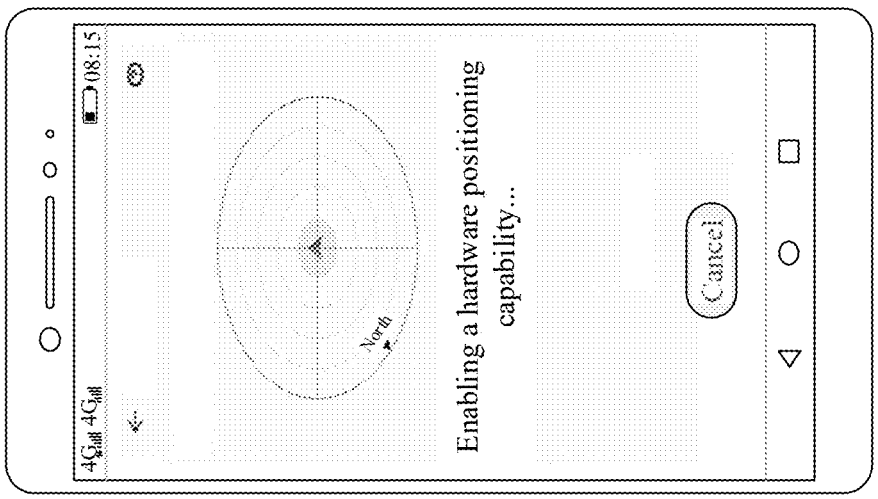
Figure 7H:
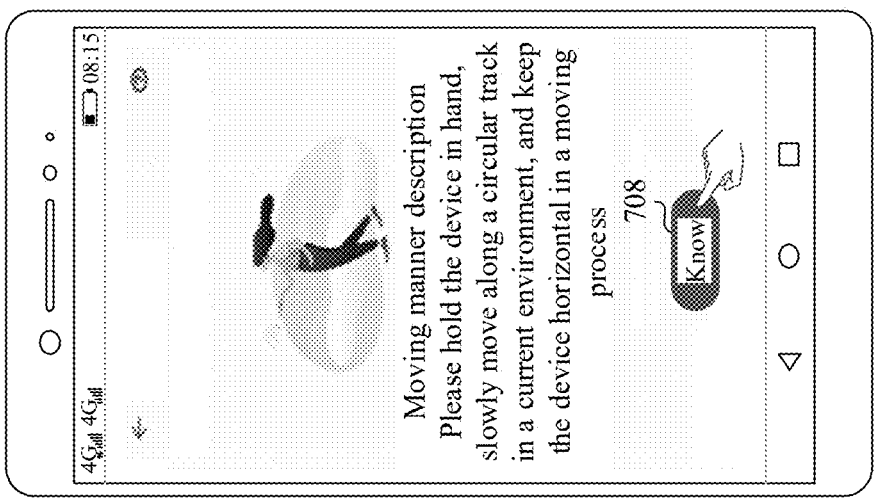
Figure 7G:
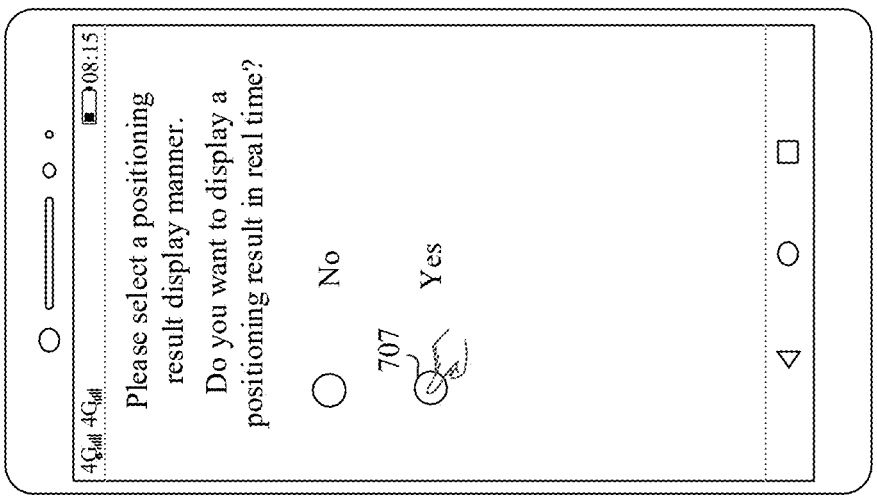
Figure 7L:
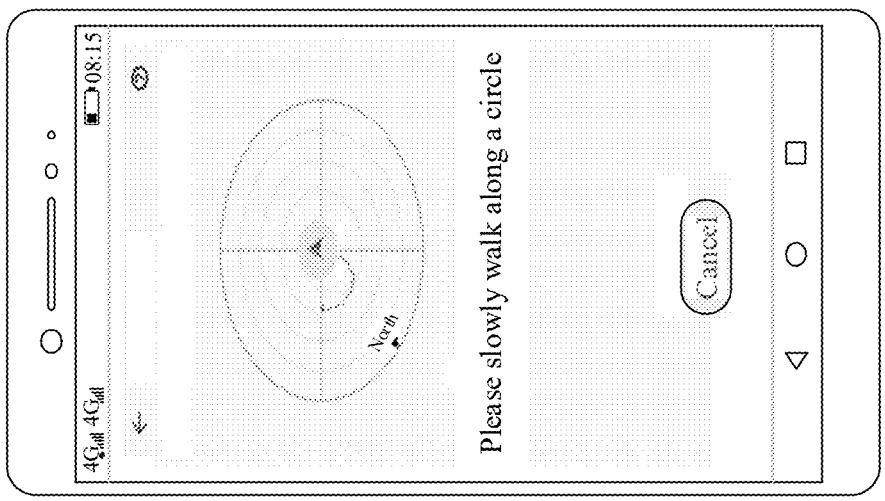
Figure 7K:
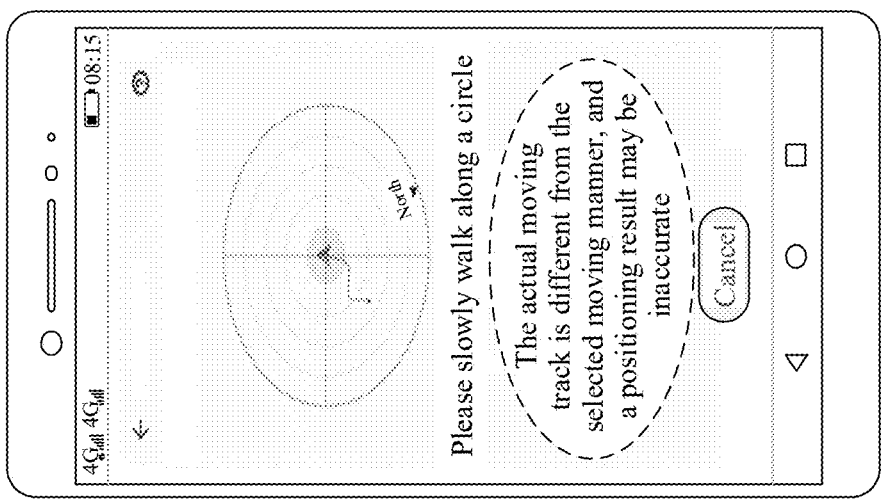
Figure 7J:
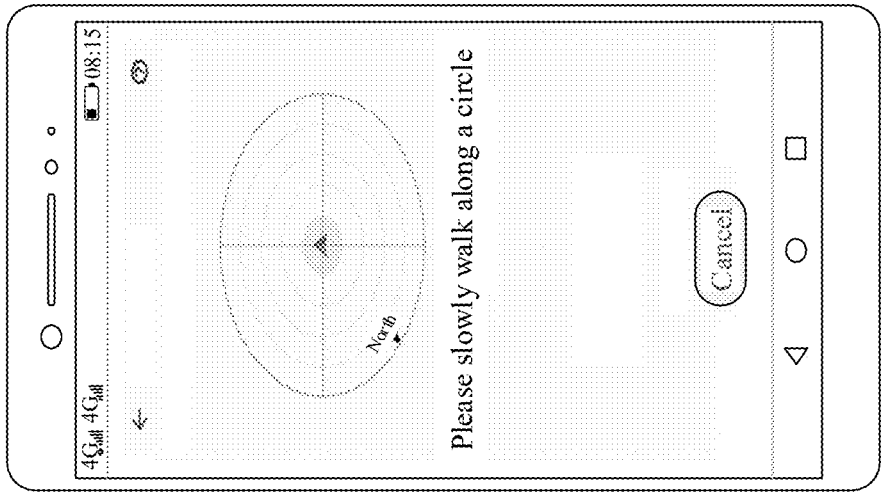
Figure 7O:
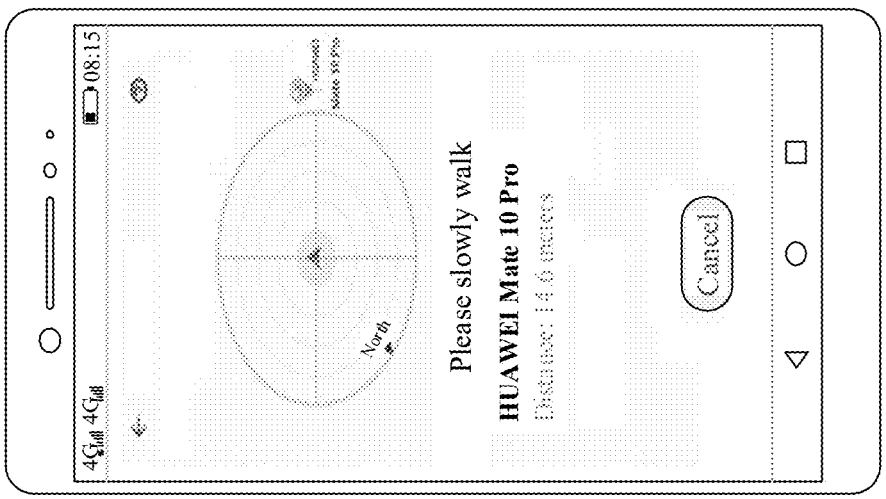
Figure 7N:
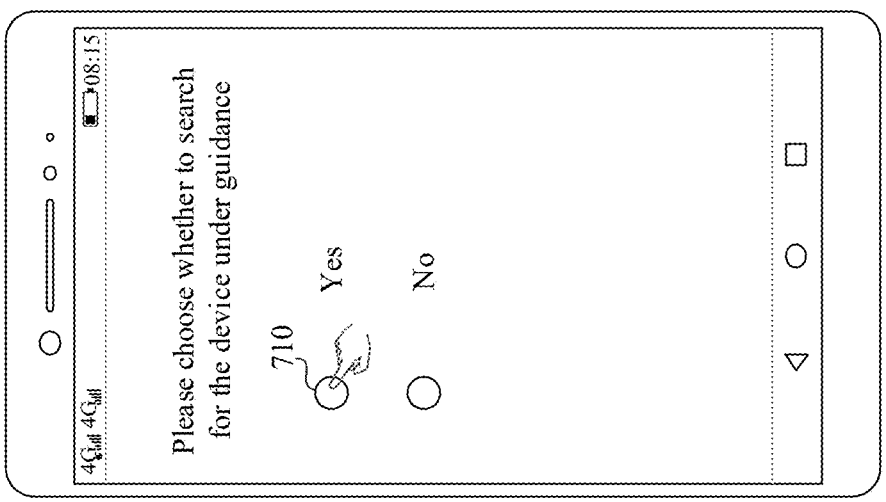
Figure 7M:
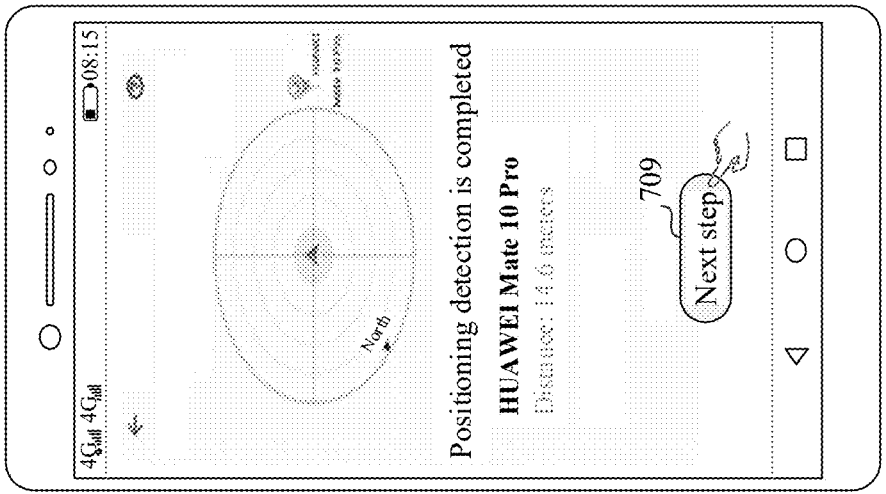
Figure 7R:
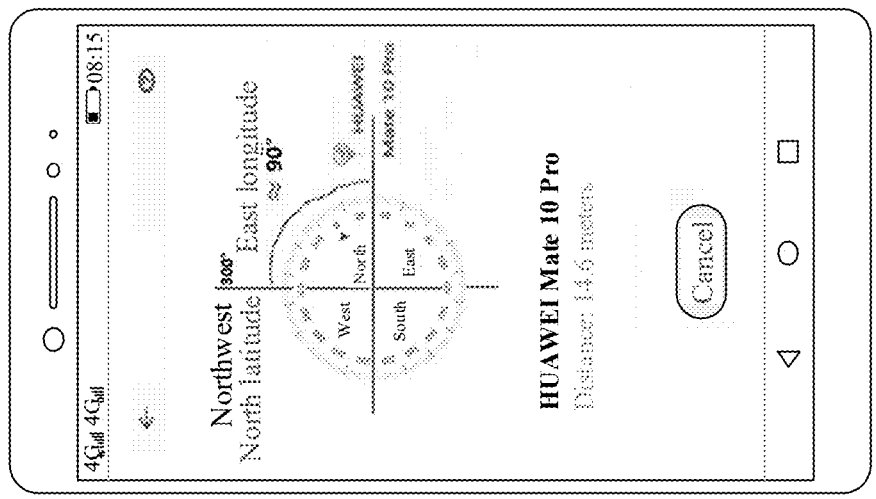
Figure 7Q:
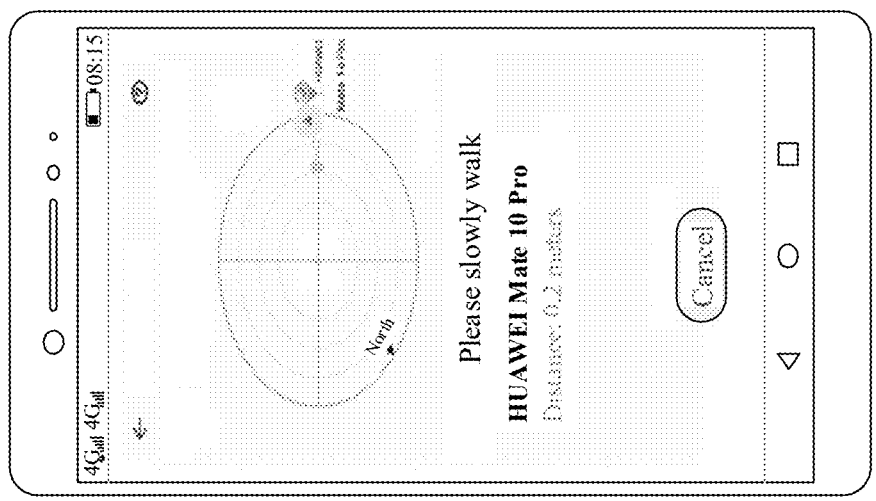
Figure 7P:
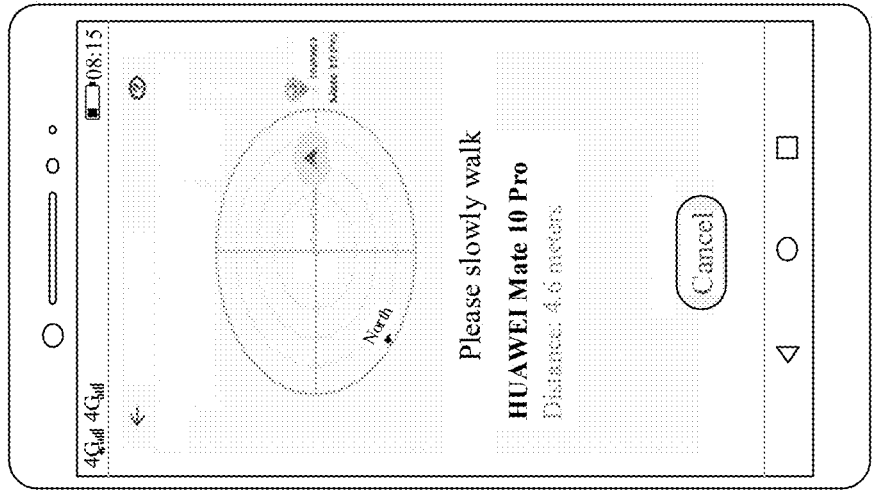
Figure 7T:
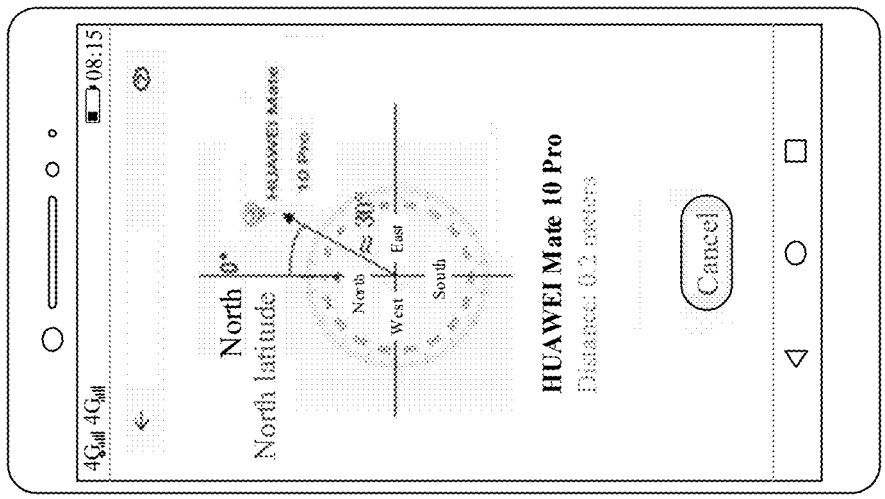
Figure 7S:
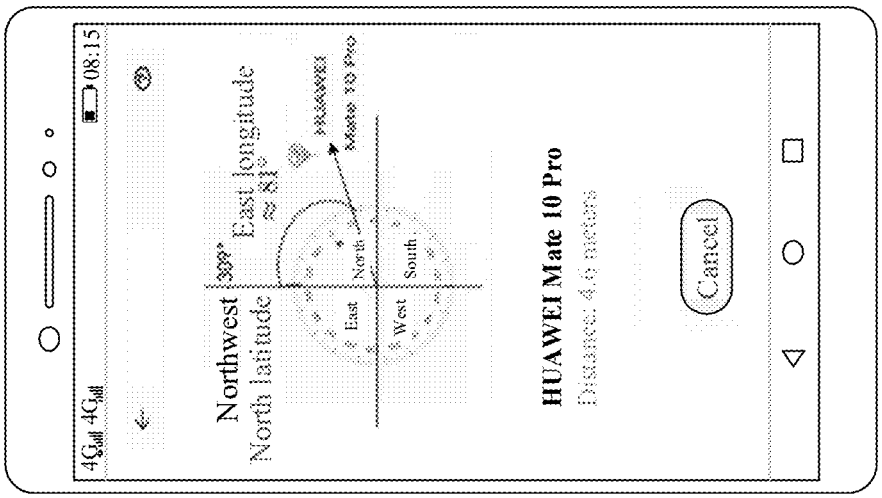
Figure 7W:
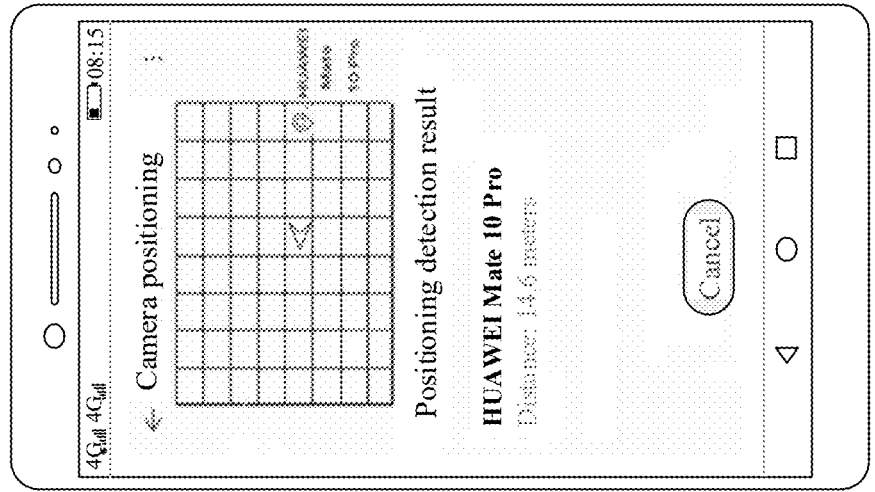
Figure 7V:
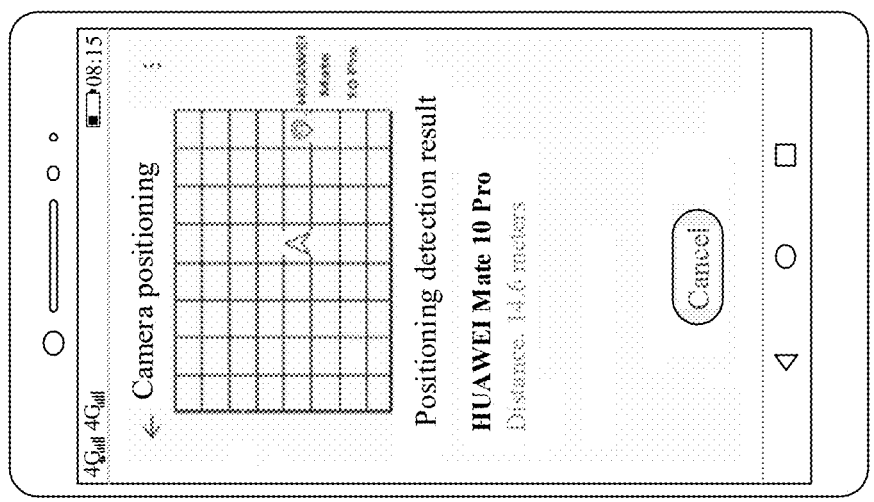
Figure 7U:
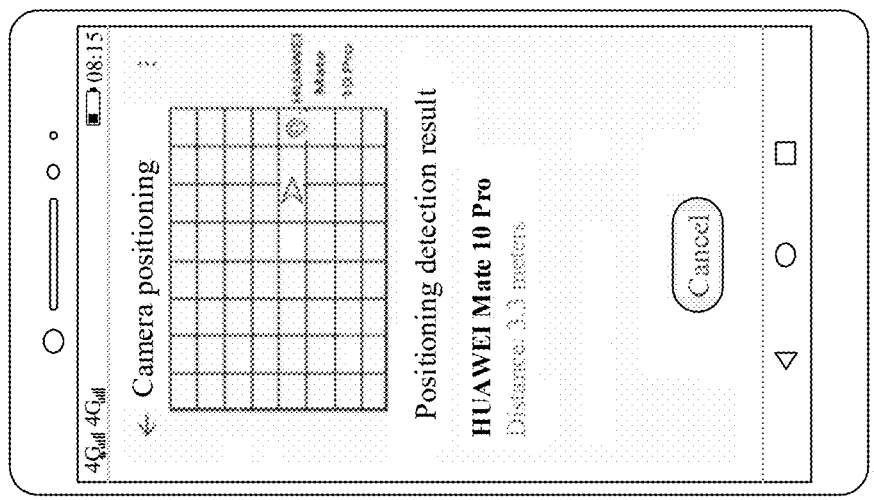
Figure 7X:
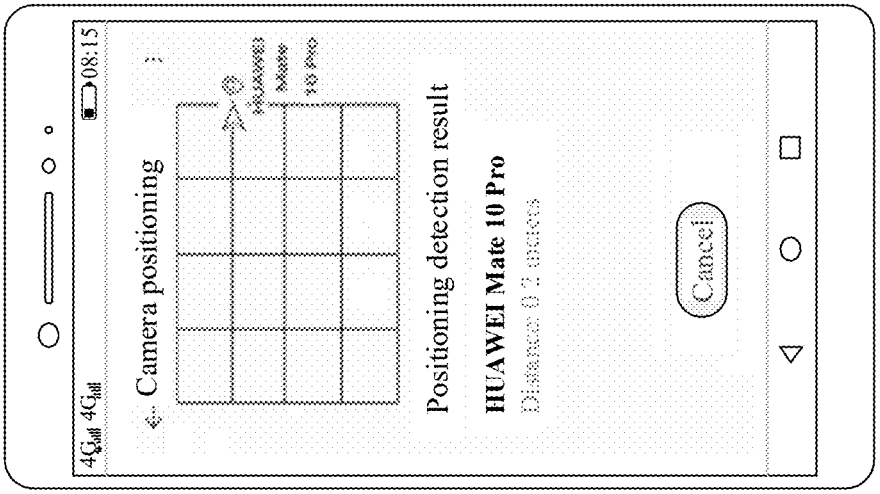
Figure 7Y:
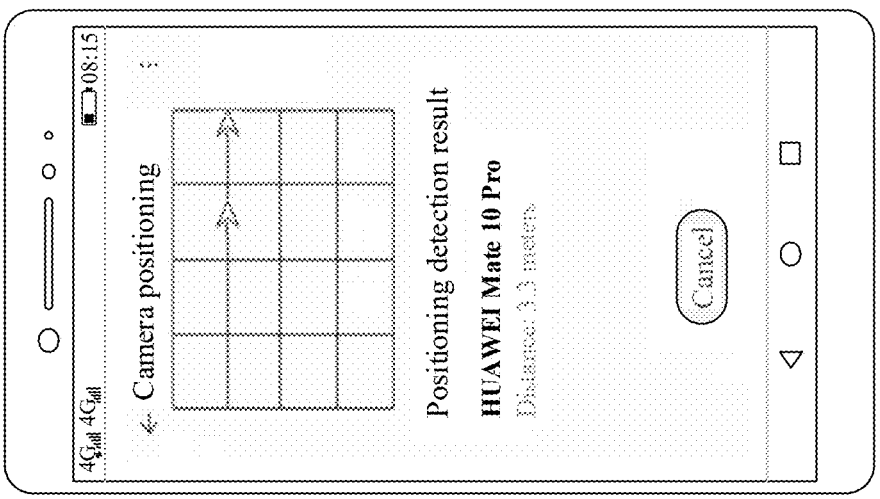
Figure 7Z:
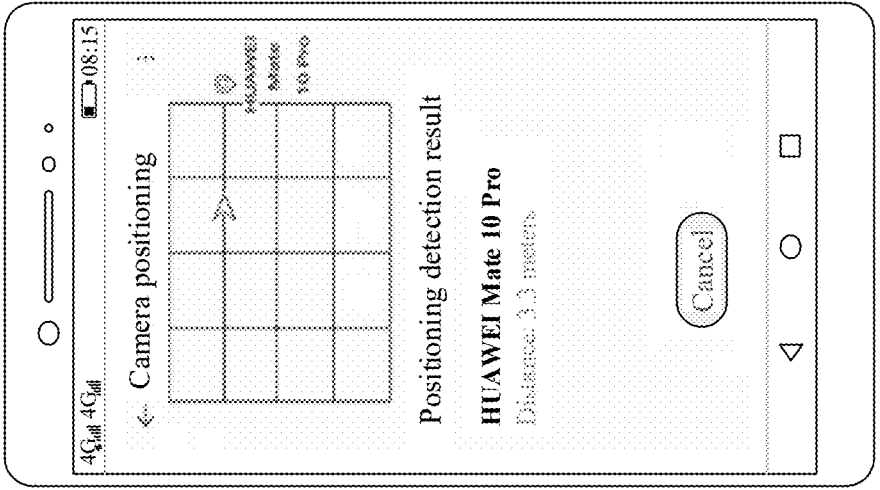

FIG. 7(a) to FIG. 7(z) show a group of GUIs of a first electronic device. Herein, FIG. 7(a) to FIG. 7(t) show that the first electronic device may determine a location of the to-be-positioned target device in a first application.

Refer to a GUI shown in FIG. 7(a). The GUI is a home screen of the first electronic device. After detecting an operation that a user taps an icon 701 of the first application on the home screen, the first electronic device may open a positioning application, and display a GUI shown in FIG. 7(b). The GUI may be referred to as a positioning description interface.

Refer to the GUI shown in FIG. 7(b). The interface may prompt the user with a function of the first application, for example, may display "The application may help a user find or discover a current device or another device (for example, a known hand band or kids watch)". After the first electronic device detects an operation that the user taps an icon 702 of "Start positioning", the first electronic device may display a GUI shown in FIG. 7(c).

Refer to the GUI shown in FIG. 7(c). The interface of the first electronic device may display "Please choose whether to position a current device". After detecting an operation that the user taps an icon 703 corresponding to "No", the first electronic device may display a GUI shown in FIG. 7(d).

Refer to the GUI shown in FIG. 7(d). The interface of the first electronic device may display "Please select the following device". The device includes a sports band (for example, HUAWEI Band 4 Pro shown in the figure), a kids watch (for example, HUAWEI KidWatch 3 Pro shown in the figure), a vehicle (for example, Car Navigation shown in the figure), a tablet computer (for example, MediaPad 7 Youth shown in the figure), a mobile phone (for example, HUAWEI Mate 10 Pro shown in the figure), or the like. The device displayed in the interface in FIG. 7(d) may be a device accessing a same router as the first electronic device, for example, HUAWEI KidWatch 3 Pro, MediaPad 7 Youth, or HUAWEI Mate 10 Pro accessing a same home router as the first electronic device; or may be a device that is once-connected to the first electronic device, for example, HUAWEI Band 4 Pro or Car Navigation connected to the first electronic device through Bluetooth; or may be a device detected by the first electronic device through scanning. For example, the user carries a mobile phone, enters a hotel, and detects a pinhole camera (not shown in the figure) hidden in a room by using the mobile phone. An operation that the user taps an icon 704 corresponding to the mobile phone is assumed. After detecting the operation, the first electronic device may display a GUI shown in FIG. 7(e).

Refer to the GUI shown in FIG. 7(e). The interface of the first electronic device may display "Please select a moving manner for positioning" and options "Rotate in place", "Swing your arm in place", and "Walk" of a plurality of moving manners. If the user taps an icon 705 corresponding to "Walk", after detecting an operation that the user taps the icon 705 corresponding to "Walk", the first electronic device may display a GUI shown in FIG. 7(f).

Refer to the GUI shown in FIG. 7(f). The interface of the first electronic device may further display a plurality of options in a walking manner, including but not limited to "Straight line", "Broken line", "Circle", "Rectangle", and "Randomly". The user may further select a corresponding option. After detecting an operation that the user taps an icon 706 corresponding to "Circle", the first electronic device may display a GUI shown in FIG. 7(g).

Refer to the GUI shown in FIG. 7(g). The interface of the first electronic device may display "Please select a positioning result display manner". For example, the interface displays "Do you want to display a positioning result in real time?". If the user taps an icon of "Yes", after detecting an operation that the user taps the icon 707 of "Yes", the first electronic device may display a GUI shown in FIG. 7(h).

Refer to the GUI shown in FIG. 7(h). The interface of the first electronic device may display "Moving manner description". The moving manner detection description may be "Please hold the device in hand, slowly move along a circular track in a current environment, and keep the device horizontal in a moving process". After ensuring that the user reads and understands the positioning detection description, the user may tap an icon of "Know". After detecting an operation that the user taps the icon 708 of "Know", the first electronic device may display a GUI shown in FIG. 7(i).

Refer to the GUI shown in FIG. 7(i). The interface of the first electronic device may display "Enabling a hardware positioning capability". After completing enabling of the hardware positioning capability, the first electronic device may display a GUI shown in FIG. 7(j).

Refer to the GUI shown in FIG. 7(j). A location indicated by an arrow in the figure is a current location of the user, the interface of the first electronic device prompts the user with "Please slowly walk along a circle", and the user may hold the first electronic device in hand and slowly walk. If the user does not walk along a walking track selected in FIG. 7(f), a GUI shown in FIG. 7(k) may be displayed.

Refer to the GUI shown in FIG. 7(k). It can be learned that the walking track of the user is a random walking track, and the walking track selected by the user in FIG. 7(f) is "Circle". Therefore, the interface of the first electronic device may display "The actual moving track is different from the selected moving manner, and a positioning result may be inaccurate" (corresponding to first prompt information in this application). In this case, the user may walk along the selected walking track, and a GUI shown in FIG. 7(l) may be displayed.

Refer to the GUI shown in FIG. 7(l). The user may hold the first electronic device in hand and slowly walk from a location (a location of a dot displayed in FIG. 7(l)) to a location indicated by an arrow along the selected walking track (that is, the circular track), a location of the to-be-positioned target device may be positioned, and a GUI shown in FIG. 7(m) is displayed.

Refer to the GUI shown in FIG. 7(m). It can be learned that the to-be-positioned target device (HUAWEI Mate 10 Pro shown in FIG. 7(m)) is located at a location that is 14.6 m away from the user. In this case, it may be considered that the to-be-positioned target device is positioned and detected. After detecting an operation that the user taps an icon 709 of "Next step", the first electronic device may display a GUI shown in FIG. 7(n).

Refer to the GUI shown in FIG. 7(n). The first electronic device may display "Please choose whether to search for the device under guidance". If the user selects "No", a positioning process ends, and the user may autonomously search for the target device. If the user selects "Yes", after the first electronic device detects an operation that the user taps an icon 710 of "Yes", two possible display manners of a real-time map and a real-time compass exist and are used to guide the user to further search for the target device. If the device is searched for under guidance of the real-time map, a GUI shown in FIG. 7(o) may be displayed; if the device is searched for under guidance of the real-time compass, a GUI shown in FIG. 7(r) may be displayed; or a GUI shown in FIG. 7(u) may be displayed.

Refer to the GUI shown in FIG. 7(o). In this case, the interface of the first electronic device prompts the user with "Please slowly walk", and the target device is still located at a location that is in the east of the first electronic device and that is 14.6 m away from the user. The user may hold, based on a location of the target device "HUAWEI Mate 10 Pro" shown in the interface, the first electronic device in hand and continue to slowly walk in a direction in which the target device is located, and a GUI shown in FIG. 7(p) is displayed.

Refer to the GUI shown in FIG. 7(p). After the user walks for a distance, the first electronic device updates the location of the target device. It can be learned that, in this case, the target device is located at a location that is in the east of the first electronic device and that is 4.6 m away from the user. The user may hold the first electronic device in hand and continue to walk, and a GUI shown in FIG. 7(q) is displayed.

Refer to the GUI shown in FIG. 7(q). The first electronic device updates the location of the target device again. It can be learned that, in this case, a distance between the target device and the first electronic device is 0.2 m. It may be considered that searching for the target device is completed.

Refer to the GUI shown in FIG. 7(r). In this case, the target device is located at a location that is in the east of the first electronic device and that is 14.6 m away from the user. In this case, the user may rotate by a specific angle (for example, it is assumed that a face of the user faces a direction 300° northwest, and the user may rotate by 9° clockwise), hold the first electronic device in hand, and continue to slowly walk, and a GUI shown in FIG. 7(s) is displayed.

Refer to the GUI shown in FIG. 7(s). After the user walks for a distance, the first electronic device updates the location of the target device. It can be learned that, in this case, the distance between the target device and the first electronic device is 4.6 m, and the target device is located in a direction 21° east of north of the first electronic device. The user may continue to rotate by a specific angle (for example, rotate by 510 clockwise), hold the first electronic device in hand, and continues to walk, and a GUI shown in FIG. 7(t) is displayed.

Refer to the GUI shown in FIG. 7(t). The first electronic device updates the location of the target device again. It can be learned that, in this case, the distance between the target device and the first electronic device is 0.2 m, and the target device is located in a direction 30° east of north of the first electronic device. It may be considered that searching for the target device is completed.

Refer to the GUI shown in FIG. 7(u). In this case, the target device is located at a location that is in the east of an interface of the mobile phone and that is 14.6 m away from the user. Currently, the user holds the first electronic device in hand and faces a due west direction (it is assumed that a direction of an arrow is a direction that the face of the user faces). Therefore, the user may first adjust the direction, and a GUI shown in FIG. 7(v) is displayed.

Refer to the GUI shown in FIG. 7(v). In this case, the face of the user faces a due north direction, and a distance between the target device and the user is still 14.6 m. In this case, the user may continue to adjust the direction of the face, and slowly walk towards the direction in which the target device is located, and a GUI shown in FIG. 7(w) is displayed.

Refer to the GUI shown in FIG. 7(w). It can be learned that, the target device is located at a location that is in the east of the interface of the mobile phone and that is 3.3 m away from the user. In this case, the user may increase a scale of the map. In an adjustment process, one possible case is that the user may adjust the scale to a proper value, as shown in a GUI shown in FIG. 7(x); and another possible case is that the user adjusts the scale to a large value, and the target device is not displayed in the interface of the first electronic device, as shown in a GUI shown in FIG. 7(y). In this case, a direction indicated by a right triangle in the figure is a possible direction of the target device, and the user may properly adjust the scale of the map, so that the target device is displayed in the interface of the first electronic device.

Refer to the GUI shown in FIG. 7(x). It can be learned that, in this case, the target device is still located at a location that is in the east of the interface of the first electronic device and that is 3.3 m away from the user. However, a distance that is between the target device and the user, that is displayed in the interface, and that is seen by the user is greater than the distance between the target device and the user shown in the GUI shown in FIG. 7(w), which is because the user increases the scale of the map.

After adjustment is completed, the user may continue to slowly move towards the direction in which the target device is located, and a GUI shown in FIG. 7(z) is displayed.

Refer to the GUI shown in FIG. 7(z). The target device is at a location that is 0.2 m away from the user. In this case, it may be considered that searching for the target device is completed.

In some other embodiments, when another device is positioned, as the user walks, the arrow moves, but the map does not move in real time. For a specific process, refer to a group of GUIs shown in FIG. 4(a) to FIG. 4(c).

When a location of the another device is preliminarily positioned, if the user taps "Search" or "Search for a device", reference may be made to the GUIs shown in FIG. 7(o) to FIG. 7(z).

It should be noted that, FIG. 7(a) to FIG. 7(z) are described by using an example in which the target device is a mobile phone. If the target device is a hidden camera, an icon "Cancel" at the bottom of the interfaces shown in FIG. 7(o) to FIG. 7(z) may be replaced with "View help". After the user taps an icon of "View help", the interface of the first electronic device may display prompt information. The prompt information may be "Please pay attention to hidden locations such as a socket, a television, and a corner of a wall to determine a target device".

It should be further noted that in some embodiments, in a positioning stage, a map and a walking track of the user may not be displayed, and only an animation effect of a person who is moving dynamically is displayed. After a second electronic device is positioned, the GUI in FIG. 7(m) may be directly displayed. Certainly, in this embodiment, if the actual moving track of the user is different from the selected moving manner, the first electronic device may still display the prompt information.

Manner 2: A moving manner of positioning is an in-place rotation manner.

When the to-be-positioned target device and the first electronic device are different devices, if a moving manner selected by the user for positioning is the in-place rotation manner, a specific process is basically similar to a GUI shown in FIG. 5(a) to FIG. 5(m), and reference may be made to the GUI shown in FIG. 5(a) to FIG. 5(m).

After the target device is positioned and detected, if the user taps "Search for a device under guidance", reference may be made to the GUIs shown in FIG. 7(o) to FIG. 7(z).

Manner 3: A moving manner of positioning is an in-place arm swinging manner.

When the to-be-positioned target device and the first electronic device are different devices, if a moving manner selected by the user for positioning is the in-place arm swinging manner, a specific process is basically similar to a GUI shown in FIG. 6(a) to FIG. 6(m), and reference may be made to the GUI shown in FIG. 6(a) to FIG. 6(m).

After the target device is positioned and detected, if the user taps "Search for a device under guidance", reference may be made to the GUIs shown in FIG. 7(o) to FIG. 7(z).

It should be noted that, in the foregoing process, the to-be-positioned target device may also be positioned in a form of a voice. For example, if it is detected that the to-be-positioned target device is located at a location that is in the east of the interface of the first electronic device and that is 14.6 m away from the user, the user may be prompted in a form of voice playing. A process is basically the same as the process shown in the foregoing figure, and only a form of guidance on searching for a target device is different. For brevity, details are not described herein again.

Figure 8:
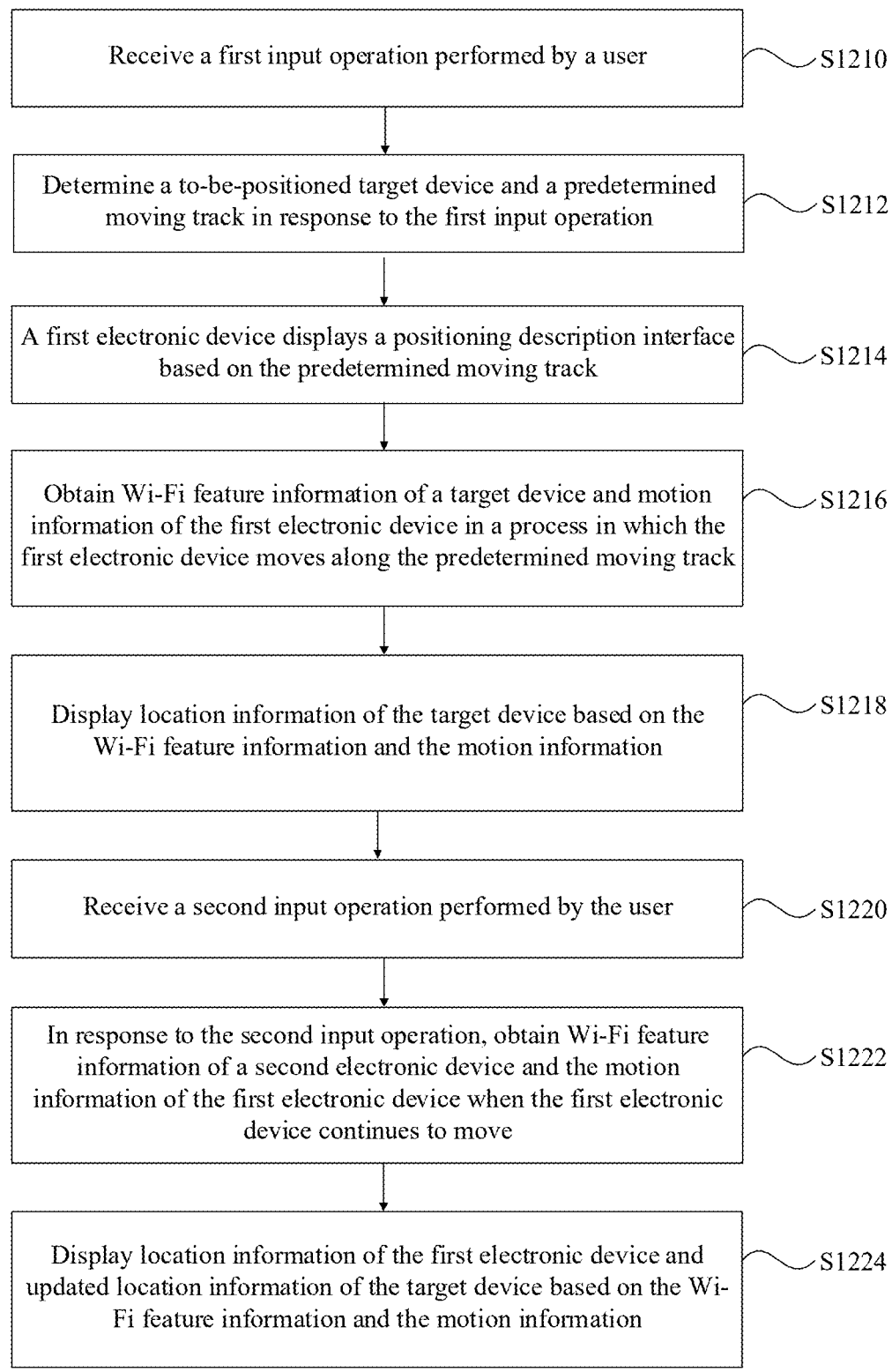
FIG. 8 is a schematic flowchart of a positioning method according to an embodiment of this application.

With reference to FIG. 8, the following describes an internal implementation process in which a first electronic device positions a target device in an embodiment of this application. A positioning process may include two stages: a positioning stage and a search stage. The search stage is optional. If a user chooses to search for a device under guidance in a GUI shown in FIG. 7(n), the search stage is entered after the positioning stage ends. If the user chooses not to search for a device under guidance in a GUI shown in FIG. 7(n), the positioning process may alternatively end in advance, and the search stage is not entered.

Positioning Stage:

In this solution, the first electronic device is mainly moved to form a plurality of virtual reference points, Wi-Fi features and motion data of the plurality of virtual points are obtained, and the target device is positioned with reference to a positioning algorithm.

S1210: The first electronic device receives a first input operation performed by a user.

The first input operation performed by the user may be one or more of the following input operations: an input operation that the user selects an option of whether to position a current device in FIG. 3(c) and FIG. 7(c), an input operation that the user selects an option of a moving manner for forming a predetermined track in FIG. 3(d) and FIG. 7(e), an input operation that the user further selects a selected moving manner in FIG. 3(e) and FIG. 7(f), an input operation that the user selects an option of whether to display a positioning result in real time in FIG. 3(f) and in FIG. 7(g), an input operation that the user selects an option of a plurality of devices in FIG. 7(d), and the like. It should be noted that display in an interface of the first electronic device is merely an example, and the foregoing plurality of types of options may be all or partially displayed in the interface of the first electronic device, so that the user performs selection.

In addition, the first input operation performed by the user may alternatively be an input operation of subsequently selecting a detected device 1 in a first application in FIG. 23(d), provided that the first electronic device can give a response after receiving the first input operation and determine a to-be-positioned target device and a predetermined moving track.

S1212: Determine the to-be-positioned target device and the predetermined moving track in response to the first input operation.

In response to the one or more input operations performed by the user, the first electronic device determines that a target device that needs to be positioned is a current device (that is, the first electronic device) or another electronic device different from the current device, and determines a moving track formed when the first electronic device moves in a moving manner in the positioning process.

For example, the user may implement positioning of the user by using the first electronic device. As shown in FIG. 3(c), the user taps an option of "Yes". The first electronic device receives the input operation performed by the user, and determines that the to-be-positioned target device is the first electronic device. Further, as shown in FIG. 3(d) to FIG. 3(e), the user taps an option "Walk" and an option "Circle" on a home screen of the first electronic device. The first electronic device receives the input operation performed by the user, and determines that the first electronic device is to prompt the user to move along the predetermined moving track, that is, a circular moving track of walking. It should be noted that, in this case, the first electronic device determines a geographical location of the first electronic device.

For example, the user may use the first electronic device to implement positioning of another electronic device. As shown in FIG. 7(c), the user taps an option "No". As shown in FIG. 7(d), the user taps an icon 704. The first electronic device receives the input operation performed by the user, and determines that the to-be-positioned target device is another electronic device different from the first electronic device, that is, a mobile phone shown in FIG. 7(d). After determining the target device, the first electronic device obtains MAC address information, a Wi-Fi card model, a device identification code, and the like of the target device, so that the first electronic device subsequently obtains Wi-Fi feature information. For details, refer to S1216. Further, as shown in FIG. 7(e) to FIG. 7(f), the user taps an option "Walk" and an option "Circle" on the home screen of the first electronic device. The first electronic device receives the input operation performed by the user, and determines that the first electronic device is to prompt the user to move along the predetermined moving track, that is, the circular moving track of walking.

A moving track formed when the first electronic device is to move in a moving manner is a predetermined moving track. The predetermined moving track includes manners such as an in-place rotation manner, an in-place arm swinging manner, and a walking manner. The walking manner may further specifically include "Straight line", "Broken line", "Circle", "Rectangle", "Randomly", and the like. For example, as shown in FIG. 5(d), the user taps an option "Rotate in place" on the home screen of the first electronic device. The first electronic device receives the input operation performed by the user, and determines that the first electronic device is to prompt the user to move along the predetermined moving track, that is, a moving track of in-place rotation.

For another example, as shown in FIG. 6(d), the user taps an option "Swing your arm in place" on the home screen of the first electronic device. The first electronic device receives the input operation performed by the user, and determines that the first electronic device is to prompt the user to rotate along a moving track of in-place arm swinging.

Alternatively, the first electronic device may automatically determine the predetermined moving track based on a type and a function of the opened first application. For example, as shown in FIG. 23(a) to FIG. 23(l), the first application is used to search for a camera. To help the user quickly find a hidden camera, the application is preset to use a moving track of random walking to position the camera.

S1214: The first electronic device displays a positioning description interface based on the predetermined moving track.

To help the user understand how to position the target device, the first electronic device displays the positioning description interface based on the predetermined moving track. A positioning description may include a text and/or a picture displayed in the interface, or may include a played voice, to guide the user to hold the first electronic device and move based on the positioning description.

For example, as shown in FIG. 3(*d*) to FIG. 3(*e*), in response to the input operation performed by the user, the predetermined moving track determined by the first electronic device is a circular moving track of walking. According to the predetermined moving track, the first electronic device displays a moving manner description interface shown in FIG. 3(*g*): "Please hold the device in hand, slowly move along a circular track in a current environment, and keep the device horizontal in a moving process".

For example, as shown in FIG. 5(*d*), in response to the input operation performed by the user, a moving manner determined by the first electronic device is the in-place rotation manner. In the predetermined moving manner, the first electronic device displays a moving manner description interface shown in FIG. 5(*e*): "Please slowly move the feet by using a standing point as a circle center and using a length of an arm as a radius, to change a direction, rotate counter-clockwise/clockwise by three circles, and keep the device horizontal in a rotation process".

For example, as shown in FIG. 6(*d*), in response to the input operation performed by the user, a moving manner determined by the first electronic device for motion positioning is the in-place rotation manner. In the predetermined moving manner for motion positioning, the first electronic device displays a moving manner description interface shown in FIG. 6(*e*): "Please swing an arm by three times in two-dimensional space by using a standing point as a circle center and using a length of the arm as a radius, and keep a holding manner of the device in an arm swinging process".

S1216: Obtaining Wi-Fi feature information of a second electronic device and motion information of the first electronic device in a process in which the first electronic device moves along the predetermined moving track.

To accurately position the target device, in the process in which the first electronic device moves along the predetermined moving track, the first electronic device obtains the Wi-Fi feature information of the second electronic device and the motion information of movement of the first electronic device in real time. Based on the to-be-positioned target device determined in S1212, the second electronic device may be a Wi-Fi hotspot apparatus with a known geographical location, or may be the determined target device.

If the target device determined in S1212 is the first electronic device, the second electronic device is a Wi-Fi hotspot apparatus with a known geographical location. In the process in which the first electronic device moves along the predetermined moving track, the first electronic device obtains Wi-Fi feature information of the Wi-Fi hotspot apparatus with the known geographical location in real time. For example, as shown in FIG. 3(*c*), the user taps an icon 303. In response to the input operation, the to-be-positioned target device determined by the first electronic device is the first electronic device, that is, a mobile phone HUAWEI MATE 10. In this case, at least one Wi-Fi hotspot apparatus with a known geographical location exists in a current scenario (for example, an indoor scenario). The first electronic device obtains a Wi-Fi feature of the Wi-Fi hotspot apparatus in real time in a process of moving along a circular walking track. A Wi-Fi hotspot apparatus with a known geographical location is required, because an actual geographical location of the first electronic device can be learned of based on a location of the hotspot apparatus relative to the first electronic device in a process of positioning the first electronic device.

If the target device determined in S1212 is another electronic device different from the first electronic device, that is, is not the first electronic device, the second electronic device is the determined target device. In the process in which the first electronic device moves along the predetermined moving track, the first electronic device obtains wireless fidelity Wi-Fi feature information of the target device in real time. For example, as shown in FIG. 7(*d*), the user taps the icon 704. In response to the input operation, the to-be-positioned target device determined by the first electronic device is a mobile phone HUAWEI MATE 10 Pro. In this case, the first electronic device obtains a Wi-Fi feature of the target device in real time in a process of moving along a circular walking track. In this case, the first electronic device may obtain the Wi-Fi feature by using a Wi-Fi network interface card carried in the first electronic device. In this embodiment of this application, a manner in which the first electronic device obtains the Wi-Fi feature includes a collaborative manner or a sniffing manner.

Manner 1: Collaborative Manner

In this obtaining manner, the first electronic device sends a specified instruction to the target device, for example, may send "Please periodically send data xxx to me" to the target device. After receiving the instruction, the target device authenticates the first electronic device, and then sends related data to the first electronic device based on an instruction request. Then, the first electronic device may obtain response data returned by the target device, and analyze and extract the Wi-Fi feature of the target device. The first electronic device may establish a communication connection to the target device, or the first electronic device and the target device are located in a network covered by a same Wi-Fi route. When the first electronic device and the target device are located in a network covered by a same Wi-Fi route, the first electronic device sends an instruction "Please periodically send data xxx to me" to the second electronic device through the Wi-Fi route. After receiving the instruction, the target device authenticates the first electronic device, and then sends related data to the first electronic device based on an instruction request.

Figure 9:
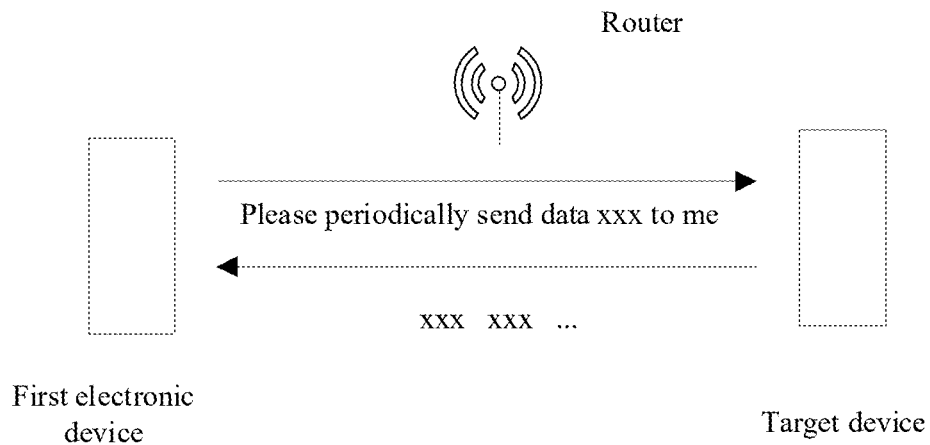
FIG. 9 is a schematic diagram of capturing a Wi-Fi feature of a device in a collaborative manner according to an embodiment of this application.

FIG. 9 is a schematic diagram of capturing a Wi-Fi feature of a device in a collaborative manner according to an embodiment of this application. The first electronic device may communicate with the target device by using a router. For example, the first electronic device sends an instruction "Please periodically send data xxx to me" to the router, the router sends the instruction to the target device, the target device sends the data "xxx" to the first electronic device based on the instruction, and the first electronic device extracts the Wi-Fi feature of the target device from the received data "xxx".

Manner 2: Sniffing Manner

A Wi-Fi module of an electronic device discards, in a normal service mode, data that is not sent to the Wi-Fi module, but may report, in a monitoring mode, all or selected data received by the Wi-Fi module. This is a sniffing mode of the electronic device.

Specifically, in this embodiment of this application, if the first electronic device determines that the target device is a malicious terminal, a malicious hidden camera, or a similar video surveillance device that accesses a private router, the target device does not establish a communication connection to the first electronic device, and the two devices are not in a network covered by a same Wi-Fi route, the first electronic device may set the Wi-Fi network interface card of the first electronic device to a sniffing mode, capture Wi-Fi data at an air interface, filter the captured data based on information about the determined target device, for example, based on the MAC address information of the target device, and further analyze and extract the Wi-Fi feature of the target device.

Figure 10:
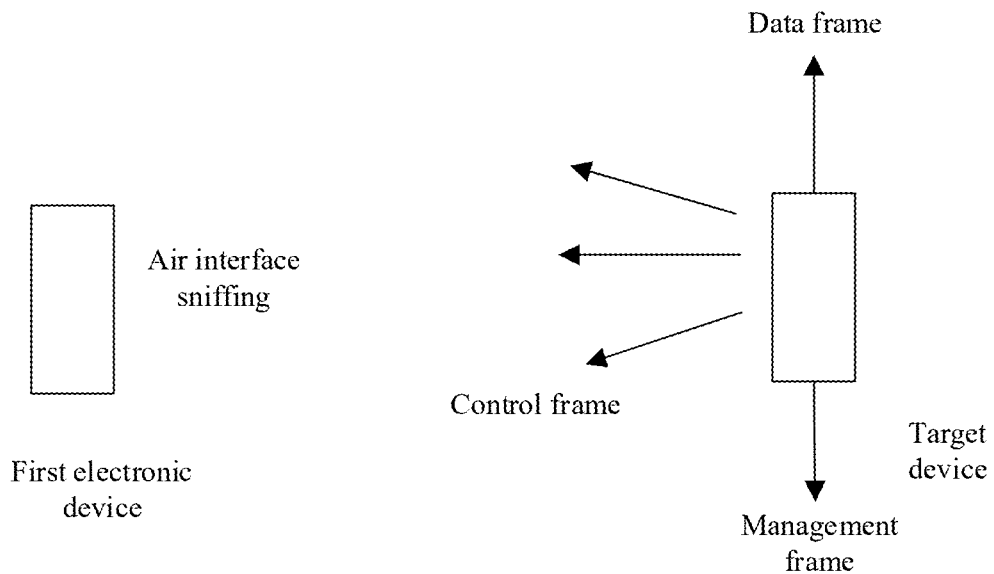
FIG. 10 is a schematic diagram of capturing a Wi-Fi feature of a device in an air interface sniffing manner according to an embodiment of this application.

FIG. 10 is a schematic diagram of capturing a Wi-Fi feature of a device in an air interface sniffing manner according to an embodiment of this application. Because the first electronic device cannot directly or indirectly communicate with the target device, the first electronic device performs continuous sniffing at the air interface, obtains, through filtering based on the information about the target device (for example, the MAC address information of the target device), Wi-Fi data sent by the target device, and extracts the Wi-Fi feature of the target device.

The first electronic device obtains the Wi-Fi data of the target device in the foregoing two capturing manners, and extracts the Wi-Fi feature information of the target device based on the Wi-Fi data, for example, a received signal strength indicator (received signal strength index, RSSI), channel state information (channel state information, CSI), a transmission rate, and a signal-to-noise ratio. The Wi-Fi feature information is mainly used to describe information such as a distance, a direction, and environmental interference between the first electronic device and the target device.

When the target device determined in S1212 is the first electronic device, because the second electronic device is a Wi-Fi hotspot apparatus with a known geographical location, the first electronic device obtains Wi-Fi data of the Wi-Fi hotspot apparatus with the known geographical location in real time in the process in which the first electronic device moves along the predetermined moving track. A manner of capturing the Wi-Fi data of the Wi-Fi hotspot apparatus is the same as the cooperative mode. The Wi-Fi hotspot apparatus sends the Wi-Fi data of the Wi-Fi hotspot apparatus to the first electronic device in real time, and the first electronic device extracts the Wi-Fi feature information of the Wi-Fi hotspot apparatus from the received Wi-Fi data. Based on geographical location information of the Wi-Fi hotspot apparatus (a known reference point), the first electronic device can infer the geographical location of the first electronic device after extracting the feature information from the received Wi-Fi data of the Wi-Fi hotspot apparatus.

The motion information of the first electronic device is motion information of movement of the first electronic device, and may be captured in real time by using a motion sensor or augmented reality (augmented reality. AR) carried in the first electronic device, for example, may include but is not limited to acceleration of each axis, angular velocity of each axis, magnetic intensity of each axis, attitude information, location information, pedometer data, and a walking speed.

The attitude information may include an Euler angle, four elements, a rotation matrix, or the like.

S1218: Display the location information of the target device based on the Wi-Fi feature information and the motion information.

The first electronic device displays the location information of the target device in real time based on a preset option, or displays the location information of the target device after the user completes the predetermined moving track based on content indicated in the positioning description interface.

That the first electronic device displays the location information of the target device in real time based on the preset option may be that the user chooses, before the positioning process, whether to display the positioning result in real time. For example, in FIG. 3(f) and FIG. 7(g), the user may select an icon corresponding to "Yes". The preset option is merely an example. The displaying the location information of the target device in real time may also be a default location information display manner used after the first application of the first electronic device is downloaded.

The first electronic device displays the location information of the target device after the user completes the predetermined moving track based on the content indicated in the positioning description interface. For example, the location information of the target device is displayed in FIG. 5(m) and FIG. 6(m).

In a process of analyzing the extracted Wi-Fi feature and motion data of the first electronic device, the first electronic device may execute a moving track estimation algorithm and a positioning algorithm that are applicable to a moving manner selected by the user for positioning. The following describes an algorithm by using an example in which the target device determined in step S1212 is not the first electronic device and the Wi-Fi feature information of the target device is obtained in step S1216.

Manner 1: A moving manner of positioning is a walking manner.

A reference coordinate system is established by using a start motion point as an origin of coordinates, using a north direction as a Y axis, and using an east direction as an X axis.

An attitude of the first electronic device is calculated based on read motion data, and whether a pitch angle and a roll angle of the first electronic device fall within a specific interval (for example, from −10° to 10°) is determined. If the pitch angle and the roll angle of the first electronic device do not fall within the specific interval, the user is prompted to keep a horizontal holding manner of the first electronic device, as shown in the GUI shown in FIG. 3(k). If the pitch angle and the roll angle of the first electronic device do not fall within the interval for a long period of time, the user is prompted with "The posture is abnormal, and a positioning result may be inaccurate" (corresponding to second prompt information in this application), as shown in the GUI shown in FIG. 3(l).

Coordinates of the first electronic device in the reference coordinate system are updated based on the read motion data by using an existing track estimation algorithm. In this embodiment of this application, the track estimation algorithm may be a pedestrian dead reckoning algorithm (pedestrian dead reckoning, PDR), a zero velocity update algorithm combined with an inertial measurement unit (inertial measurement unit, IMU), or the like.

The user chooses to stop after walking for a period of time.

In some embodiments, the interface of the first electronic device may prompt the user to stop walking. This is not limited.

Specifically, the first electronic device may estimate a location of the target device in the following manners:

(1) Estimation is performed based on a heatmap of the extracted Wi-Fi feature on a walking track (for example, a location at which an RSSI has a maximum value in a local heatmap is searched for through interpolation, to obtain estimated coordinates of the second electronic device), and a direction and a distance may be obtained.

(2) A direction and a distance are estimated by calculating an angle of arrival and a time of arrival of a signal based on the CSI.

(3) A specific positioning algorithm is designed based on a type of a walking track of the user.

Figure 11:
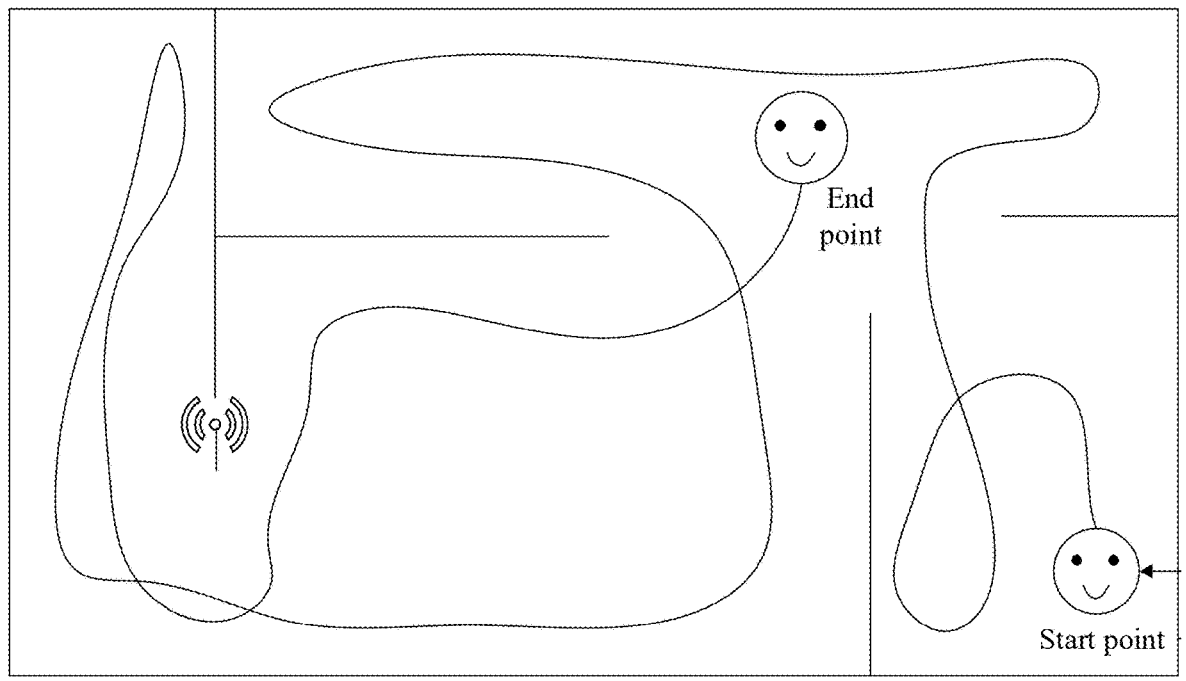
FIG. 11 is a schematic diagram of random walking of a user according to an embodiment of this application.

FIG. 11 is a schematic diagram of random walking of a user according to an embodiment of this application. It can be learned from the figure that the user starts from a start point and walks along any path until arriving at an end point.

Figure 12:
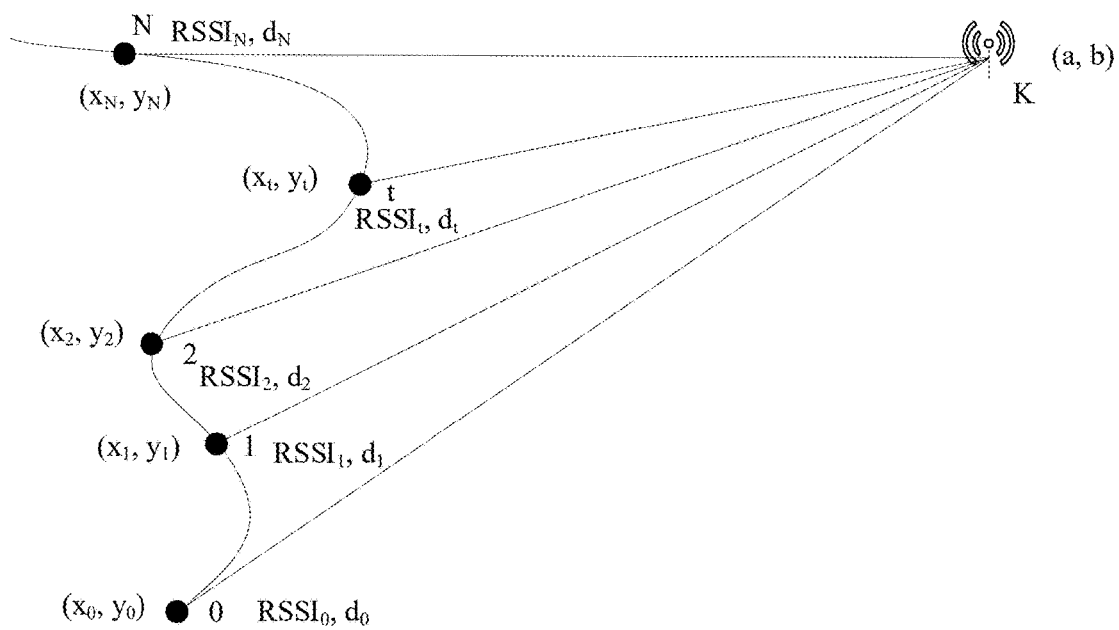
FIG. 12 is a schematic diagram of positioning a target device based on a predetermined moving track according to an embodiment of this application.

FIG. 12 is a schematic diagram of positioning a target device along a predetermined moving track according to an embodiment of this application. As shown in the figure, the predetermined moving track is a moving track formed when the first electronic device moves from a location $(x_0, y_0)$ at a moment 0 to a location $(x_1, y_1)$ at a moment 1, moves from the location $(x_1, y_1)$ at the moment 1 to a location $(x_2, y_2)$ at a moment 2, moves from the location $(x_2, y_2)$ at the moment 2 to a location $(x_t, y_t)$ at a moment t, and moves to a location $(x_N, y_N)$ at a moment N in a moving manner of random walking. Coordinates of a target device K in a two-dimensional coordinate system are (a, b). In a process in which the user holds the first electronic device in hand and walks, the first electronic device obtains a Wi-Fi feature of the target device K and location coordinates corresponding to the target device K in real time, and implements positioning of the target device K based on an optimization algorithm or a heatmap method. FIG. 12 shows values of an RSSI that are obtained at different moments. For example, a value obtained at the location $(x_t, y_t)$ at the moment t is $RSSI_t$.

(1) Optimization Algorithm

When the user walks to a point t, a distance $d_t$ between the target device K and the first electronic device may be calculated based on Formula (1):

$$d_t = \sqrt{(x_i-a)^2 + (y_t-b)^2} \quad (1)$$

An RSSI obtained when the distance between the target device K and the first electronic device is $d_t$ may be calculated based on Formula (2):

$$RSSI(d_t) = RSSI^{ref}(d_0) - 10\gamma\log_{10}\frac{d_t}{d_0} + \chi_g(d_t) \quad (2)$$

Herein, $RSSI(d_t)$ represents a reference value of an RSSI in a Wi-Fi feature that can be captured by the first electronic device when the distance between the target device K and the first electronic device is $d_t$, and a unit is dBm; $RSSI^{ref}(d_0)$ represents a reference value of an RSSI in a Wi-Fi feature that can be captured by the first electronic device when the distance between the target device K and the first electronic device is $d_0$, a unit is dBm, and $d_0$ nay be usually set to 1; $\gamma$ represents a path loss index, and is related to an environment, and a value range is approximately [1.0, 4.0]; and $\lambda_g$ represents additional noise caused by a real-time change of an air interface environment.

The first electronic device obtains $RSSI_t$ when the distance between the target device K and the first electronic device is $d_t$, the first electronic device obtains $RSSI_0$ when the distance between the target device K and the first electronic device is $d_0$, $Z_t$ represents a difference between $RSSI_t$ and $RSSI_0$, and based on Formula (2), $Z_t$ may be represented as Formula (3):

$$Z_t = RSSI_t - RSSI_0 = -10\gamma\log_{10}\frac{\sqrt{(x_t-a)^2 + (y_t-b)^2}}{\sqrt{(x_0-a)^2 + (y_0-b)^2}} + \chi_g(d_t) - \chi_g(d_0) \quad (3)$$

If a*,b* is used to represent an estimated value of coordinates of the target device K, the value may be represented as Formula (4):

$$a^*, b^* = \mathrm{argmin}_{a,b}\sum_{t=0}^{t=N}\omega_t(a, b)\left(Z_t + 10\gamma\log_{10}\frac{\sqrt{(x_t-a)^2 + (y_t-b)^2}}{\sqrt{(x_0-a)^2 + (y_0-b)^2}}\right)^2 \quad (4)$$

A weight $\omega_t(a,b)$ may be set based on a value of the RSSI and a shape of an antenna pattern, or may be specifically designed based on different shapes of the walking track. For example, when the user walks a broken line, a weight at a corner of the broken line may be set to a larger value; and if the user walks a circle, a weight value may be set by introducing a radius of the circle as a parameter, and a sum of weights at two ends of a same diameter is 1.

The estimated value of the coordinates of the target device K may be obtained based on Formula (4).

(2) Heatmap Method

Similarly, as shown in FIG. 12, when the user walks to the point t, the RSSI obtained when the distance between the target device K and the first electronic device is $d_t$ be calculated based on Formula (2).

A function $f_i(a,b)$ is constructed, and the coordinates of the target device K are estimated based on the function. The function may be represented as Formula (5):

$$f_i(a, b) = \sum_{t=0}^{t=N}\omega_t(a, b)\left(Z_t^i + 10\gamma\log_{10}\frac{\sqrt{(x_t-a)^2 + (y_t-b)^2}}{\sqrt{(x_0-a)^2 + (y_0-b)^2}}\right)^2 \quad (5)$$

Herein, i represents a quantity of antennas of the first electronic device. A weight $\omega_t(a,b)$ may be set based on a value of the RSSI and a shape of an antenna pattern, or may be specifically designed based on different shapes of the walking track. For example, when the user walks a broken line, a weight at a corner of the broken line may be set to a larger value; and if the user walks a circle, a weight value may be set by introducing a radius of the circle as a parameter, and a sum of weights at two ends of a same diameter is 1.

If P(a,b) is used to represent a heatmap matrix, P(a,b) may be represented as Formula (6):

$$P(a, b) = \frac{1}{(f_{CH0}(a, b) + f_{CH1}(a, b) + \ldots + f_{CHi}(a, b) + \varepsilon)} \quad (6)$$

Herein, CHi represents the $i^{th}$ antenna of the first electronic device, and $\varepsilon$ is a positive number that is small enough, so as to ensure that the denominator is not 0.

If a*,b* is used to represent an estimated value of coordinates of the target device K, the value may be represented as Formula (7):

$$a^*,b^* = \mathrm{argmax}_{a,b}P(a,b) \quad (7)$$

A maximum value in the heatmap matrix is searched for by calculating the heatmap matrix P(a,b). If a point has a highest confidence, and the point is a coordinate location of the target device K.

Figure 13:
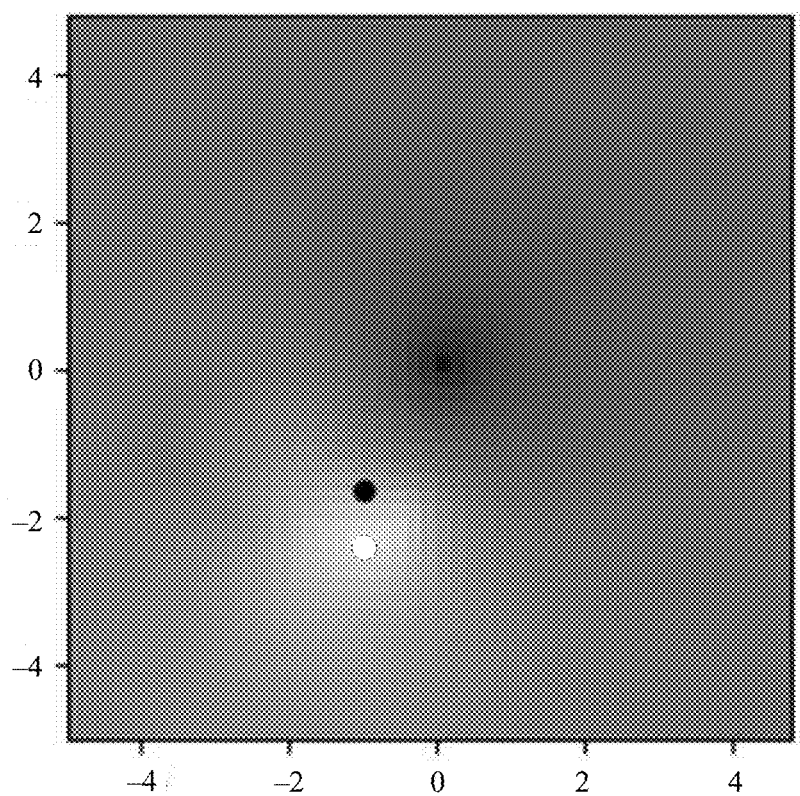
FIG. 13 is a schematic diagram of implementing estimation of a location of a to-be-positioned target device by using a heatmap method according to an embodiment of this application.

FIG. 13 is a schematic diagram of implementing estimation of a location of a to-be-positioned target device by using a heatmap method according to an embodiment of this application.

A small black solid circle represents an actual location of the target device K, and a small white dashed circle represents a location at which a maximum value in the heatmap is obtained based on the positioning algorithm. It can be learned that a deviation between the location that is of the target device K and that is obtained based on the positioning algorithm and the actual location of the target device K is small.

Manner 2: A moving manner of positioning is an in-place rotation manner.

When the moving manner selected by the user for positioning is the in-place rotation manner, the first electronic device may invoke an attitude/heading algorithm or an existing application programming interface (application programming interface. API), for example, an AR engine interface based on read data, and obtain a real-time attitude angle (also referred to as an Euler angle): a pitch angle, a roll angle, or an azimuth (also referred to as a yaw angle).

To help understand the solutions in this application, the following first briefly describes the attitude angle.

Figure 14:
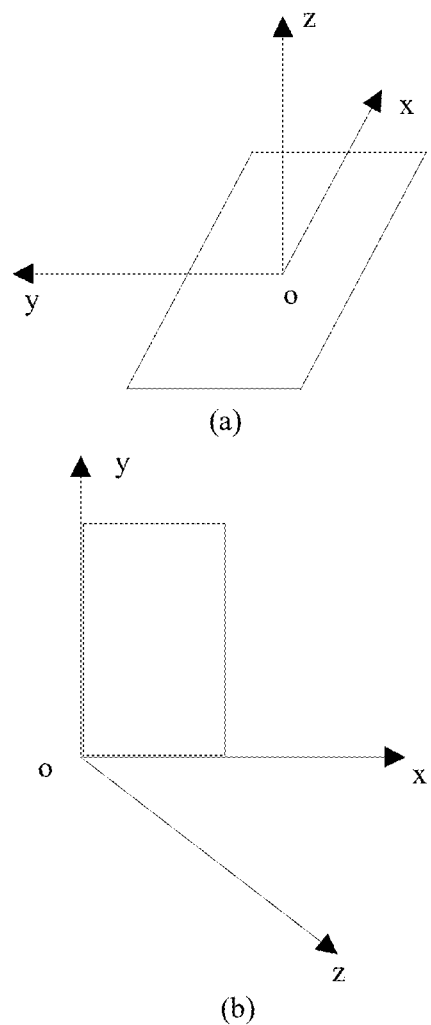
FIG. 14 is a schematic diagram of a coordinate system according to an embodiment of this application.

FIG. 14 is a schematic diagram of a coordinate system according to an embodiment of this application. Refer to (a) in FIG. 14. A quadrilateral shown in the figure may be imagined as the first electronic device. The roll angle is formed in a process in which the first electronic device rotates around an x-axis: the pitch angle is formed in a process in which the first electronic device rotates around a y-axis; and the azimuth is formed in a process in which the first electronic device rotates around a z-axis.

Refer to (b) in FIG. 14. Similarly, a rectangle shown in the figure may be imagined as the first electronic device. The pitch angle is formed in a process in which the first electronic device rotates around an x-axis; the roll angle is formed in a process in which the first electronic device rotates around a y-axis; and the azimuth is formed in a process in which the first electronic device rotates around a z-axis.

In a rotation process, the user holds the first electronic device in hand (by using one hand/two hands) and an arm stretches straight (a distance existing when the arm stretches straight may be extended by using an auxiliary device, for example, a selfie stick), a front end of the first electronic device faces an outward direction along the arm or is perpendicular to an outward direction of the arm, and the first electronic device is kept horizontal. Reference may be made to a schematic diagram shown in FIG. 15.

Figure 15:
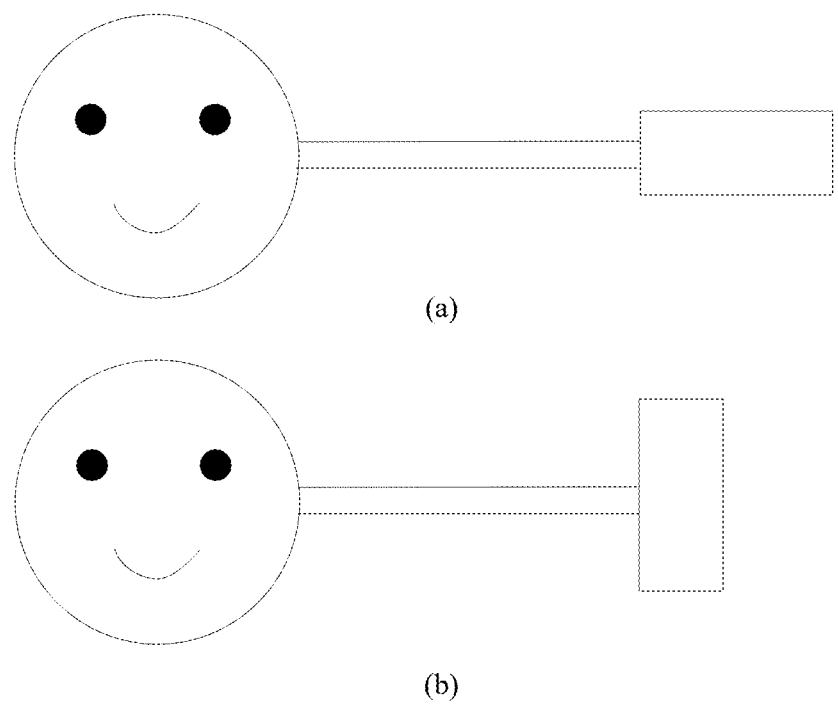
FIG. 15 is a schematic diagram of a holding manner used when a user makes in-place motion according to an embodiment of this application.

FIG. 15 is a schematic diagram of a holding manner used when a user makes in-place motion according to an embodiment of this application. As shown in (a) in FIG. 15, in this case, the user holds the first electronic device in hand and the arm stretches straight, the front end of the first electronic device faces the outward direction along the arm, and the first electronic device is kept horizontal. As shown in (b) in FIG. 15, in this case, the user holds the first electronic device in hand and the arm stretches straight, the front end of the first electronic device is perpendicular to the outward direction of the arm, and the first electronic device is kept horizontal.

Figure 16:
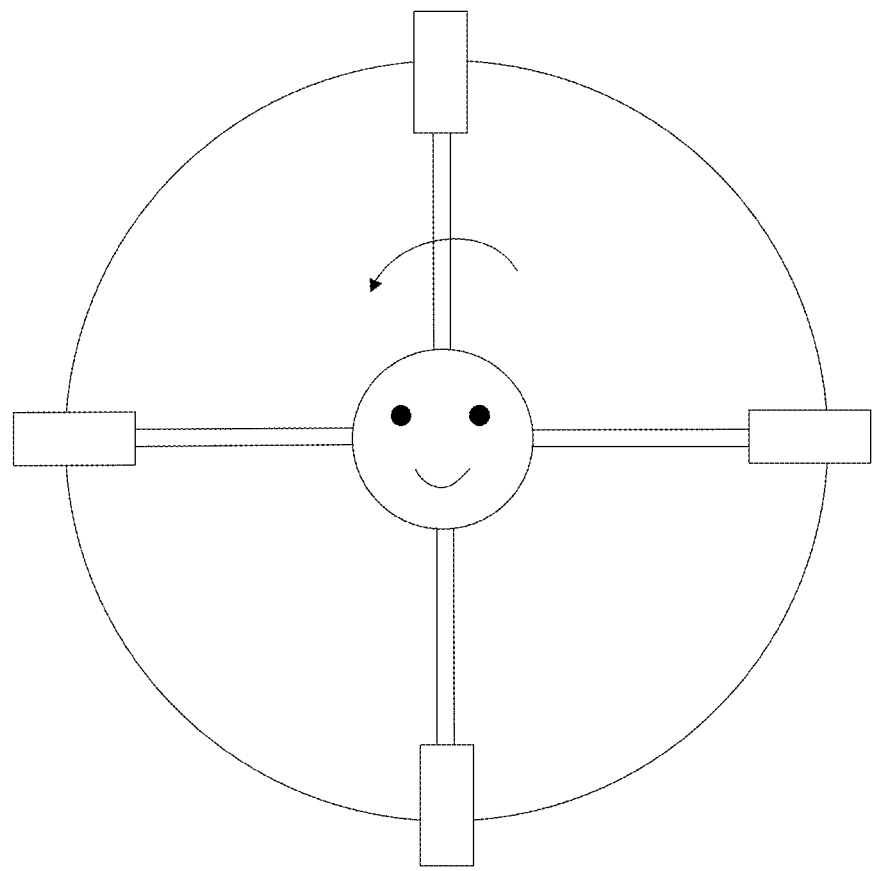
FIG. 16 is a schematic diagram in which a user performs in-place rotation according to an embodiment of this application.

FIG. 16 is a schematic diagram in which a user performs in-place rotation according to an embodiment of this application. It can be learned from the figure that, the user holds the first electronic device in hand and the arm stretches straight, the front end of the first electronic device faces the outward direction along the arm, feet are slowly moved by using a standing point as a circle center and using a length of the arm as a radius, to change a direction, and counterclockwise rotation is performed.

In the moving manner of positioning, in a process in which the user performs in-place rotation, a process in which the first electronic device obtains azimuth data is as follows:

An azimuth existing at an initial stage of rotation is recorded as a reference azimuth.

Whether the pitch angle and the roll angle fall within an interval (for example, from −10° to 10°, where an angle in the interval may be a preset attitude angle) is determined. If the pitch angle and the roll angle do not fall within the interval, the user is prompted to keep the first electronic device horizontal, as shown in the GUI shown in FIG. 5(i): or if the pitch angle and the roll angle do not fall within the interval for a long period of time, the user is prompt with "The posture is abnormal, and a positioning result may be inaccurate" (corresponding to the second prompt information in this application), as shown in the GUI shown in FIG. 5(j).

In some embodiments, a deviation between the pitch angle or the roll angle obtained in the process in which the user performs in-place rotation and a preset attitude angle is greater than a second threshold, and the user may be prompted with information indicating to keep a holding manner of the first electronic device or information indicating that a positioning result may be inaccurate.

The second threshold may be a default value of the first electronic device, or may be a value entered by the user. This is not limited.

The azimuth data and a timestamp of the azimuth data existing during rotation are recorded. If the timestamp is not a start moment and a current azimuth is "equal to" a reference azimuth, 1 is added to a quantity of circles of rotation, and the user is prompted with a current quantity of circles of rotation, as shown in the GUIs shown in FIG. 5(h) and FIG. 5(k).

After the quantity of circles reaches N (for example, 3), the user is prompted to stop rotation, as shown in the GUI shown in FIG. 5(l).

In some embodiments, the user may alternatively autonomously choose to stop rotation. This is not limited.

The first electronic device may find, based on a change of the attitude angle and a change of a time sequence in the Wi-Fi feature by using a crest method or a trough method, an azimuth corresponding to a maximum value of the RSSI, that is, a direction of the target device, and may obtain the distance between the target device and the first electronic device based on a radio signal propagation model.

It should be noted that, in this embodiment of this application, the first electronic device can display the location information of the target device in real time based on the preset option. For example, the positioning result of the target device may be updated each time the quantity of circles is increased by one. Alternatively, the positioning result of the target device may be updated each time the quantity of circles is increased by a half circle. The foregoing update frequency may be set based on a computing capability of the first electronic device.

(1) Direction Estimation

The RSSI obtained when the distance between the target device K and the first electronic device is $d_t$ may still be calculated based on Formula (2).

Figure 17:
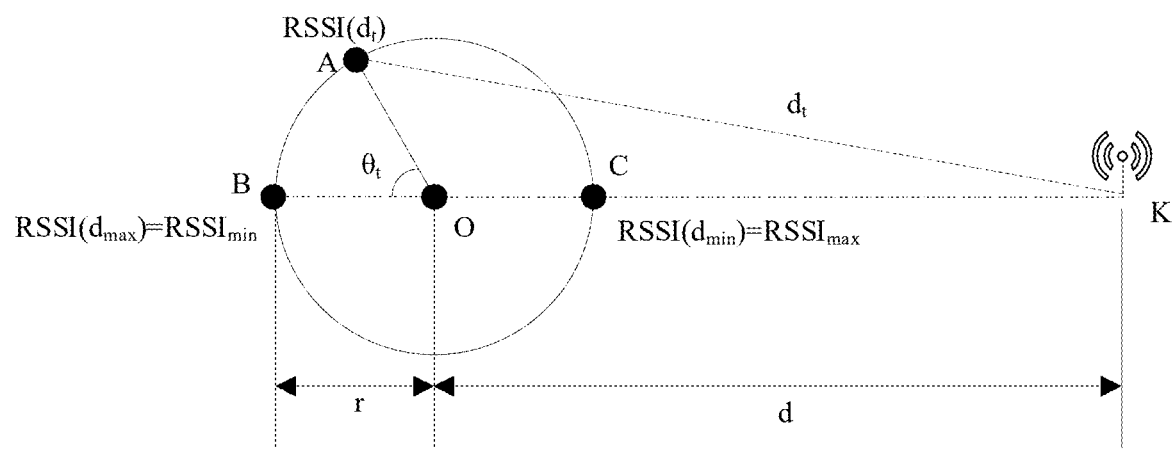
FIG. 17 is a schematic diagram of positioning a target device K in a moving manner of in-place rotation according to an embodiment of this application.

FIG. 17 is a schematic diagram of positioning a target device K in a moving manner of in-place rotation according to an embodiment of this application. In the figure, a circle center O is a standing point of a user holding the first electronic device in hand, a straight-line distance between the standing point of the user and the target device K is d, a length of an arm of the user is r, and A. B, and C are respectively different points formed when the user slowly moves and rotates by using the standing point as the circle center and using the length of the arm as a radius. The different points are locations at which the user holds the first electronic device in hand. The point A is a point to which the user holds the first electronic device in hand and rotates and at which the azimuth is $\theta_t$ and a distance between the point A and the target device K is $d_t$. The point B is a point to which the user holds the first electronic device in hand and rotates and that is farthest away from the target device K, and a distance is $d_{min}$. An RSSI obtained at the point B has a minimum value, and is $RSSI_{min}$. The point C is a point to which the user holds the first electronic device in hand and rotates and that is closest to the target device K, and a distance is $d_{min}$. An RSSI obtained at the point C has a maximum value, and is $RSSI_{max}$.

When a distance between the target device K and a hand of the user is $d_t$, the first electronic device obtains $RSSI(d_t)$, and when the distance between the target device K and the hand of the user is $d_{min}$, the first electronic device obtains $RSSI(d_{min})$. A difference between $RSSI(d_t)$ and $RSSI(d_{min})$ may be represented as Formula (8):

$$RSSI(d_{min}) - RSSI(d_t) = -10\gamma \log_{10}\left(\frac{d_t}{d_{min}}\right) + x_g(d_{min}) - x_g(d_t) \quad (8)$$

Herein, $d_t = \sqrt{(d+r\cos\theta_t)^2 + (r\sin\theta_t)^2 + h^2}$ $\theta_t = [(\theta_{dt}+\pi) \bmod 2\pi] - \theta_{d\,min}$ $d_{min} = \sqrt{(d-r)^2 + h^2}$ Herein, $RSSI(d_{min})$ indicates an RSSI obtained by the first electronic device when the distance between the target device K and the hand of the user is $d_{min}$, $d_{min}$ is a distance between the hand and the target device K when the hand rotates to the point C in FIG. 17, a rotation radius r is the length of the arm of the user, a rotation angle $\theta_t$ is provided by using an azimuth in motion data, and h is a height of the target device K from the ground. It may be understood that, h is 0 in the two-dimensional coordinate system.

It is assumed that the user rotates by three circles in the moving manner of positioning, and real-time azimuth data of each circle and an RSSI corresponding to the real-time azimuth data of each circle may be calculated based on the foregoing formula.

Figure 18:
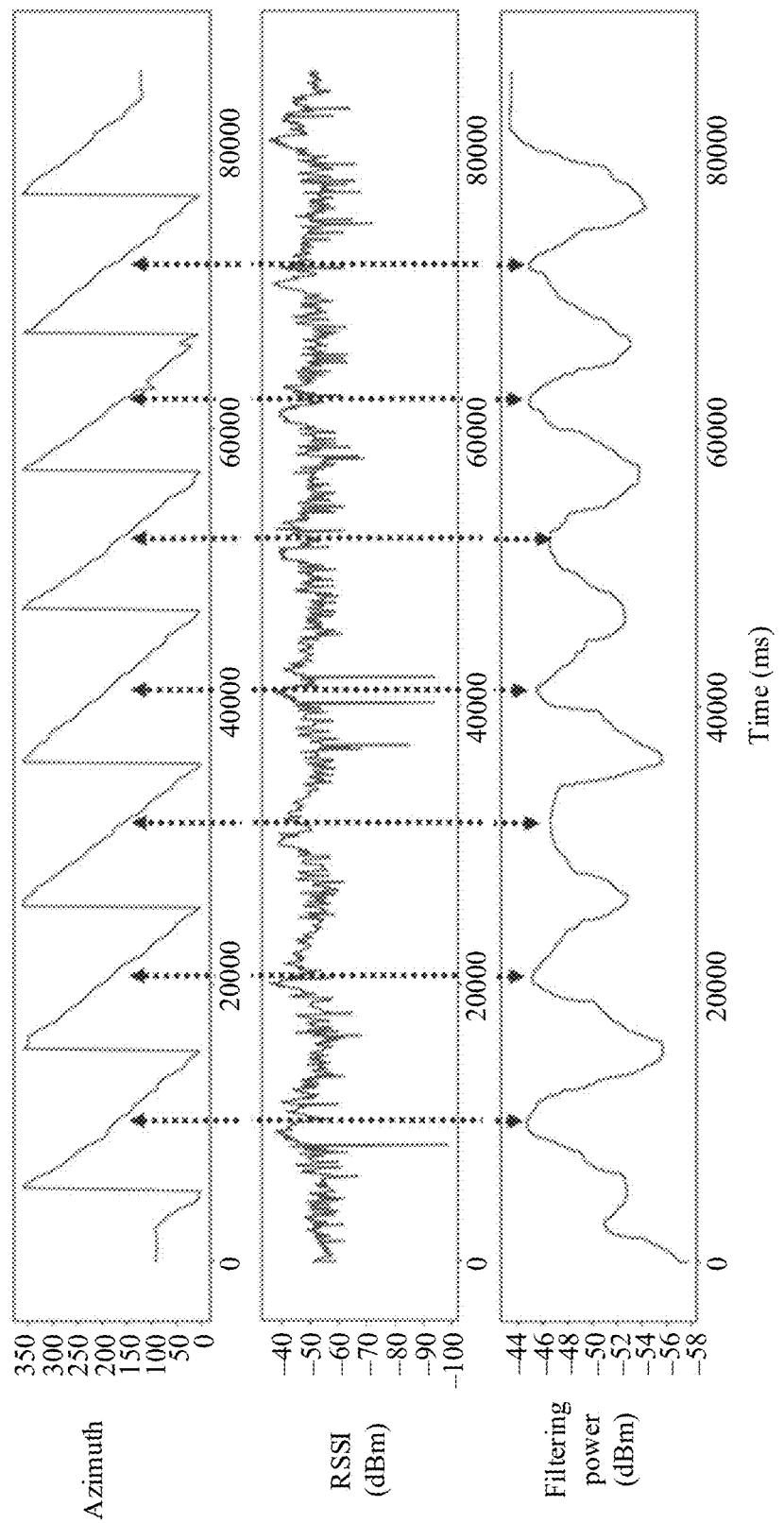
FIG. 18 is a schematic diagram of a result obtained by positioning a target device K in a moving manner of in-place rotation according to an embodiment of this application.

FIG. 18 is a schematic diagram of a result obtained by positioning a target device K in a moving manner of in-place rotation according to an embodiment of this application.

A top graph indicates a real-time azimuth obtained when the user rotates. A middle graph indicates the value of the RSSI measured in real time. A bottom graph indicates a filtering power. A corresponding azimuth may be found in each circle (which may also be understood as a period, where each circle by which the user rotates is one period) based on an RSSI crest.

It can be learned from FIG. 18 that an azimuth obtained when the user initially rotates is 100°, and the value of the RSSI is largest when the user rotates to a location corresponding to an azimuth of approximately 150°. In addition, it can be learned from the following plurality of circles that the value of the RSSI is largest when the user rotates to the location corresponding to the azimuth of approximately 1500 in each circle. Therefore, it may be considered that the target device K is located in the direction.

(2) Distance Estimation $$\min_{d,h} = \sum_{t=0}^{t=N} \omega_t[RSSI(d_t)]\left[RSSI(d_{min}) - RSSI(d_t) + 10\gamma\log\left(\frac{d_t}{d_{min}}\right)\right]^2 \quad (9)$$

A weight $\omega_t[RSS(d_t)]$ may be flexibly set based on the value of the RSSI. For example, a larger value of the RSSI indicates a larger weight. Therefore, the weight is $\omega_t[RSSI(d_t)] = [RSSI(d_t) - RSSI_{min}]/[RSSI_{max} - RSSI_{min}]$.

It may be understood that, if the two-dimensional coordinate system is used as an example, h is 0.

Manner 3: A moving manner of positioning is an in-place arm swinging manner.

Figure 19:
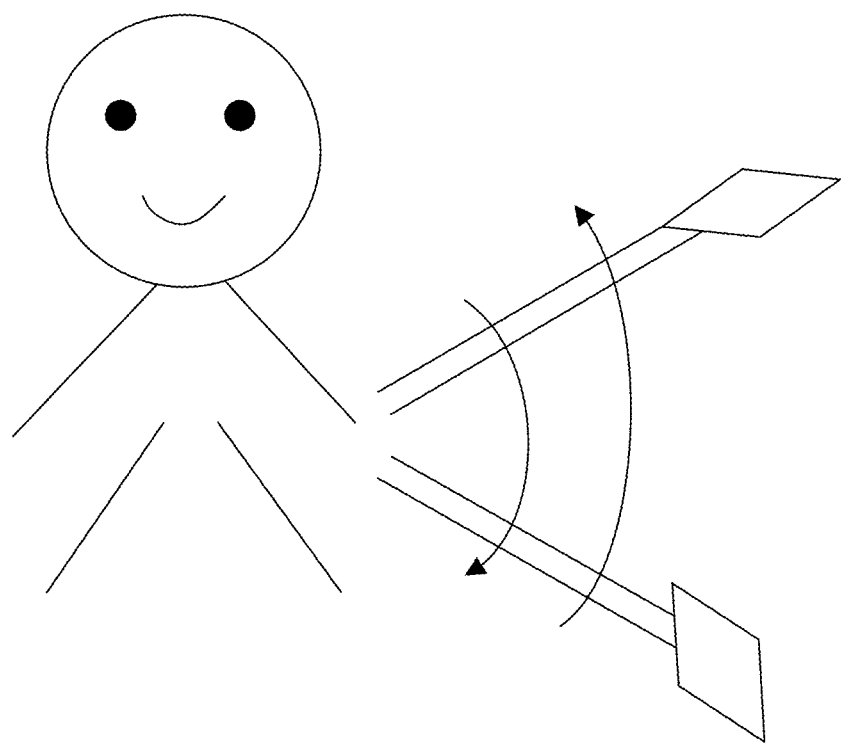
FIG. 19 is a schematic diagram in which a user performs in-place arm swinging according to an embodiment of this application.

FIG. 19 is a schematic diagram in which a user performs in-place arm swinging according to an embodiment of this application. It can be learned from the figure that the user holds the first electronic device in hand and the arm stretches straight, the front end of the first electronic device faces the outward direction along the arm, and the arm swings back and forth in two-dimensional space by using a fastened standing point as a circle center and using a length of the arm as a radius.

In the moving manner, in a process in which the user performs in-place arm swinging, a process in which the first electronic device obtains the real-time attitude angle is as follows:

A pitch angle and an azimuth existing at an initial stage of in-place arm swinging are used as a reference.

Whether the roll angle falls within an interval (for example, from −10° to 10°, where an angle in the interval may be a preset attitude angle) is determined. If the roll angle does not fall within the interval, the user is prompted to keep the holding manner of the first electronic device, as shown in the GUI shown in FIG. 6(i): or if the roll angle does not fall within the interval for a long period of time, the user is prompt with "The posture is abnormal, and a positioning result may be inaccurate" (corresponding to the second prompt information in this application), as shown in the GUI shown in FIG. 6(j).

In some embodiments, a deviation between the pitch angle or the azimuth obtained in the process in which the user performs in-place arm swinging and a preset attitude angle is greater than a second threshold, and the user may be prompted with information indicating to keep a holding manner the first electronic device or information indicating that a positioning result may be inaccurate.

The second threshold may be a default value of the first electronic device, or may be a value entered by the user. This is not limited.

A data pair (the pitch angle and the azimuth) and a timestamp existing during arm swinging are recorded. If the timestamp is not a start moment and a current pitch angle and a current azimuth are "equal to" a reference value, a quantity of times of arm swinging is increased by 1, and the user is prompted with a current quantity of times of arm swinging, as shown in the GUIs shown in FIG. 6(h) and FIG. 6(k).

After the quantity of times reaches N (for example, 3), the user is prompted to stop arm swinging, as shown in the GUI shown in FIG. 6(l).

In some embodiments, the user may alternatively autonomously choose to stop arm swinging. This is not limited.

The first electronic device may find, based on a change of the attitude angle and a change of a time sequence in the Wi-Fi feature by using a crest method or a trough method, an azimuth corresponding to a maximum value of the RSSI, that is, a direction of the target device K, and may obtain the distance between the target device K and the current first electronic device based on a radio signal propagation model.

It should be noted that in this embodiment of this application, the positioning result of the target device K may be updated each time the quantity of times of arm swinging is increased by 1, or the positioning result of the target device K may be updated each time the quantity of times of arm swinging is increased by 0.5. This is not limited.

Figure 20:
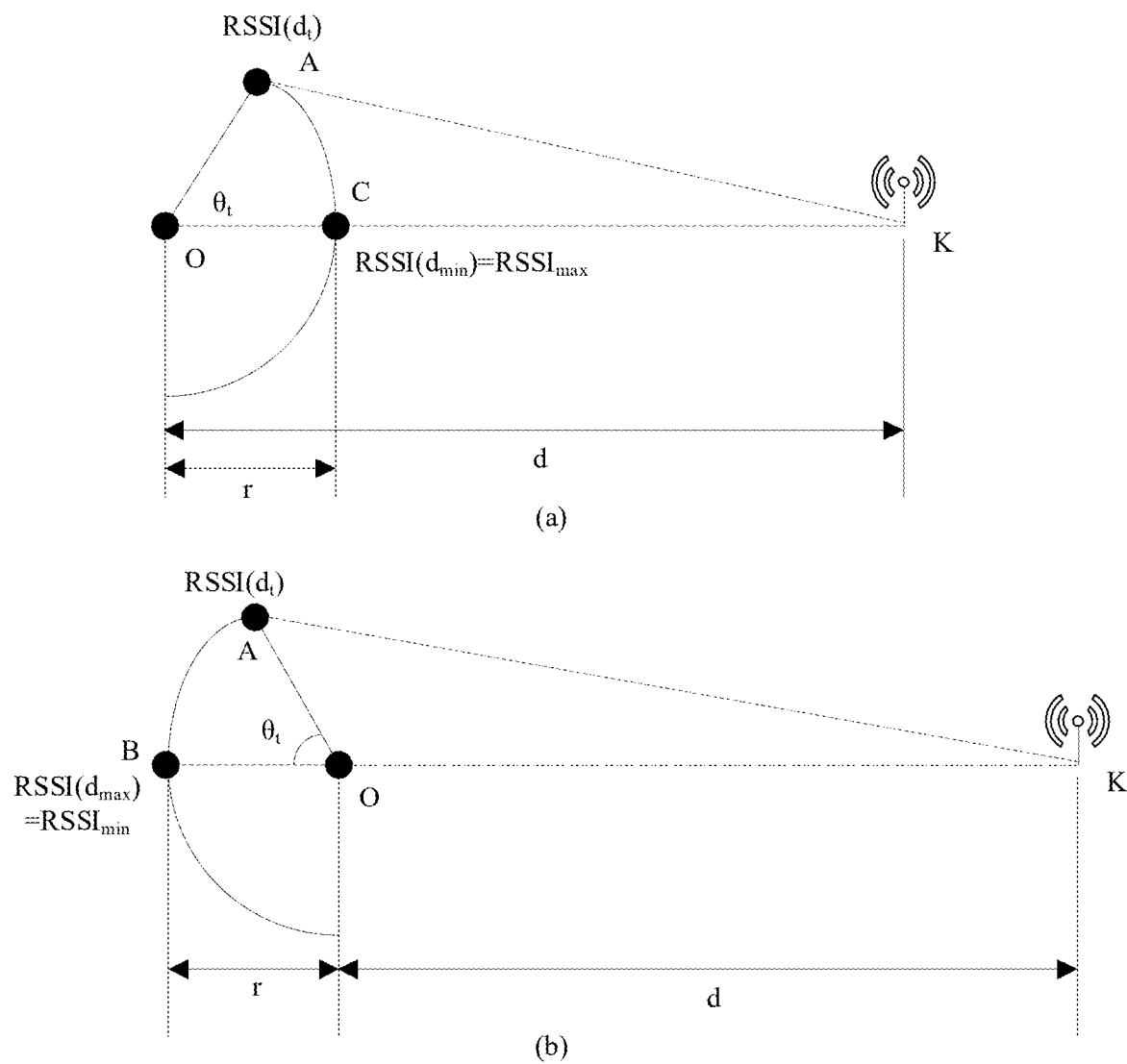
FIG. 20 is a schematic diagram in which a user positions a target device in an in-place arm swinging manner according to an embodiment of this application.

FIG. 20 is a schematic diagram in which a user positions a target device in an in-place arm swinging manner according to an embodiment of this application.

Refer to (a) in FIG. 20. A circle center O in the figure is a standing point of the user, K is a location of the target device K. and A and C are respectively different points formed when the user slowly swings an arm by using the standing point as the circle center and using the length of the arm as a radius (The different points are locations at which the user holds the first electronic device in hand).

The azimuth estimation and the distance estimation are similar to those in the in-place rotation manner, and a difference lies in an angle range. An angle range of in-place rotation may be (0°, 360°), and an angle range of in-place arm swinging may be (0°, 180°). As shown in (a) in FIG. 20, the user is standing facing the target device and performs in-place arm swinging. In this case, the direction may be estimated by using the crest method. For a specific process, refer to the foregoing estimation process existing during in-place rotation. For brevity, details are not described herein again.

(b) in FIG. 20 is basically similar to (a) in FIG. 20. A difference lies in that the user is standing opposite to the target device K and performs in-place arm swinging. In this case, the direction may be estimated by using the trough method. For a specific process, refer to the foregoing estimation process existing during in-place rotation. For brevity, details are not described herein again.

If the target device determined in step S1212 is the first electronic device, and Wi-Fi feature information of a Wi-Fi hotspot apparatus with known geographical location information is obtained in step S1216, the device K in the moving track estimation algorithm and the positioning algorithm is the Wi-Fi hotspot apparatus. Based on the known geographical location information, the first electronic device can inversely calculate a geographical location of the first electronic device. To position the current device, if the location of the first electronic device is positioned, positioning ends.

If the target device is another electronic device different from the first electronic device, steps in the search stage may continue to be performed.

Search Stage:

S1220: Receive a second input operation performed by the user.

The second input operation performed by the user may be the following input operation: an input operation that the user selects an option of whether to search for a device under guidance in FIG. 7(n).

S1222: In response to the second input operation, obtain the Wi-Fi feature information of the second electronic device and the motion information of the first electronic device when the first electronic device continues to move.

S1224: Display location information of the first electronic device and updated location information of the target device based on the Wi-Fi feature information and the motion information.

In the search stage, the first electronic device may use the following policy to guide the user to search for the target device.

Policy 1: Real-Time Compass Guidance (1) After the positioning stage ends, if the moving manner of positioning is the in-place rotation manner or the in-place arm swinging manner, an east (X)-north (Y)-sky (Z) coordinate system is established by using an end point as an origin of coordinates; and if the moving manner of positioning is not the in-place rotation manner or the in-place arm swinging manner, a coordinate system used in the walking manner is still used.

(2) In this embodiment of this application, the two-dimensional coordinate system is used as an example. Therefore, an XY plane coordinate system may be established.

(3) If the moving manner of positioning is the in-place rotation manner or the in-place arm swinging manner, the coordinates of the target device are inversely calculated based on the estimated direction and the estimated distance.

(4) After the user moves to a point, current coordinates are updated based on the track estimation algorithm, the Wi-Fi feature and the motion data continue to be captured, the coordinates of the target device are updated by using a positioning algorithm used in a case of random movement, and the direction estimation and the distance estimation are updated with reference to the current coordinates and the updated coordinates of the target device.

A guidance interface of the compass is updated based on latest orientation estimation and distance estimation.

For example, an example in which the moving manner of positioning in the positioning stage is the in-place rotation manner or the in-place arm swinging manner is used for description.

Figure 21:
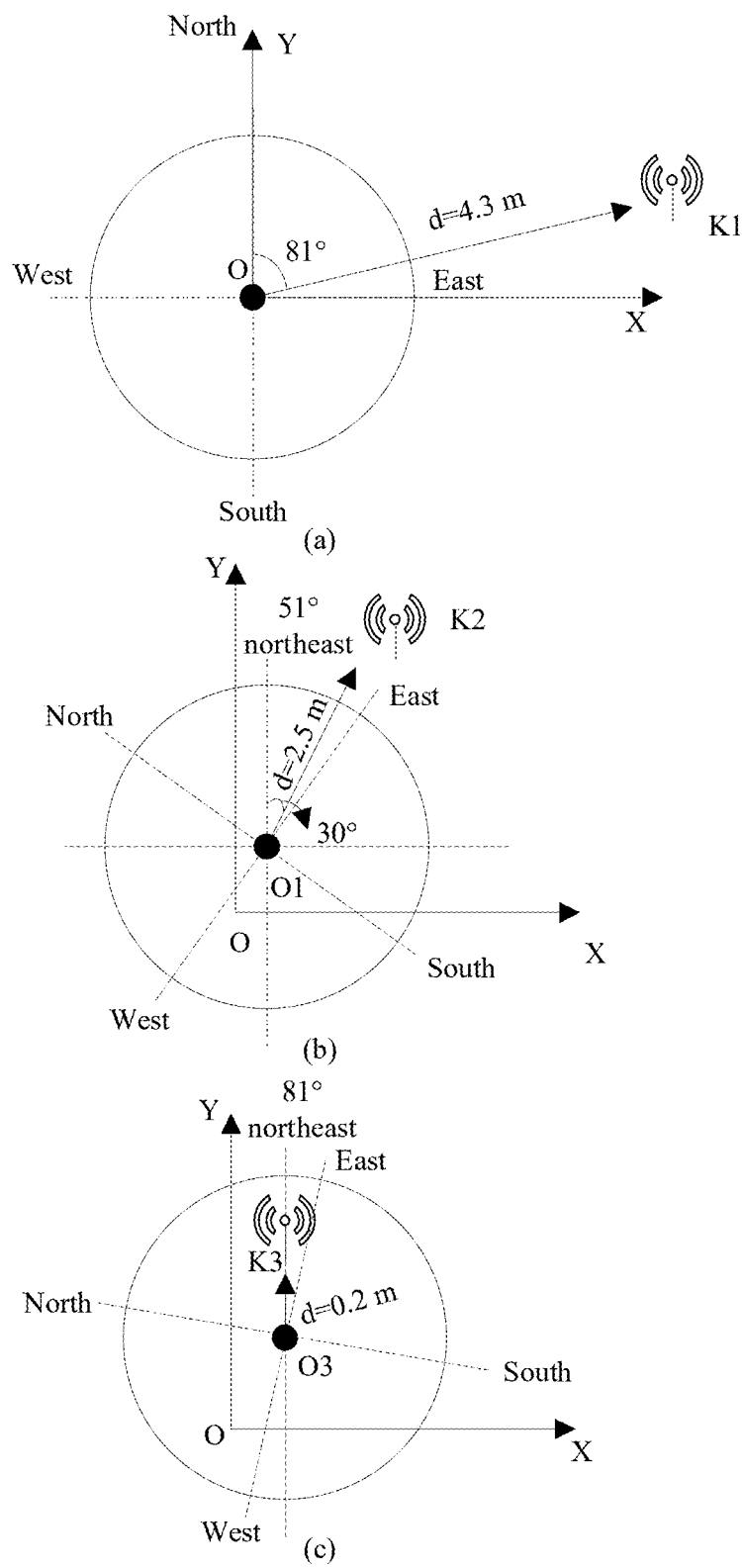
FIG. 21 is a schematic diagram of guiding, based on a real-time compass, a user to search for a target device according to an embodiment of this application.

FIG. 21 is a schematic diagram of guiding, based on a real-time compass, a user to search for a target device according to an embodiment of this application. (a) in FIG. 21 to (c) in FIG. 21 respectively show real-time locations of the target device in a compass interface at different moments.

Refer to (a) in FIG. 21. The XY coordinate system is established by using a user O as a circle center. It can be learned that the target device is located at a location that is in a direction 81° east of north of the user and that is 4.3 m away from the user. In this case, the coordinates of the target device may be first inversely parsed out based on the direction and the distance.

That is, $x1=4.3*\sin 81°=4.247$, and $y1=4.3*\cos 81°=0.672$.

That is, coordinates of a point K1 in (a) in FIG. 21 are (4.247, 0.672). In other words, in the coordinate system, the coordinates of the target device are (4.247, 0.672).

When the user moves to a point O1, as shown in (b) in FIG. 21, the first electronic device updates the coordinates of the target device by using the positioning algorithm used in the case of random movement. In this case, coordinates of the target device at a point K2 are (1.650, 2.865).

Assuming that the current coordinates of the first electronic device are (0.400, 0.700), the direction estimation and the distance estimation may be updated based on the current coordinates of the first electronic device and the updated coordinates of the target device.

When the user is located at the point O1, coordinates of the first electronic device in the coordinate system are (0.400, 0.700), the coordinates of the target device at the point K2 are (1.650, 2.865), a distance and a direction between the first electronic device and the target device may be calculated based on the coordinates of the first electronic device and the coordinates of the target device.

It can be learned from (b) in FIG. 21 that, in this case, the target device is located at a location that is in a direction 30° east of 51° northeast of the user and that is 2.5 m away from the user.

The user continues to move. When the user moves to a point O2, as shown in (c) in FIG. 21, the first electronic device updates the coordinates of the target device by using the positioning algorithm used in the case of random movement. In this case, coordinates of the target device at a point K3 are (0.600, 1.200).

Assuming that the current coordinates of the first electronic device are (0.600, 1.000), the direction estimation and the distance estimation may be updated based on the current coordinates of the first electronic device and the updated coordinates of the target device.

When the user is located at a point O3, coordinates of the first electronic device in the coordinate system are (0.600, 1.000), the coordinates of the target device at the point K2 are (0.600, 1.200), a distance and a direction between the first electronic device and the target device may be calculated based on the coordinates of the first electronic device and the coordinates of the target device.

It can be learned from (c) in FIG. 21 that, in this case, the target device is located at a location that is in a direction 81° northeast of the user and that is 0.2 m away from the user, and a guided search ends, to implement positioning of the target device.

It should be noted that the foregoing values are merely an example for description, may be other values in some embodiments, and should not be construed as a particular limitation on this application.

In the search stage, for a process in which the real-time compass is used to guide the user to search or search for the target device, refer to GUIs shown in FIG. 7(r) to FIG. 7(t).

Policy 2: Real-Time Map Guidance (1) After the positioning stage ends, if the moving manner of positioning is the in-place rotation manner or the in-place arm swinging manner, an east-north-sky coordinate system is established by using an end point as an origin of coordinates; and if the moving manner of positioning is not the in-place rotation manner or the in-place arm swinging manner, a coordinate system used in the walking manner is still used.

(2) If the moving manner of positioning is the in-place rotation manner or the in-place arm swinging manner, coordinates of an unknown target device are inversely calculated based on the estimated direction and the estimated distance.

(3) After the user moves to a point, current coordinates are updated based on the track estimation algorithm, the Wi-Fi feature continues to be captured, coordinates of an unknown target device are updated based on the positioning algorithm, and in the map, a coordinate location of the unknown target device is updated, the current coordinates are updated, and a current direction of the first electronic device is updated.

For example, an example in which the moving manner of positioning in the positioning stage is the walking manner is used for description.

Figure 22:
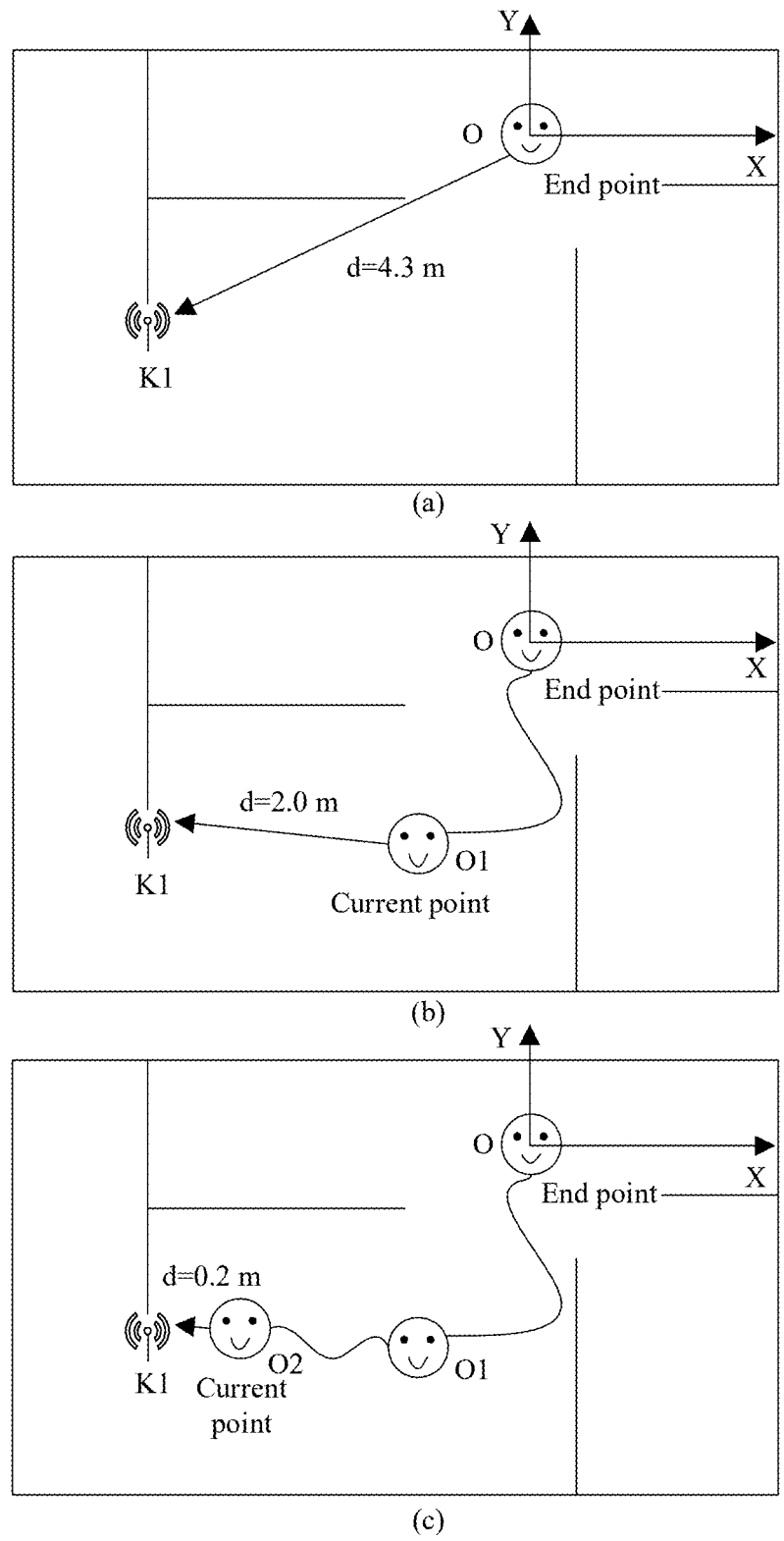
FIG. 22 is a schematic diagram of guiding, based on a real-time map, a user to search for a target device according to an embodiment of this application.

FIG. 22 is a schematic diagram of guiding, based on a real-time map, a user to search for a target device according to an embodiment of this application. (a) in FIG. 22 to (c) in FIG. 22 respectively show locations of the target device in a map interface at different moments.

Refer to (a) in FIG. 22. An XY coordinate system is established by using the user O as a circle center (the point O may be understood as a location existing after the positioning stage ends). It can be learned that the target device is located at a location that is in a lower left direction of the user and that is 4.3 m away from the user.

When the user moves to the point O1, as shown in (b) in FIG. 22, the first electronic device updates the coordinates of the target device, the current coordinates of the first electronic device, the current direction of the first electronic device, and the like based on the positioning algorithm used in the walking manner.

It can be learned that, in this case, the target device is located at a location that is on a left side of the user and that is 2.0 m away from the user.

The user continues to move. When the user moves to the point O2, as shown in (c) in FIG. 22, the first electronic device updates the coordinates of the target device, the current coordinates of the first electronic device, the current direction of the first electronic device, and the like based on the positioning algorithm used in the walking manner.

It can be learned that, in this case, the target device is located a location that is near the user and that is 0.2 m away from the user, and positioning ends, to implement positioning of the target device.

It should be noted that the foregoing values are merely an example for description, may be other values in some embodiments, and should not be construed as a particular limitation on this application.

In the search stage, for a process in which the real-time map is used to guide the user to search or search for the target device, refer to GUIs shown in FIG. 7(o) to FIG. 7(q).

In some embodiments, if the user does not find the target device based on the positioning algorithm, the first electronic device may continue to update the positioning algorithm to guide the user to search for the target device, until the target device is found.

According to the solution provided in this application, the to-be-positioned target device and the predetermined moving track of the first electronic device are determined, the Wi-Fi feature information of the second electronic device and the motion information of the first electronic device are obtained in the process in which the first electronic device moves along the predetermined moving track, and the location information of the target device can be finally displayed. In this solution, a plurality of Wi-Fi hotspot apparatuses with known geographical location information do not need to be used, and a plurality of virtual Wi-Fi reference points are formed by moving the first electronic device. The target device can be positioned by simply moving only one electronic device. This solution is applicable to many scenarios, is less constrained by an environment, and is not easily interfered with by a signal in the environment, thereby effectively improving precision of positioning the target device.

A scenario in which a target device is a camera and a first electronic device positions the camera is used as an example to describe a positioning method in an embodiment of this application.

FIG. 23(a) to FIG. 23(l) show a group of GUIs of a first electronic device. Refer to a GUI shown in FIG. 23(a). The GUI is a home screen of the first electronic device. After detecting an operation that a user taps an icon 2301 of a first application on the home screen, the first electronic device may open the first application, and display a GUI shown in FIG. 23(b). The GUI may be referred to as a camera detection description interface. Because the first application is used to detect a camera, an identifier of the camera is used as the icon 2301 of the first application.

Figures 23A, 23B, 23C:
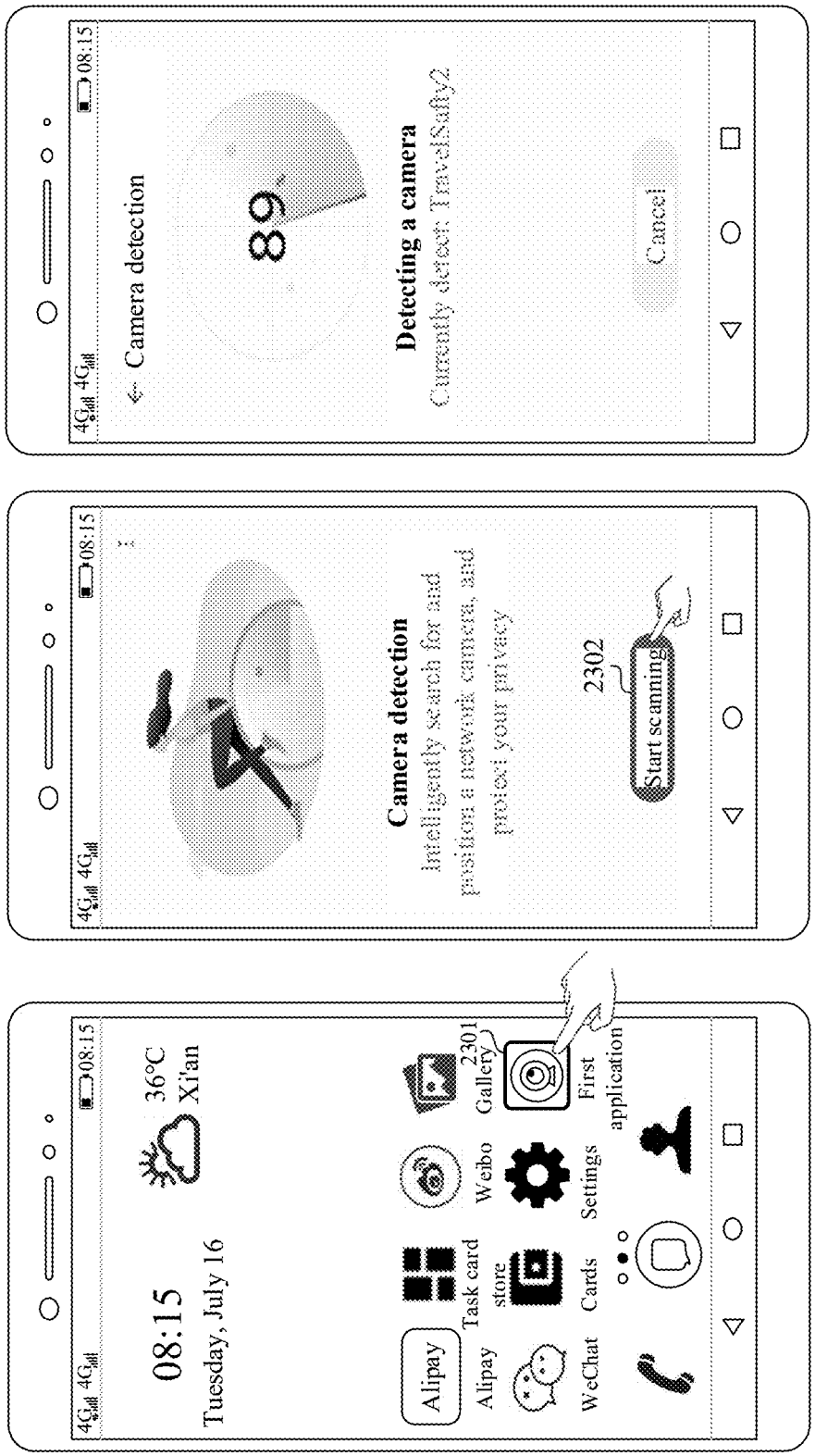
FIG. 23(*a*) to FIG. 23(*l*) are schematic diagrams of a further group of GUIs according to an embodiment of this application.

Refer to the GUI shown in FIG. 23(b). An interface of the first electronic device may prompt the user with a function of the first application, for example, may display "Intelligently search for and position a network camera, and protect your privacy". After reading this description, the user selects "Start scanning". After the first electronic device detects an operation that the user taps an icon 2302 of "Start scanning", the first electronic device displays a GUI shown in FIG. 23(c).

A GUI shown in FIG. 23(c) is the GUI is an interface in which the first electronic device is performing scanning. 89% shown in the figure indicates that a current detection progress of the first electronic device is 89%, and hotspot information covered on a currently detected channel may be further displayed in the figure.

After the detection progress is completed, if the mobile phone detects that three cameras exist in current space, the interface of the first electronic device may display "Three cameras are found", prompt information "it is advised to position a detailed location", and detailed information corresponding to the three cameras: "Device 1: TravelSafly2" and corresponding MAC address information "44:ee:bf:09:9d:23", "Device 2: TravelSafly2" and corresponding MAC address information "80:9f:9b:e1:2b:2b", and "Device 3: TravelSafly2" and corresponding MAC address information "38:01:46:95:6a:44" that are shown in FIG. 23(d). Then, the user may start to position the camera based on a requirement. After detecting an operation that the user taps a positioning icon corresponding to a device (for example, a positioning icon 2303 of a device 1), the first electronic device displays a GUI shown in FIG. 23(e).

Refer to a GUI shown in FIG. 23(e). The interface of the first electronic device may display "How to position a camera" and a positioning description. The description may be "Please hold the device smoothly and slowly walk through all areas". After it is ensured that "Positioning description" is read and understood, an icon 2304 of "Know" may be tapped. After detecting an operation that the user taps the icon 2304 of "Know", the first electronic device displays a GUI shown in FIG. 23(f).

Refer to a GUI shown in FIG. 23(f). The interface of the first electronic device may display the following prompt information "Please hold the device smoothly and keep still" and a current device state "Initializing positioning". After initialization of the first electronic device is completed, a GUI shown in FIG. 23(g) may be displayed.

It should be noted that, when positioning is started in this embodiment, the current device state displayed in the GUI interface of the first electronic device is "Initializing positioning". In some other embodiments, when positioning is started, the GUI interface of the first electronic device may alternatively display "Enabling a hardware positioning capability". Specific content of a device state description is not limited in this application.

Figures 23G, 23H, 23I:
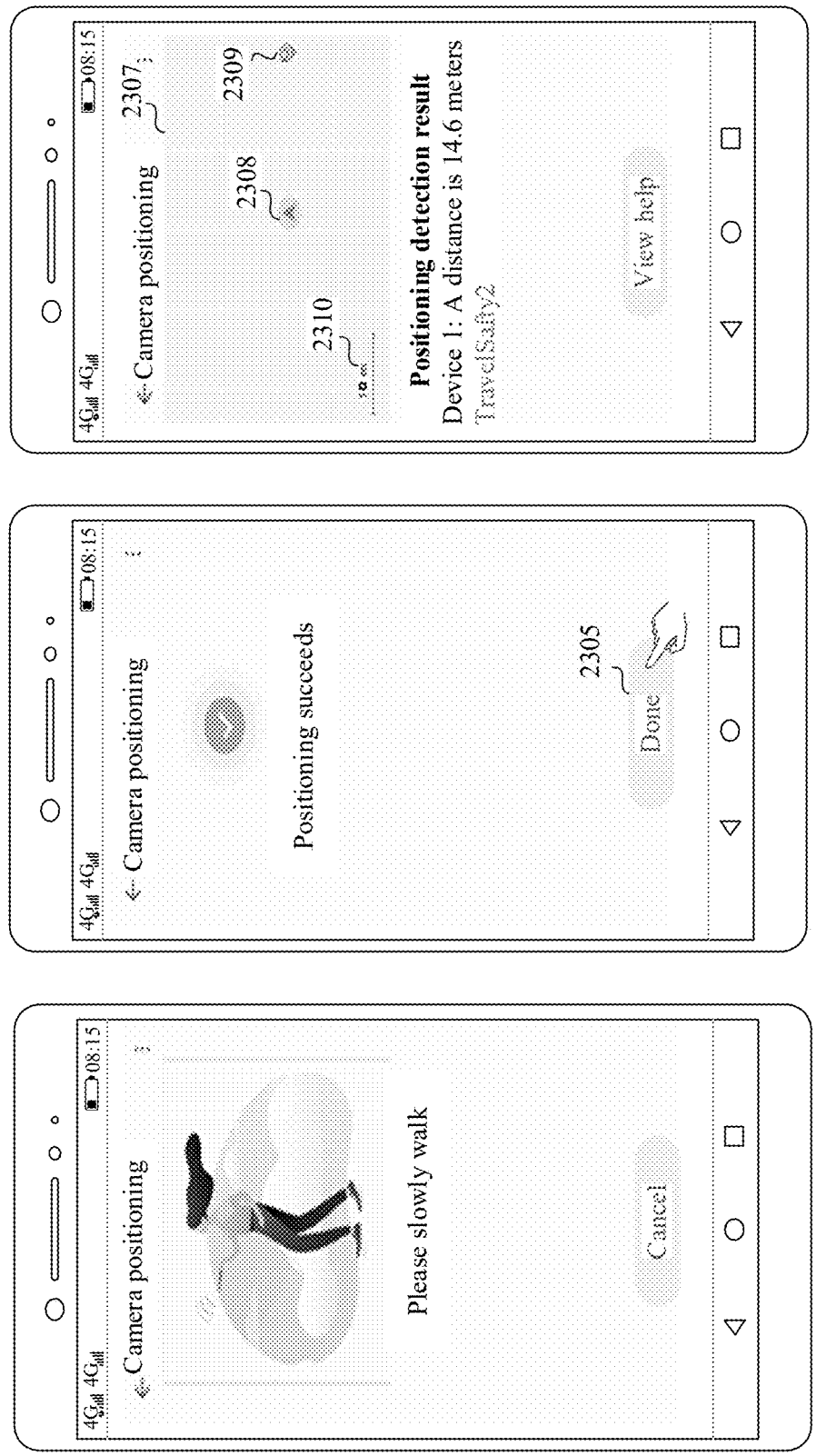

Refer to a GUI shown in FIG. 23(g). When the first electronic device positions "Device 1" shown in FIG. 23(d), the GUI interface may display a dynamic or static picture of device positioning, accompanied with a text description "Please slowly walk". It should be explained that the first application is used to search for a camera and "Device 1" is positioned after three cameras are detected. To help the user quickly position the camera, a system of the first electronic device may position, by default based on a moving track of "Random walk", the camera detected by the first application, and the user does not need to select a moving manner used for positioning. The user holds the first electronic device in hand and slowly walks based on the text description. In this case, the first electronic device obtains Wi-Fi data of a target device (that is, "Device 1") and motion data of the first electronic device based on the moving track of "Random walk" described in the foregoing embodiment. After the user walks for a period of time, the first electronic device positions a location of the device 1 based on the moving track estimation algorithm and the positioning algorithm described in the foregoing embodiment, and may display a GUI shown in FIG. 23(h).

Refer to the GUI shown in FIG. 23(h). The interface of the first electronic device displays prompt information "Positioning succeeds". After detecting an operation that the user taps an icon 2305 of "Done", the first electronic device displays a GUI shown in FIG. 23(i).

Refer to the GUI shown in FIG. 23(i). It can be learned that, a map 2307 is displayed below "Camera positioning", including an arrow icon 2308 identifying a location of the first electronic device, a location icon 2309 identifying a location of the target device (that is, "Device 1"), and a scale 2310 (as shown in the figure, the scale 2310 is at a left bottom of the map, and a schematic length is 10 m). A location indicated by the arrow 2308 is a current location of the user, and a location indicated by the positioning icon 2309 is the location of the device 1. Optionally, the location of the first electronic device and the location of the target device may alternatively be displayed by using a compass. A text description "Device 1: A distance is 14.6 m" is displayed in a positioning detection result at the bottom of the map, and indicates that the device 1 is located at a location that is in the east of the user and that is 14.6 m away from the user.

It should be noted that the first application in this embodiment is mainly used to search for a hidden camera in a hotel lobby or a room. After detecting that a hidden camera exists in the hotel lobby or the room, the user usually searches for a location at which the camera is hidden. To help the user quickly find the location at which the camera is hidden, the first electronic device may automatically enter "Search stage" after positioning, without a need to display a GUI shown in FIG. 7(n), and the user chooses to whether to search for a device under guidance.

Currently, the user holds the first electronic device in hand and faces a due north direction (it is assumed that a direction of an arrow is a direction that a face of the user faces). Therefore, the user may first adjust the direction, and a GUI shown in FIG. 23(j) is displayed.

Refer to the GUI shown in FIG. 23(j). In this case, the face of the user faces a due east direction, and a distance between the device 1 and the user is still 14.6 m. Optionally, after obtaining the positioning detection result, if the first electronic device detects that the user continues to move, the first electronic device identifies that the user further searches for the camera. A bar graph 2311 and a bell icon 2312 shown in the figure are displayed in an interface. A dark color proportion in the bar graph is used to indicate the distance between the device 1 and the user. A smaller dark color proportion indicates a longer distance between the device 1 and the user and a lower volume of a notification sound sent by the device 1 (corresponding to third prompt information in this application). On the contrary, a larger dark color proportion indicates a shorter distance between the device 1 and the user and a higher volume of the notification sound sent by the device 1 (corresponding to the third prompt information in this application).

If the user continues to slowly walk in a direction in which the device 1 is located, a GUI shown in FIG. 23(*k*) is displayed.

Refer to the GUI shown in FIG. 23(*k*). It can be learned that, in this case, the device 1 is located at a location that is in the east of the interface of the first electronic device and that is 4.6 m away from the user, and a dark color proportion in a bar graph is greater than the dark color proportion in FIG. 23(*j*). Therefore, a volume of a notification sound that is of the device 1 and that is heard of by the user is increased. Then, the user may hold the first electronic device in hand and continue to slowly walk in the direction in which the device 1 is located, and a GUI shown in FIG. 23(*l*) is displayed.

Refer to the GUI shown in FIG. 23(*l*). It can be learned that, in this case, the distance between the device 1 and the user is 0.2 m, and a dark color proportion in a bar graph is greater than the dark color proportion in FIG. 23(*k*). Therefore, the volume of the notification sound that is of the device 1 and that may be heard of by the user is further increased. In this case, it may be considered that searching for the device 1 is completed.

It should be noted that, in some embodiments, the bar graph may alternatively be displayed when a distance between the user and the target device is less than or equal to a preset threshold. For example, if the preset threshold is 10 m, the bar graph is displayed when the distance between the user and the target device is less than or equal to 10 m. In some other embodiments, the bar graph may alternatively be displayed when the user holds the first electronic device in hand and randomly walks. In other words, the bar graph starts to be displayed from the GUI shown in FIG. 23(*g*).

It may be understood that, to implement the foregoing functions, the electronic device (for example, the first electronic device) includes a hardware module and/or a software module for performing a corresponding function. With reference to algorithm steps of examples described in embodiments disclosed in this specification, this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application with reference to embodiments, but it should not be considered that the implementation goes beyond the scope of this application.

In embodiments, the electronic device may be divided into functional modules based on the foregoing method examples. For example, each functional module corresponding to each function may be obtained through division, or two or more functions may be integrated into one processing module. The integrated module may be implemented in a form of hardware. It should be noted that, in embodiments, division into the modules is an example, is merely logical function division, and may be other division in an actual implementation.

Figure 24:
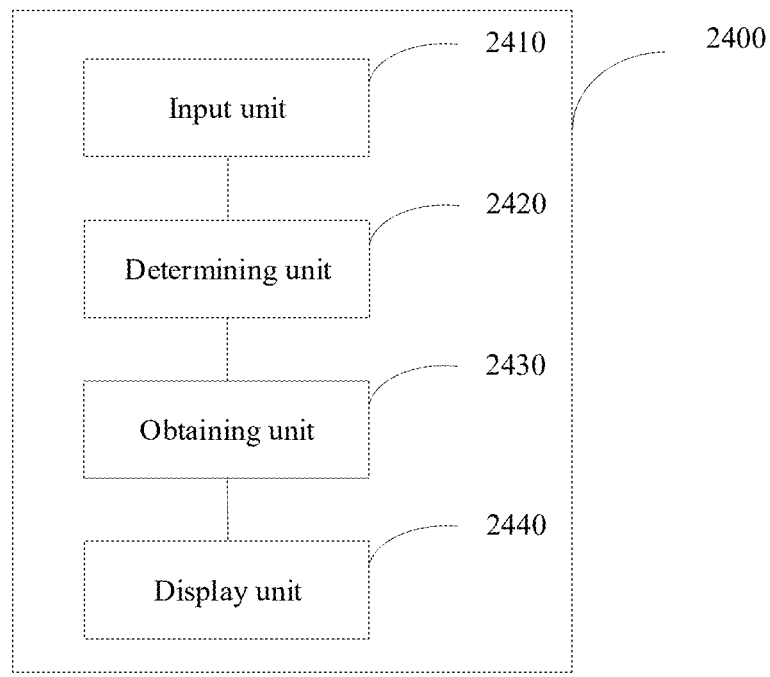
FIG. 24 is a schematic block diagram of an electronic device according to an embodiment of this application.

When each functional module is obtained through division for each corresponding function, FIG. 24 is a schematic diagram of a possible composition of an electronic device 2400 in the foregoing embodiments. As shown in FIG. 24, the electronic device 2400 may include an input unit 2410, the input unit 2420, an obtaining unit 2430, and a display unit 2440.

The input unit 2410 may be configured to support the electronic device 2400 to perform step S1210, step S1220, and the like, and/or another process of the technology described in this specification.

The determining unit 2420 may be configured to support the electronic device 2400 to perform step S1212, and the like, and/or another process of the technology described in this specification.

The obtaining unit 2430 may be configured to support the electronic device 2400 to perform step S1216, step S1222, and the like, and/or another process of the technology described in this specification.

The display unit 2440 may be configured to support the electronic device 2400 to perform step S1214, step S1218, step S1224, and the like, and/or another process of the technology described in this specification.

It should be noted that all related content of the steps in the foregoing method embodiments may be cited in function description of corresponding functional modules. Details are not described herein again.

The electronic device provided in this embodiment is configured to perform the positioning method, and therefore, can achieve a same effect as the foregoing implementation method.

When an integrated unit is used, the electronic device may include a processing module, a storage module, and a communication module. The processing module may be configured to control and manage actions of the electronic device, for example, may be configured to support the electronic device to perform the steps performed by the foregoing units. The storage module may be configured to support the electronic device to store program code, data, and the like. The communication module may be configured to support communication between the electronic device and another device.

The processing module may be a processor or a controller. The processing module may implement or execute various example logical blocks, modules, and circuits described with reference to content disclosed in this application. The processor may be alternatively a combination for implementing a computing function, for example, a combination including one or more microprocessors or a combination of digital signal processing (digital signal processing, DSP) and a microprocessor. The storage module may be a memory. The communication module may be specifically a device, for example, a radio frequency circuit, a Bluetooth chip, or a Wi-Fi chip, that interacts with another electronic device.

In an embodiment, when the processing module is a processor and the storage module is a memory, the electronic device in this embodiment may be a device having the structure shown in FIG. 1.

Figure 25:
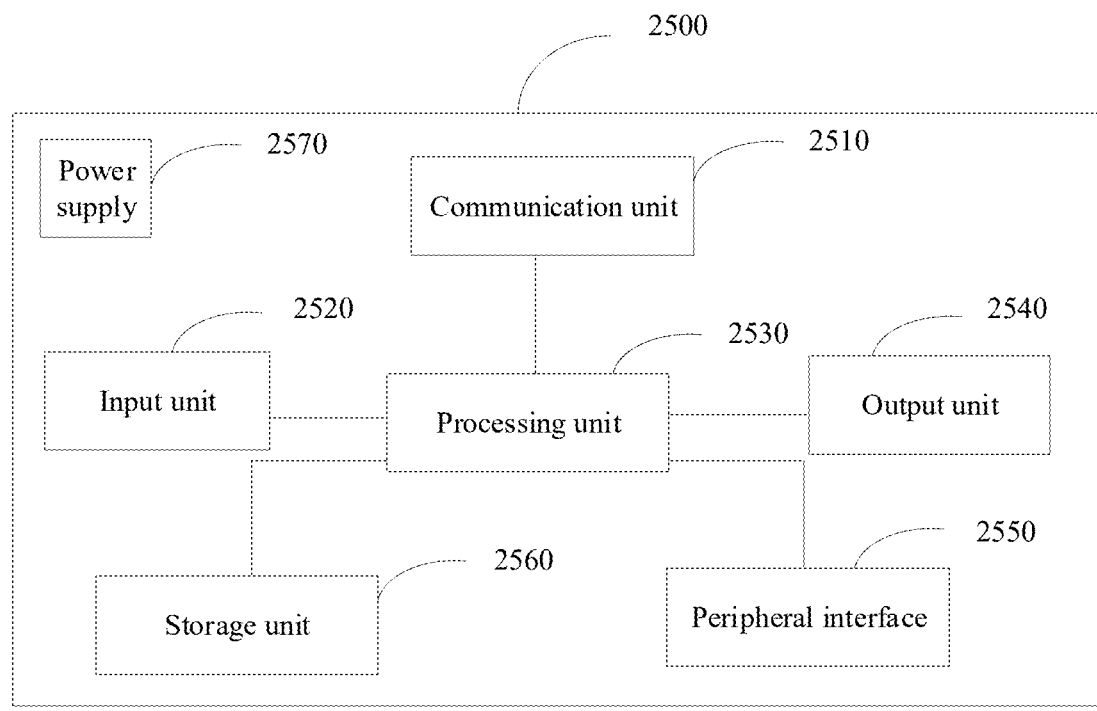
FIG. 25 is a schematic block diagram of another electronic device according to an embodiment of this application.

FIG. 25 is a schematic diagram of another possible composition of an electronic device 2500 in the foregoing embodiments. As shown in FIG. 25, the electronic device 2500 may include a communication unit 2510, an input unit 2520, a processing unit 2530, an output unit 2540, a peripheral interface 2550, a storage unit 2560, and a power supply 2570.

The communication unit 2510 is configured to establish a communication channel, so that the electronic device 2500 is connected to a remote server through the communication channel, and downloads media data from the remote server. The communication unit 2510 may include a communication module such as a WLAN module, a Bluetooth module, an NFC module, or a baseband module, and a radio frequency (Radio Frequency, RF for short) circuit corresponding to the communication module, and is configured to perform wireless local area network communication, Bluetooth communication, NFC communication, infrared communication, and/or cellular communication system communication, for example, wideband code division multiple access (wideband code division multiple access, W-CDMA) and/or high speed downlink packet access (high speed downlink packet access, HSDPA). The communication module 2510 is configured to control communication between components in the electronic device, and may support direct memory access.

The input unit 2520 may be configured to implement interaction between a user and the electronic device and/or an information input into the electronic device. In a specific implementation of the present invention, the input unit may be a touch panel; or may be another human-machine interaction interface, for example, a physical input key or a microphone; or may be another external information obtaining apparatus, for example, a camera.

The input unit 2520 in the foregoing embodiments may be configured to receive an input operation performed by the user, for example, a first input operation and/or a second input operation in the foregoing embodiments. For details, refer to steps S1210 and S1220.

The processing unit 2530 is a control center of the electronic device, may be connected to various parts of the entire electronic device by using various interfaces and lines, and implements various functions of the electronic device and/or processes data by running or executing a software program and/or module stored in the storage unit and invoking data stored in the storage unit.

The output unit 2540 includes but is not limited to an image output unit and a voice output unit. The image output unit is configured to output a text, a picture, and/or a video. In a specific implementation of the present invention, the touch panel used for the input unit 2520 may also be used as a display panel of the output unit 2540. For example, after detecting a gesture operation of touching or approaching the touch panel, the touch panel transmits the gesture operation to the processing unit to determine a type of a touch event, and subsequently, the processing unit provides a corresponding visual output on the display panel based on the type of the touch event. In FIG. 25, although the input unit 2520 and the output unit 2540 are used as two independent components to implement input and output functions of the electronic device, in some embodiments, the touch panel and the display panel may be integrated to implement the input and output functions of the electronic device. For example, the image output unit may display various graphical user interfaces as virtual control components, including but not limited to a window, a scrollbar, an icon, and a clipbook, so that the user performs an operation in a touch manner.

In the foregoing embodiments, prompting the user with content of a positioning description interface in step S1214, prompting the user with location information of a target device in step S1218, and providing location information of a first electronic device and updated location information of the target device in step S1225 may be implemented by using the output unit 2540.

The storage unit 2560 may be configured to store a software program and a module. The processing unit runs the software program and the module stored in the storage unit, to execute various functional applications of the electronic device and implement data processing.

An embodiment further provides a computer storage medium. The computer storage medium stores computer instructions. When the computer instructions are run on an electronic device, the electronic device is enabled to perform the foregoing related method steps to implement the positioning method in the foregoing embodiments.

An embodiment further provides a computer program product. When the computer program product is run on a computer, the computer is enabled to perform the foregoing related steps, to implement the positioning method in the foregoing embodiments.

In addition, an embodiment of this application further provides an apparatus. The apparatus may be specifically a chip, a component, or a module, and the apparatus may include a processor and a memory that are connected. The memory is configured to store computer-executable instructions. When the apparatus runs, the processor may execute the computer-executable instructions stored in the memory, so that the chip performs the positioning method in the foregoing method embodiments.

The electronic device, the computer storage medium, the computer program product, or the chip provided in embodiments is configured to perform the corresponding method provided above. Therefore, for beneficial effects that can be achieved, refer to the beneficial effects of the corresponding method provided above. Details are not described herein again.

Based on the descriptions of the implementations, a person skilled in the art may understand that for the purpose of convenient and brief descriptions, division into the functional modules is merely used as an example for description. In an actual application, the functions can be allocated to different functional modules for implementation based on a requirement. In other words, an inner structure of an apparatus is divided into different functional modules, to implement all or some of the foregoing described functions.

In the several embodiments provided in this application, it should be understood that the disclosed apparatus and method may be implemented in another manner. For example, the described apparatus embodiments are merely an example. For example, division into modules or units is merely logical function division, and may be other division in an actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on an actual requirement, to achieve objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in embodiments of this application. The foregoing storage medium includes any medium that can store program code, for example, a USB flash drive, a removable hard disk, a ROM, a RAM, a magnetic disk, or an optical disc.

The foregoing content is merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method implemented by a first electronic device, wherein the method comprises:
   receiving, from a user, a first input operation;
   determining, in response to the first input operation, a target device and a predetermined moving track;
   obtaining first feature information of a second electronic device and motion information of the first electronic device in a moving process in which the first electronic device moves along the predetermined moving track, wherein the motion information comprises an attitude angle at which the user holds the first electronic device;
   displaying, based on the first feature information and the motion information, first location information of the target device;
   identifying that the second electronic device is a hotspot apparatus with a known geographical location when the target device is the first electronic device;
   identifying that a deviation between the attitude angle and a preset attitude angle is greater than a threshold; and
   displaying, in response to identifying that the deviation is greater than the threshold, prompt information indicating to the user to continue a holding manner of the first electronic device or indicating that a positioning result is inaccurate.

2. The method of claim 1, wherein the motion information comprises an actual moving track in the moving process, and wherein the method further comprises:
   identifying that a deviation between the actual moving track and the predetermined moving track is greater than a first threshold; and
   displaying, in response to identifying that the deviation is greater than the first threshold, prompt information indicating that a motion is abnormal.

3. The method of claim 1, wherein the motion information comprises an actual moving track in the moving process, and wherein the method further comprises:
   identifying that a deviation between the actual moving track and the predetermined moving track is greater than a threshold; and
   displaying, in response to identifying that the deviation is greater than the threshold, prompt information indicating that a positioning result is inaccurate.

4. The method of claim 1, wherein after displaying the first location information, the method further comprises:
   reobtaining the first feature information and the motion information when the first electronic device continues to move; and
   displaying, based on the first feature information and the motion information, second location information of the first electronic device and updated location information of the target device.

5. The method of claim 4, further comprising further displaying, in real time using a compass or a map, the second location information and the updated location information.

6. The method of claim 4, further comprising further displaying, based on the first feature information and the motion information, third prompt information indicating a distance between the first electronic device and the target device.

7. The method of claim 1, wherein the predetermined moving track comprises a first moving track formed when the user holding the first electronic device moves in at least one of an in-place rotation manner, an in-place arm swinging manner, or a walking manner.

8. The method of claim 7, wherein the predetermined moving track is the moving track formed when the user holding the first electronic device moves in either the in-place rotation manner or the in-place arm swinging manner, and wherein the method further comprises:
   estimating, based on the first feature information and the motion information and using a crest method or a trough method, location coordinates of the target device; and
   further displaying, based on the location coordinates, the first location information.

9. The method of claim 7, wherein the predetermined moving track is the moving track formed when the user holding the first electronic device in a hand of the user moves in the walking manner, and wherein the method further comprises:
   estimating, based on the first feature information and the motion information and using a heatmap method, location coordinates of the target device; and
   further displaying, based on the location coordinates, the first location information.

10. The method of claim 1, further comprising identifying that the second electronic device is the target device when the target device is not the first electronic device.

11. The method of claim 10, further comprising:
    establishing a communication connection with the target device or being in a network covered by a same route as the target device;
    receiving, from the target device using the communication connection or the route, data; and
    extracting, based on the data, second feature information of the target device.

12. The method of claim 10, further comprising:
    setting a network interface card of the first electronic device to a sniffing manner;
    receiving, using the network interface card, data of the target device; and
    extracting, based on the data, second feature information of the target device.

13. The method of claim 12, wherein the target device is a video surveillance device.

14. The method of claim 1, wherein the motion information comprises one or more of an acceleration, an angular velocity, a magnetic intensity, attitude information, or pedometer data.

15. The method of claim 1, wherein the first feature information comprises one or more of a received signal strength indicator (RSSI), channel state information (CSI), a transmission rate, or a signal-to-noise ratio (SNR).

16. The method of claim 1, further comprising automatically determining the predetermined moving track.

17. A first electronic device comprising:
a memory configured to store instructions; and
one or more processors coupled to the memory and configured to execute the instructions to cause the first electronic device to:
receive, from a user, an input operation;
determine, in response to the input operation, a target device and a predetermined moving track;
obtain feature information of a second electronic device, and motion information of the first electronic device in a moving process in which the first electronic device moves along the predetermined moving track, wherein the motion information comprises an attitude angle at which the user holds the first electronic device;
display, based on the feature information and the motion information, location information of the target device;
identify that the second electronic device is a hotspot apparatus with a known geographical location when the target device is the first electronic device;
identify that a deviation between the attitude angle and a preset attitude angle is greater than a threshold; and
display, in response to identifying that the deviation is greater than the threshold, prompt information indicating to the user to continue a holding manner of the first electronic device or indicating that a positioning result is inaccurate.

18. The first electronic device of claim 17, wherein the motion information comprises an actual moving track in the moving process, and wherein the one or more processors are further configured to execute the instructions to further cause the first electronic device to:
identify that a deviation between the actual moving track and the predetermined moving track is greater than a first threshold; and
display, in response to identifying that the deviation is greater than the first threshold, prompt information indicating that a motion is abnormal.

19. The first electronic device of claim 17, wherein the motion information comprises an actual moving track in the moving process, and wherein the one or more processors are further configured to execute the instructions to further cause the first electronic device to:
identify that a deviation between the actual moving track and the predetermined moving track is greater than a threshold; and
display, in response to identifying that the deviation is greater than the threshold, prompt information indicating that a positioning result is inaccurate.

20. A computer program product comprising computer-executable instructions that are stored on a non-transitory computer-readable storage medium and that, when executed by one or more processors cause a first electronic device to:
receive, from a user, an input operation;
determine, in response to the input operation, a target device and a predetermined moving track;
obtain feature information of a second electronic device, and motion information of the first electronic device in a moving process in which the first electronic device moves along the predetermined moving track, wherein the motion information comprises an attitude angle at which the user holds the first electronic device;
display, based on the feature information and the motion information, location information of the target device;
identify that the second electronic device is a hotspot apparatus with a known geographical location when the target device is the first electronic device;
identify that a deviation between the attitude angle and a preset attitude angle is greater than a threshold; and
display, in response to identifying that the deviation is greater than the threshold, prompt information indicating to the user to continue a holding manner of the first electronic device or indicating that a positioning result is inaccurate.

* * * * *